US007190651B2

(12) United States Patent
Gushima et al.

(10) Patent No.: US 7,190,651 B2
(45) Date of Patent: Mar. 13, 2007

(54) DEVICE AND METHOD FOR RECORDING DATA TO OPTICAL DISK USING RECORDING PULSE WITH CORRECTED EDGE POSITION

(75) Inventors: Toyoji Gushima, Osaka (JP); Ikunori Inoue, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 424 days.

(21) Appl. No.: 10/787,594

(22) Filed: Feb. 27, 2004

(65) Prior Publication Data

US 2004/0165508 A1 Aug. 26, 2004

Related U.S. Application Data

(62) Division of application No. 09/427,544, filed on Oct. 27, 1999, now Pat. No. 6,721,255.

(30) Foreign Application Priority Data

Oct. 28, 1998 (JP) ............................... 10-306760
Jan. 22, 1999 (JP) ............................... 11-014468

(51) Int. Cl.
*G11B 20/10* (2006.01)
(52) U.S. Cl. .................. 369/59.12; 369/53.31
(58) Field of Classification Search ..................... None
See application file for complete search history.

(56) References Cited

U.S. PATENT DOCUMENTS 4,908,811 A * 3/1990 Yokogawa et al. ...... 369/53.36

| 5,005,164 A | 4/1991 | Sakamoto et al. |
| 5,109,373 A | 4/1992 | Ohno et al. |
| 5,150,351 A | 9/1992 | Ohno et al. |
| 5,394,380 A | 2/1995 | Hasegawa |
| 5,418,770 A | 5/1995 | Ide et al. |
| 5,490,126 A | 2/1996 | Furumiya et al. |
| 5,636,194 A | 6/1997 | Furumiya et al. |
| 5,848,045 A | 12/1998 | Kirino et al. |
| 6,044,055 A | 3/2000 | Hara |

FOREIGN PATENT DOCUMENTS

| EP | 0405610 | 1/1991 |
| EP | 0669611 | 8/1995 |
| JP | 3-185628 | 8/1991 |
| JP | 7-129959 | 5/1995 |

* cited by examiner

*Primary Examiner*—Paul W. Huber
(74) *Attorney, Agent, or Firm*—Wenderoth, Lind & Ponack, L.L.P.

(57) ABSTRACT

The present invention provides a device and method for an optical disc such as a DVD which can keep proper edge position of a recording pulse to record data of high quality without depending on a fluctuation in a supply voltage and a fluctuation in a temperature. The optical disc device according to the present invention comprises a laser driver for driving a laser to record data on an optical disc, a recording pulse generator for generating a recording pulse signal by using a predetermined delay circuit, to control the switching of the laser power of the laser driver, a delay amount measuring section for measuring the delay amount of a delay circuit in the recording pulse generator, and a recording pulse position correction section for correcting the predetermined edge position of the recording pulse based on the result of the measurement.

20 Claims, 33 Drawing Sheets

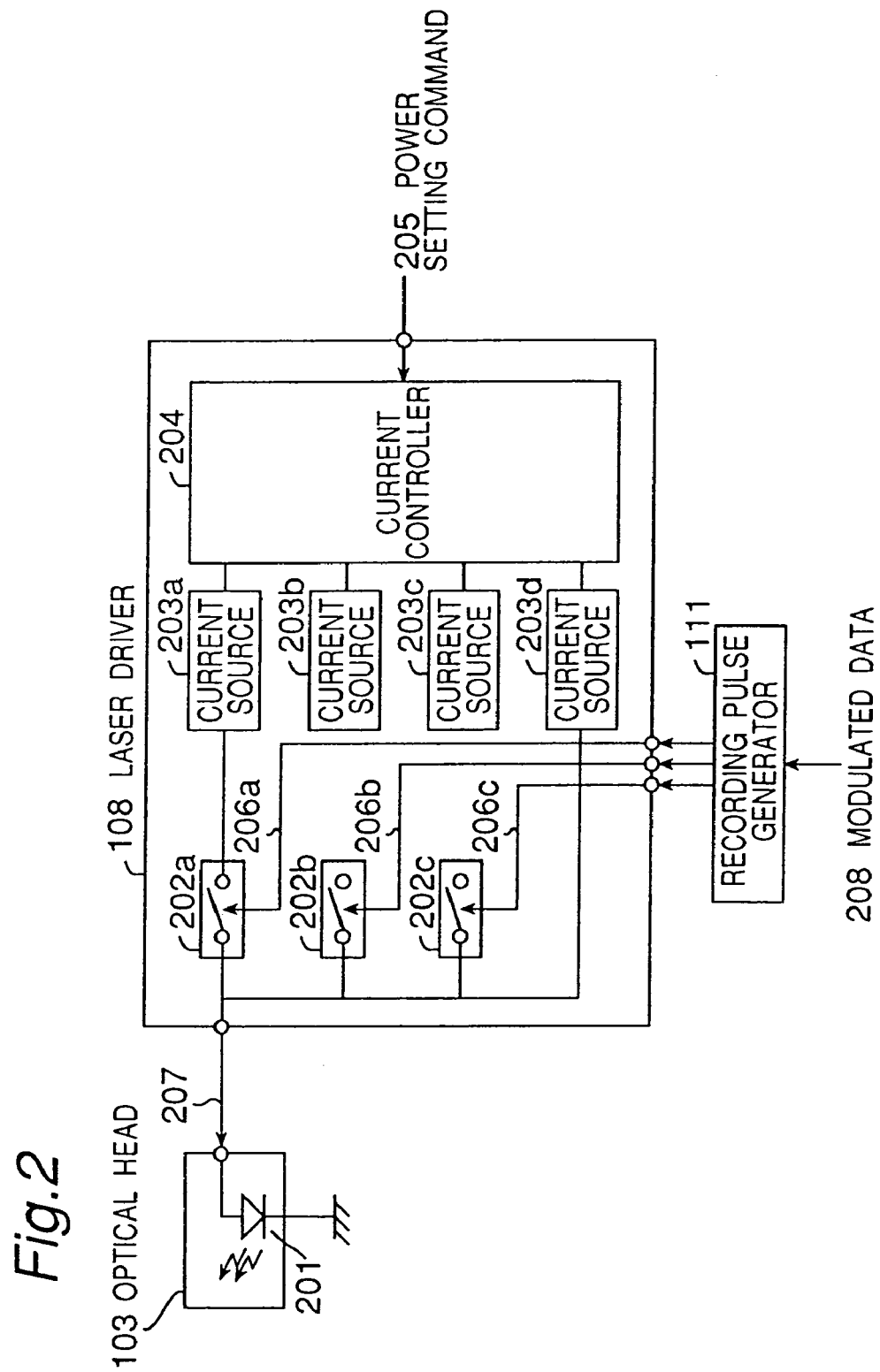

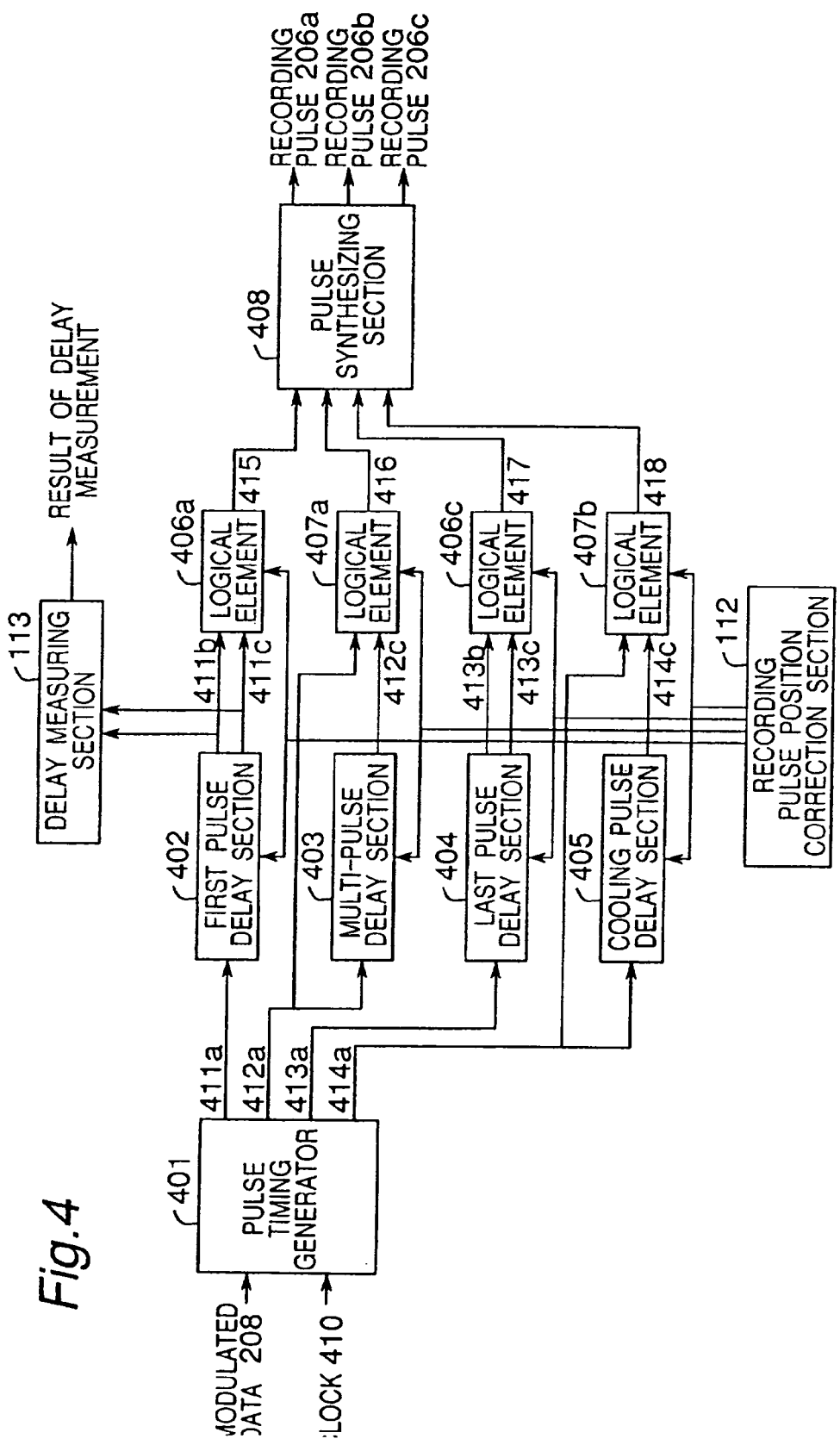

Fig.7
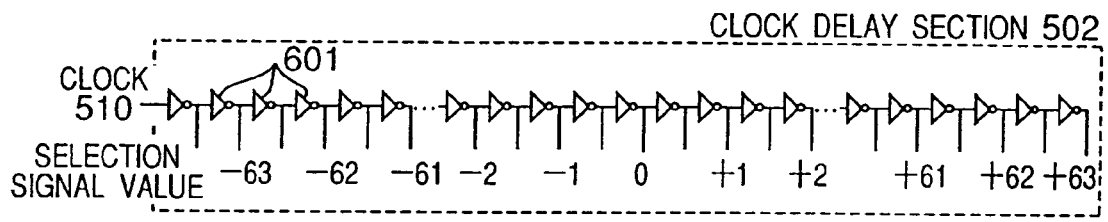
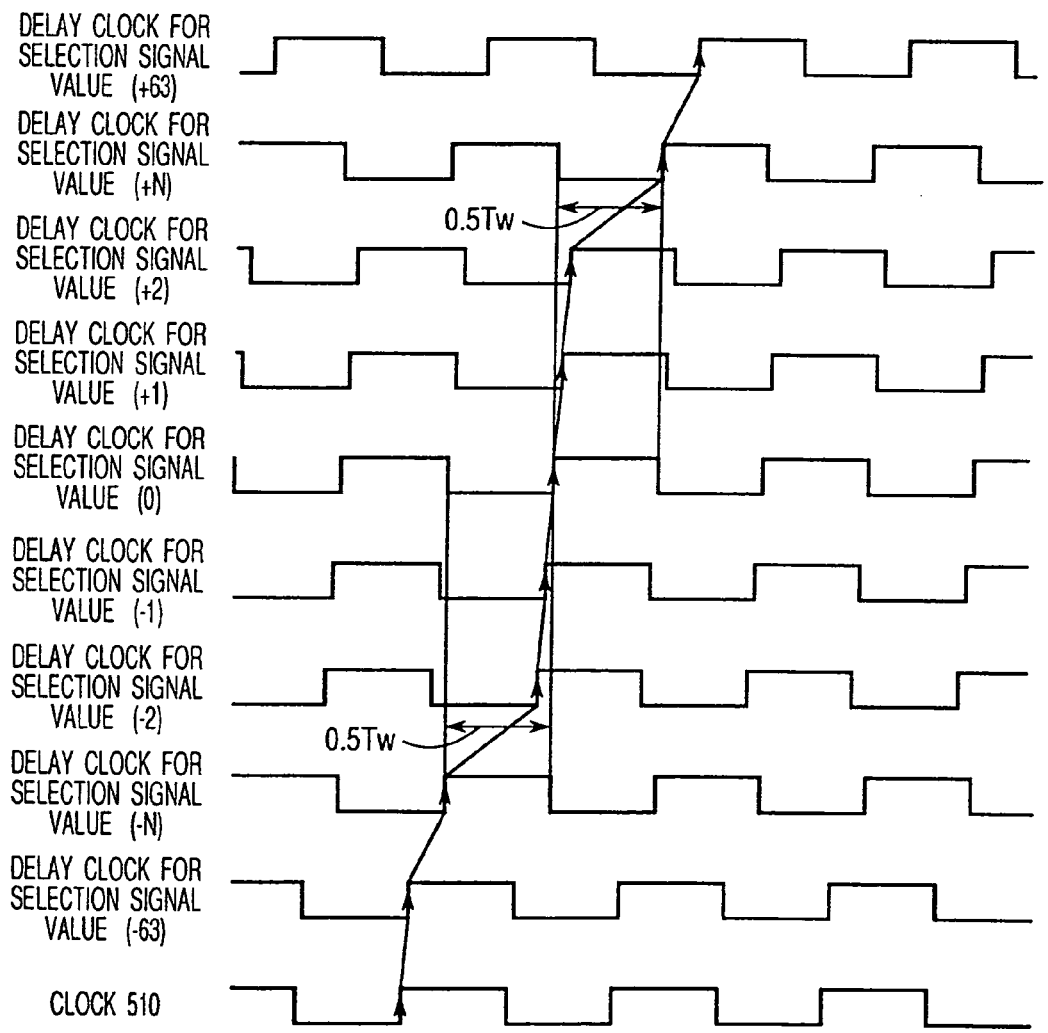

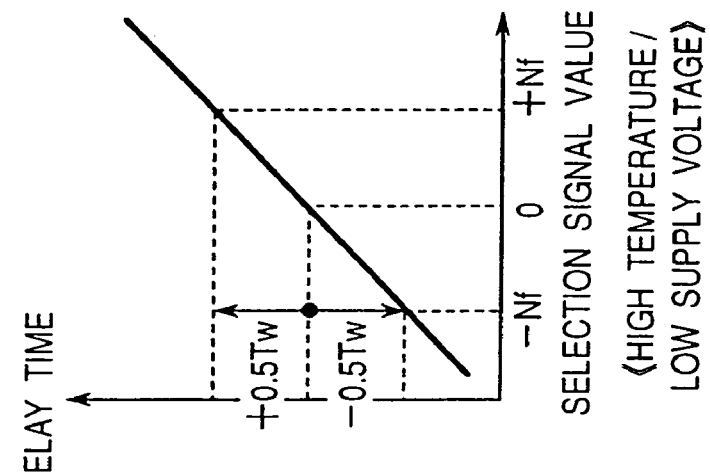
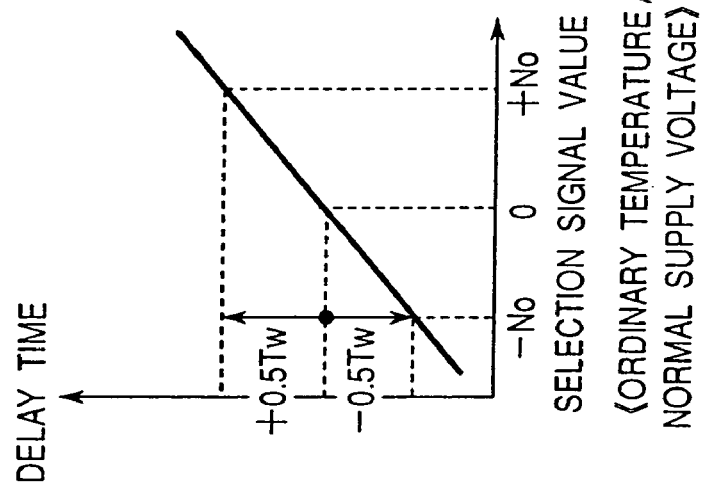
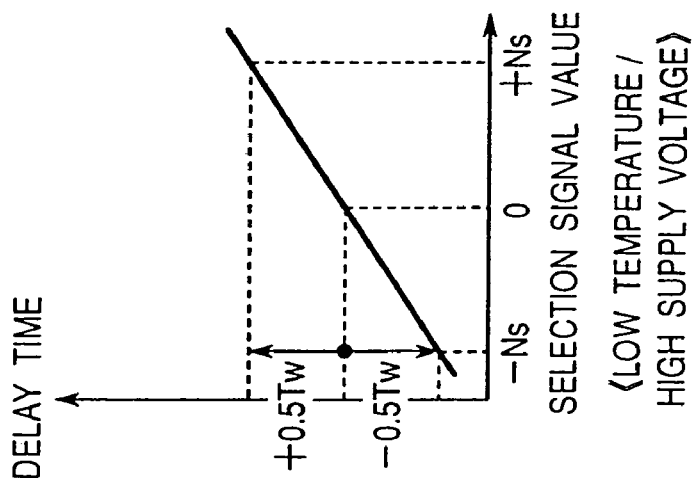

| LAST SPACE LENGTH \ SELF MARK LENGTH | 5Tw OR MORE | 4Tw | 3Tw |
|---|---|---|---|
| 5Tw OR MORE | −1 ns | +2 ns | +3 ns |
| 4Tw | −1 ns | +2 ns | +4 ns |
| 3Tw | −2 ns | +3 ns | +5 ns |

<TIME TABLE>

1Tw=17ns
±0.5Tw : ±N

| LAST SPACE LENGTH \ SELF MARK LENGTH | 5Tw OR MORE | 4Tw | 3Tw |
|---|---|---|---|
| 5Tw OR MORE | −2N/17 | +4N/17 | +6N/17 |
| 4Tw | −2N/17 | +4N/17 | +8N/17 |
| 3Tw | −4N/17 | +6N/17 | +10N/17 |

<SET VALUE TABLE>

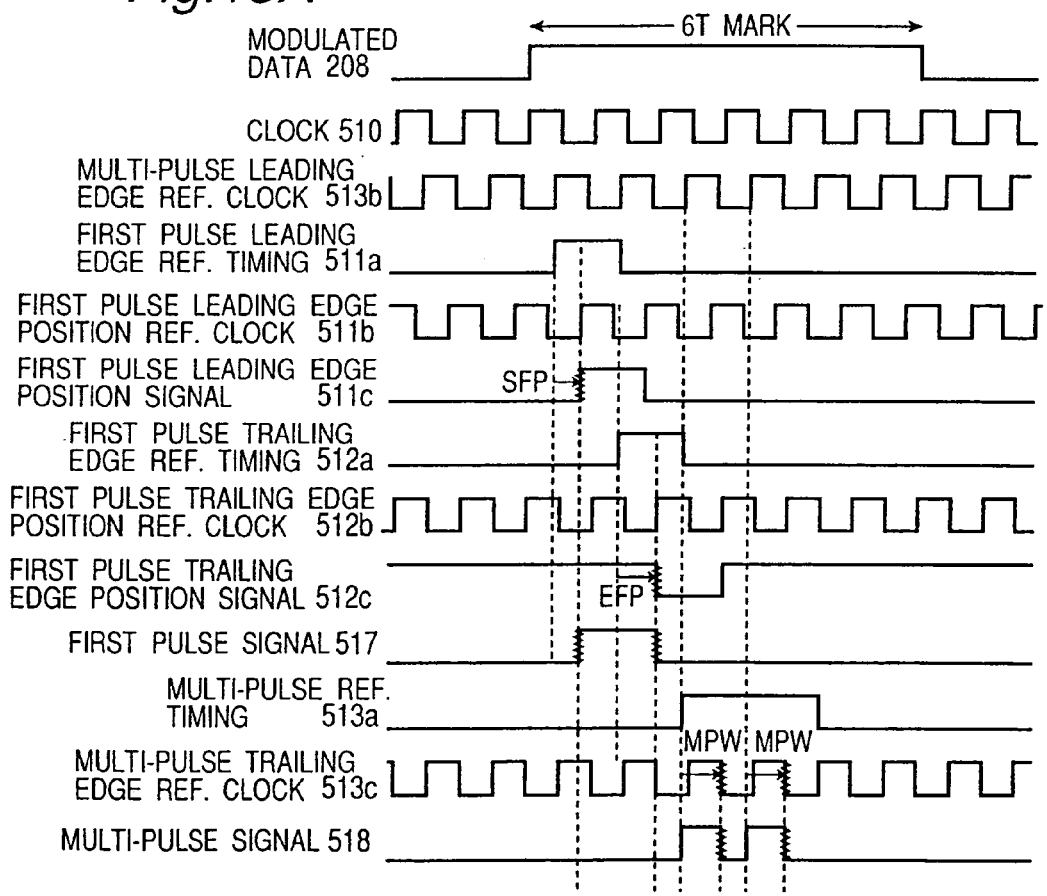

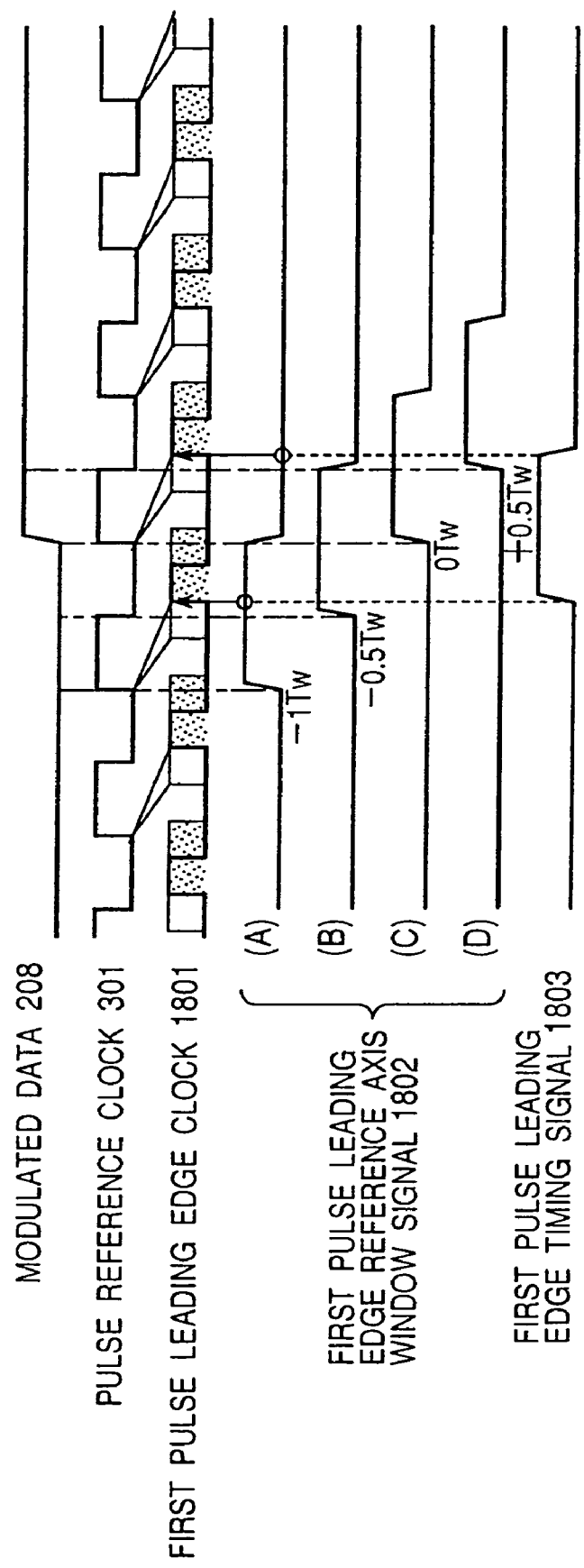

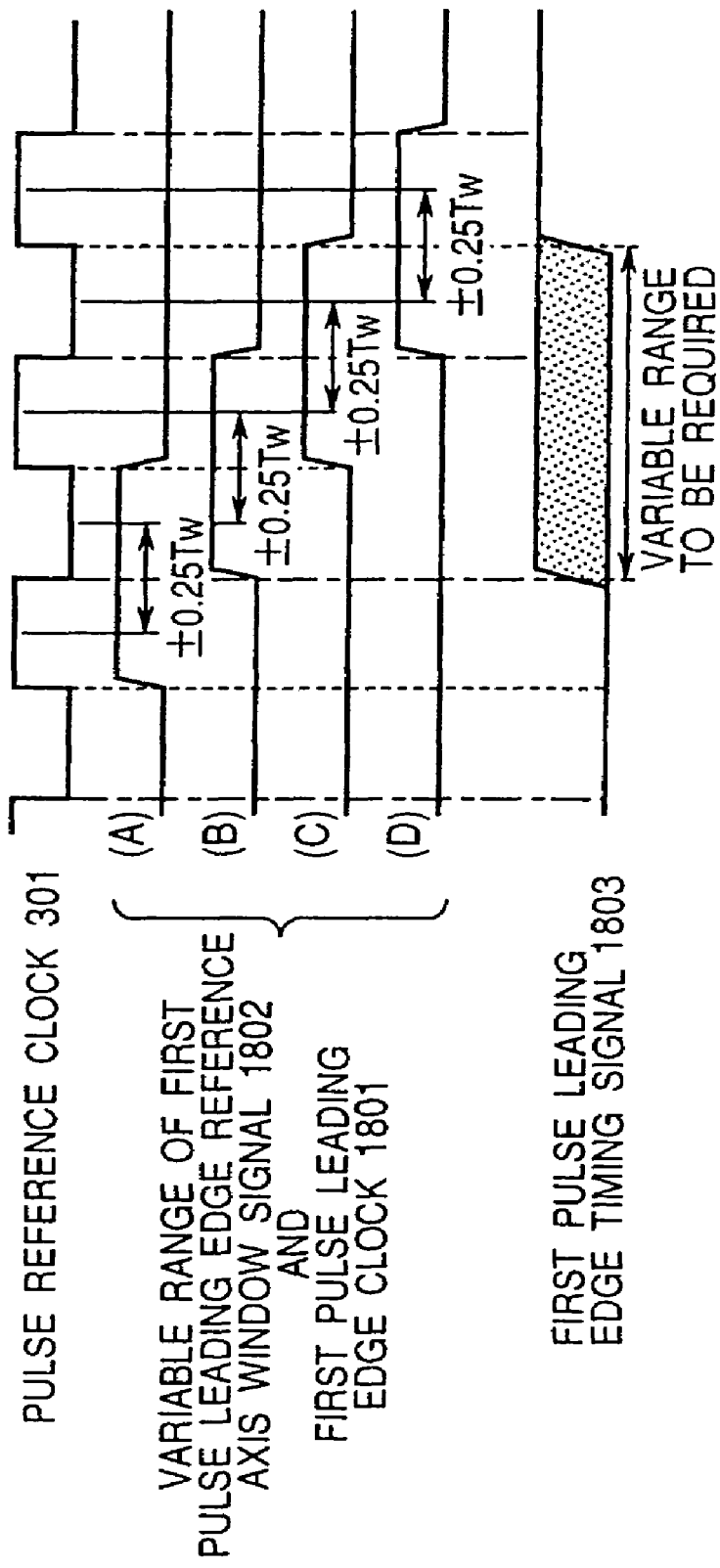

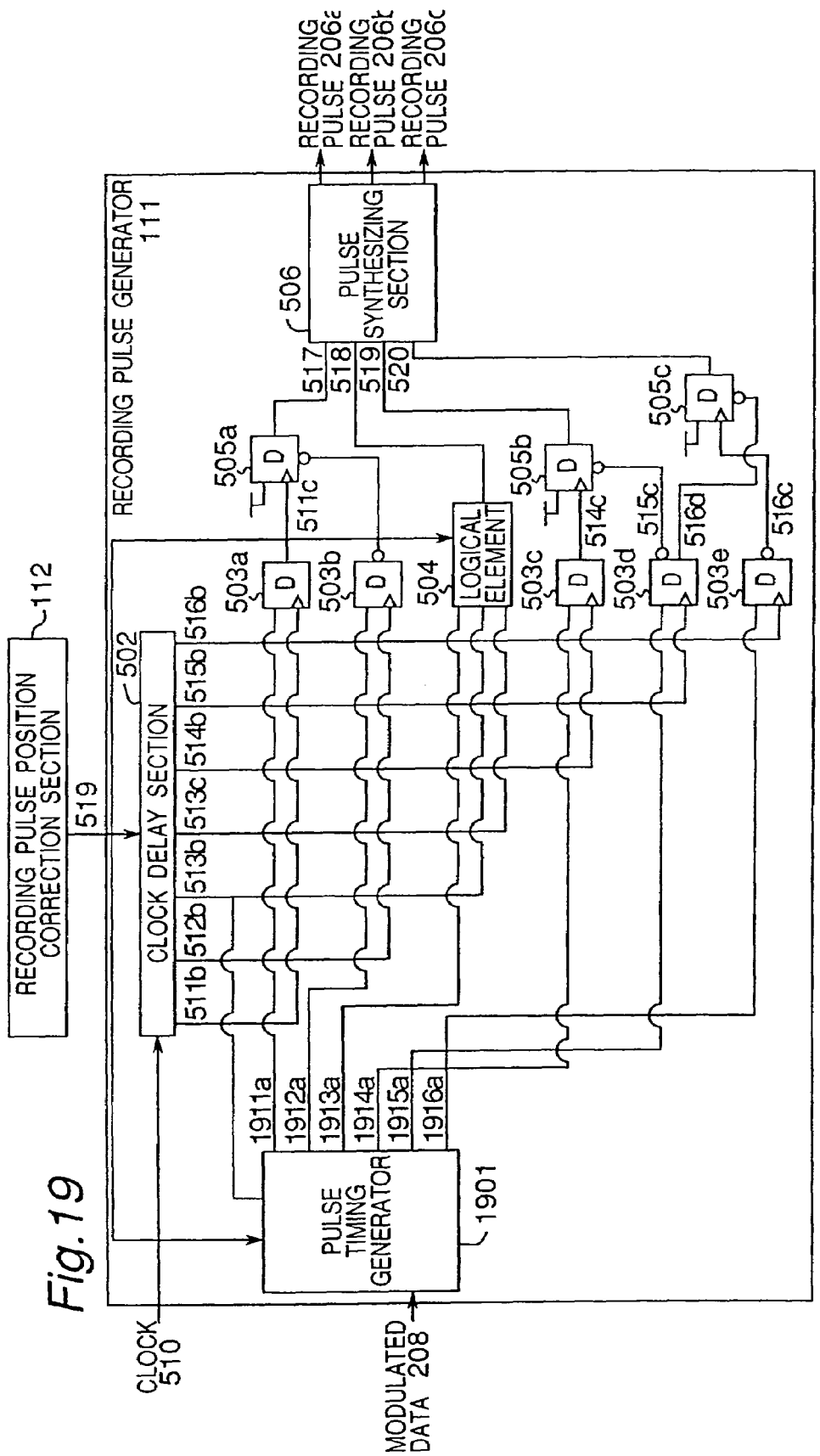

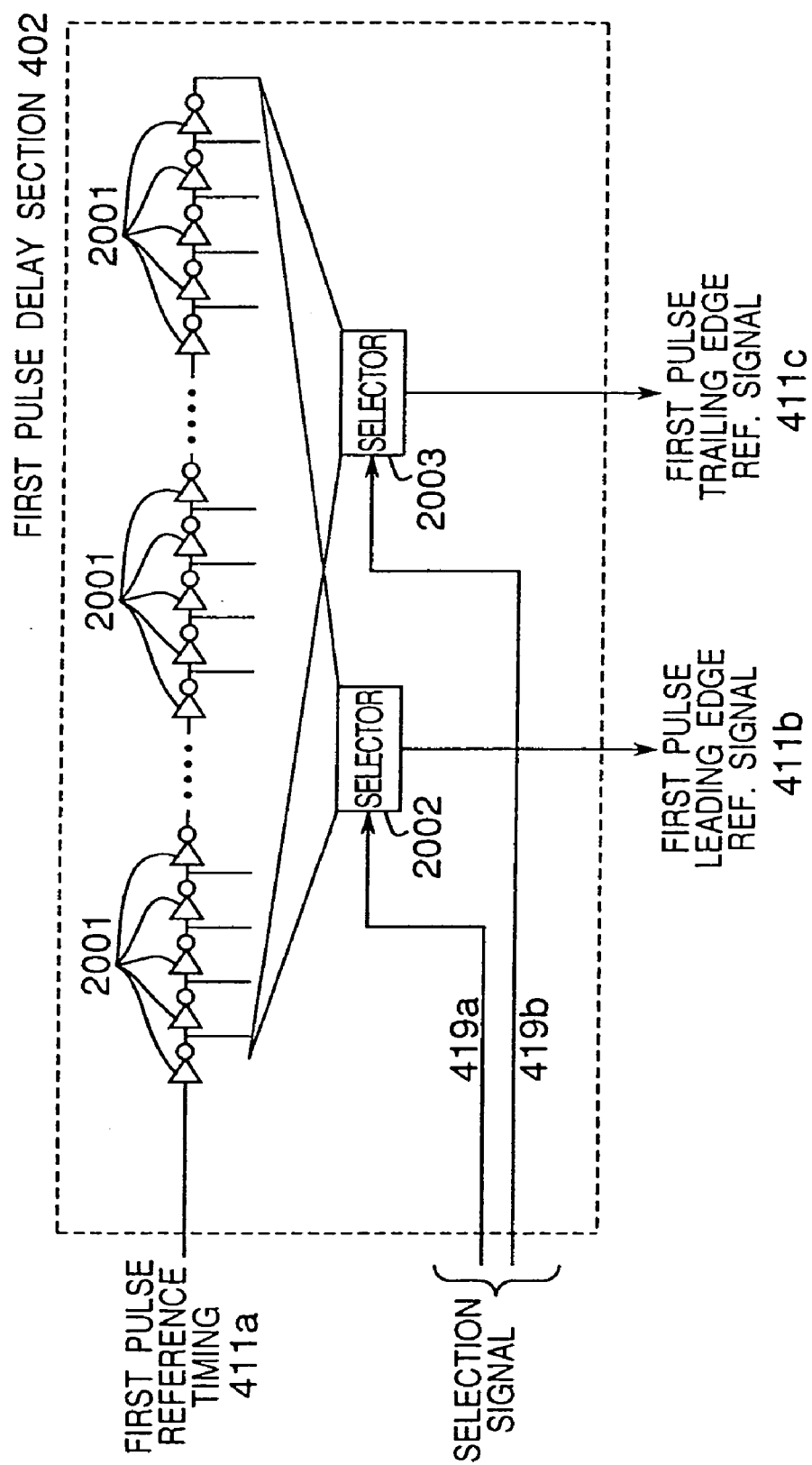

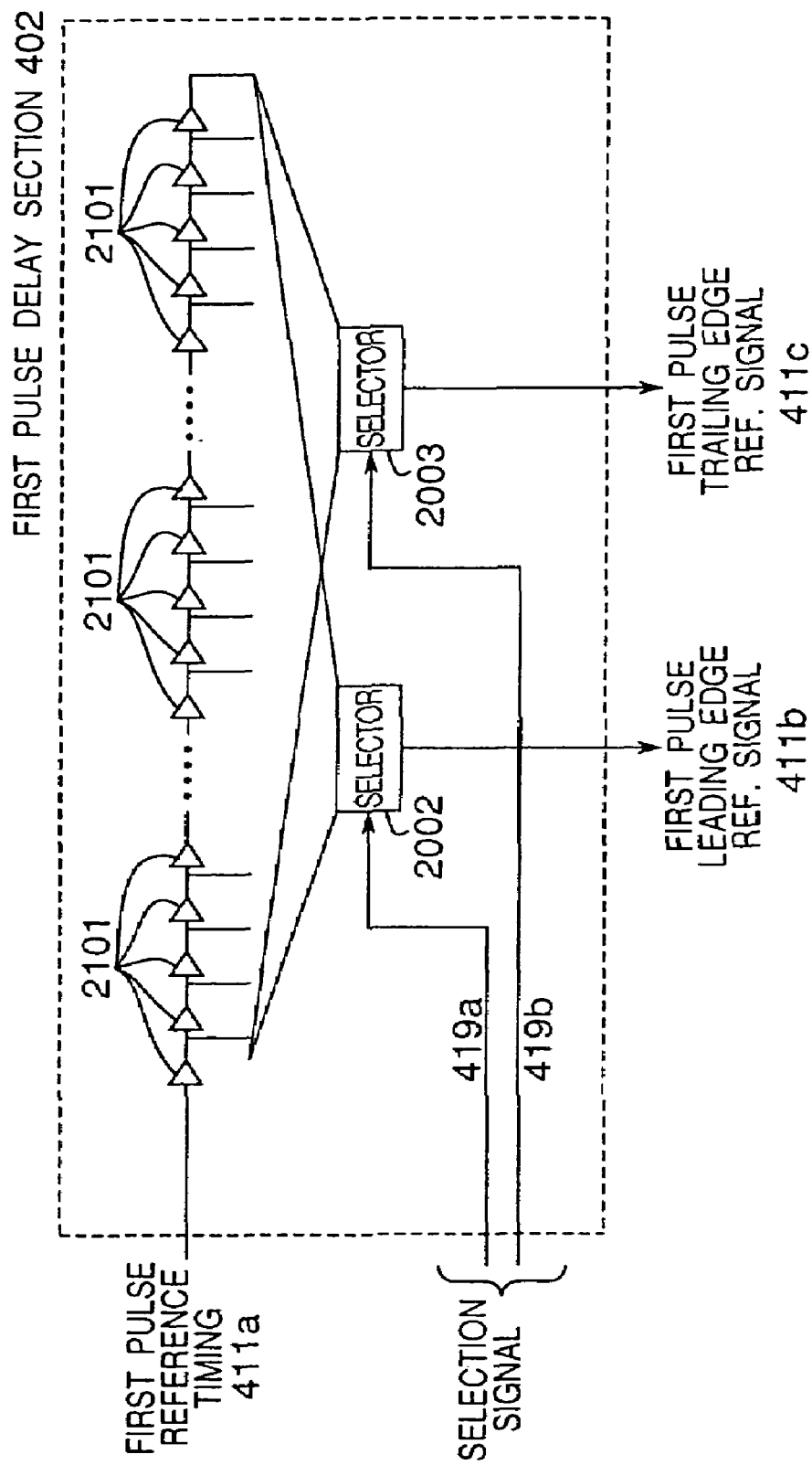

Fig.26

| SELF MARK LENGTH / LAST SPACE LENGTH | 5Tw OR MORE | 4Tw | 3Tw |
|---|---|---|---|
| 5Tw OR MORE | −1 ns | +2 ns | +3 ns |
| 4Tw | −1 ns | +2 ns | +4 ns |
| 3Tw | −2 ns | +3 ns | +5 ns |

<TIME TABLE>

1Tw=17ns
GRADIENT COEFFICIENT OF NEGATIVE TIME REGION : a(−)
GRADIENT COEFFICIENT OF POSITIVE TIME REGION : a(+)

| SELF MARK LENGTH / LAST SPACE LENGTH | 5Tw OR MORE | 4Tw | 3Tw |
|---|---|---|---|
| 5Tw OR MORE | $\frac{-1}{a(-)}$ | $\frac{+2}{a(+)}$ | $\frac{+3}{a(+)}$ |
| 4Tw | $\frac{-1}{a(-)}$ | $\frac{+2}{a(+)}$ | $\frac{+4}{a(+)}$ |
| 3Tw | $\frac{-2}{a(-)}$ | $\frac{+3}{a(+)}$ | $\frac{+5}{a(+)}$ |

<SET VALUE TABLE>

DEVICE AND METHOD FOR RECORDING DATA TO OPTICAL DISK USING RECORDING PULSE WITH CORRECTED EDGE POSITION

This is a Divisional Application of U.S. application Ser. No. 09/427,544, filed Oct. 27, 1999 now U.S. Pat. No. 6,721,255.

BACKGROUND OF THE INVENTION

1. Field of the Invention

The present invention relates to a technology for recording information onto an information recording medium such as an optical disc.

2. Related Art

In recent years, attention has been paid to an optical disc such as a DVD-RAM as a large capacity information recording medium, and the optical disc has been developed and merchandised for an external memory of a computer and for picture and voice recording. In general, the optical disc is provided with a spiral or concentric track on a disc surface and laser beams are irradiated along the track, thereby recording and reproducing information. Moreover, the track is further divided into a plurality of sectors which become the minimum unit for recording and reproducing information data.

As a method for recording information onto the optical disc, there has generally been known a light modulation recording method for modulating the intensity of a laser beam irradiated on the track onto which data are to be recorded according to the data to be recorded. Typically, there have been known recording methods applicable to an optical disc material over a wide range, for example, a phase change type optical disc, an organic pigment type optical disc, a magneto-optical disc and the like.

Moreover, a pulse width modulation method (which will be hereinafter referred to as a "PWM method") has been known as a method for recording data onto an optical disc at a high density. The PWM method serves to perform modulation such that the edges of front and rear edges of a recording mark correspond to "1" of a digital signal, and can assign more bits into the recording mark having the same length as compared with a pulse position modulation method for performing modulation such that the position of the recording mark corresponds to "1" of the digital signal. Therefore, the PWM method is suitable for an enhancement in the density.

In the PWM method, the width of the recording mark has information. Therefore, it is necessary to homogeneously form the recording mark on the front and rear edges without distortion. However, in the case where a long mark is to be particularly recorded by the heat regenerating effects of a recording film by means of the phase change type optical disc or the like, the width of the recording mark in the radial direction is gradually increased toward a latter half portion. In other words, there has been a problem in that the recording mark is distorted like a teardrop. In order to solve the problem, there has been proposed a recording method for forming one recording mark by the irradiation of a plurality of short pulse chain (which has been disclosed Japanese Patent Laid-Open Publication No. 3-185628, for example).

Moreover, there has also been proposed a method for changing and recording pulse positions corresponding to a recording leading edge portion and a recording mark terminating portion in a recording pulse chain are changed and recorded for each mark length/space length of data to be recorded, thereby compensating for a peak shift by a thermal interference between marks and a frequency characteristic obtained during reproduction (which has been disclosed in Japanese Patent Laid-Open Publication No. 7-129959, for example).

The operation for forming the recording mark of good quality by changing the position of the recording pulse as described above is generally referred to as "recording compensation".

In the case where the position of the recording pulse is to be changed for the recording compensation, it is necessary to change the edge position of the recording pulse in a time unit which is much shorter than one channel bit of the record data. Therefore, it is hard to generate the recording pulse by a synchronous circuit using a clock signal having a one-channel bit cycle. Therefore, there has generally been taken such a structure that the position of the recording pulse is changed by signal delay means capable of controlling a delay amount (which has been disclosed in the Japanese Patent Laid-Open Publication No. 7-129959, for example).

In the signal delay means, however, the delay amount is generally changed readily for a change in a source voltage, a temperature or the like. In the case where the change in the delay amount which is obtained by a fluctuation in the source voltage, a fluctuation in the temperature or the like is comparatively small, the quality of the record data is not affected. However, in the case where the change in the delay amount is comparatively great, the position of the recording pulse is shifted from a proper position. Therefore, the recording mark cannot be formed correctly so that recording and reproducing characteristics are deteriorated.

In a conventional optical disc recording device, a delay amount for a specific mark length/space length has been fixedly set and there has no means for correcting the positional shift of the recording pulse which is caused by a fluctuation in a source voltage, a temperature or the like.

The conventional optical disc recording device has had such a structure that separate signal delay means is provided for each pulse portion to individually perform control when a plurality of pulse portions in the recording pulse are to be changed in different delay amounts. For this reason, separate signal delay means are required corresponding to the number of the pulse portions to be changed independently. Consequently, a circuit scale tends to be increased. Furthermore, as the position variable range of the pulse portion is more increased, a delay length to be required for individual signal delay means is more increased so that the circuit scale is more enlarged.

SUMMARY OF THE INVENTION

In consideration of the above-mentioned problems, it is an object of the present invention to provide an information recording device and an information recording method which comprises means for eliminating the drawbacks and attain the following objects.

(Object 1) To perform recording with high precision even if an environment such as a fluctuation in a source voltage, a fluctuation in a temperature or the like in a device for recording information on an optical disc is changed.

(Object 2) To implement the position control of a recording pulse with high precision within a wide range in a small circuit scale.

In order to attain the above-mentioned (Object 1), the present invention provides an information recording device for recording data onto an optical disc by irradiating laser beam having at least two kinds of power values which are modulated according to data to be recorded.

the present invention provides an information recording device for recording data onto an optical disc by irradiating laser beam having at least two kinds of power values which are modulated according to data to be recorded.

The device comprises a recording pulse generator for generating a recording pulse signal by modulating the data to be recorded and correcting a predetermined edge position of the recording pulse signal by delaying the edge position in a delay section incorporated in the recording pulse generator to output the corrected recording pulse signal, a laser driver for driving a laser while switching a power value according to the recording pulse signal, a delay amount measuring section for measuring a delay amount in the delay section, and a recording pulse position correcting section for correcting the predetermined edge position of the recording pulse based on a result of the measurement of the delay amount in the delay amount measuring section.

The laser driver may comprise a plurality of current sources and a plurality of switches for independently turning on/off the supply of an output current from each of the current sources to the laser. The recording pulse generator may output a plurality of recording pulses to the laser driver to control the turning on/off operation of the switches according to the recording pulses.

The recording pulse generator may include a pulse timing generator for generating a reference pulse signal by modulating the data to be recorded, and a delay amount variable delay section for receiving the reference pulse signal to output a delay pulse capable of changing the delay amount externally.

The delay section of the recording pulse generator may have a plurality of inverter elements having each input and output connected in series and selectors for selecting the output of each of the inverter elements. The recording pulse position correcting section may control selection operation of each selector.

The delay section of the recording pulse generator may have a plurality of buffer elements having each input and output connected in series and selectors for selecting the output of each of the buffer elements. The recording pulse position correcting section may control selection operation of each selector.

The delay section of the recording pulse generator may comprise a voltage-controlled delay element, and the recording pulse position correcting section may control the control voltage of the voltage-controlled delay element to correct the predetermined edge position of the recording pulse.

The delay amount measuring section may measure the delay amount between the input and output of the delay section of the recording pulse generator by using a delay measuring clock signal.

The delay amount measuring section may measure a difference in a delay between two kinds of different outputs of the delay amount of the delay sections provided in the recording pulse generator by using a delay measuring clock signal.

The recording pulse position correcting section may calculate a delay setting value with which the delay amount between the input and output of the delay section in the recording pulse generator is a time of about one channel bit, based on the result of the measurement of the delay amount from the delay amount measuring section, and may correct the predetermined edge position of the recording pulse based on the delay setting value.

The recording pulse position correcting section may calculate a delay set value with which the delay difference between two kinds of outputs having different delay amounts of the delay section in the recording pulse generator is a time of about one channel bit, based on the result of the measurement of the delay amount from the delay amount measuring section, and corrects the predetermined edge position of the recording pulse based on the delay set value.

The recording pulse position correcting section may correct the predetermined edge position of the recording pulse generated by the recording pulse generator to a position which is varied depending on the bit length of a recording mark, a last space length or a last space length.

A method according to the invention is a method for recording data on an optical disc while controlling a laser power by using a recording pulse generated by the recording pulse generator. The method comprises the steps of correcting the edge position of a recording pulse while the data are not recorded, and recording data by using a recording pulse of which edge position is corrected.

An another method according to the invention is a method for recording data on an optical disc while controlling a laser power by using a recording pulse generated by the recording pulse generator. The method comprises the steps of recording data, verifying the recorded data, deciding whether or not an edge position of a recording pulse is to be corrected based on an error status of the recorded data with reference to the result of the verification, and correcting the edge position of the recording pulse only when it is decided that the edge position of the recording pulse is to be corrected based on the result of the decision.

The deciding step may decide whether the edge position of the recording pulse is corrected by reference to the error status of the reproduced data in results of a plurality of verifications previously executed.

The correcting step may measure the delay amount of the delay section in the recording pulse generator, and correct the predetermined edge position of the recording pulse based on the result of the measurement of the delay amount.

The correcting step may include the steps of setting a selection signal value for determining the delay amount of the delay section of the recording pulse generator, reading the result of the measurement of the delay amount for the set selection signal value, calculating by using the result of the measurement of the delay amount, a selection signal value corresponding to a delay amount Tw which is a time equal to one cycle of a clock to be used for the recording pulse generator, and converting a time table related to the edge position of a given recording pulse into a set value table of the selection signal value based on the obtained selection signal value.

The time Tw may be a time corresponding to one channel bit of the record data.

The time table may preferably include time information related to variable position of each edge of the recording pulse. Furthermore, the time table may have individual time information for each mark length of data to be recorded, individual information for each combination of the mark length of the data to be recorded and a last space length, or individual time information for each combination of the mark length of the data to be recorded and a next space length.

The correcting step, in the recording pulse generator including a delay section having a plurality of taps of delay elements, may measure a delay amount for each delay element group including a predetermined number of taps of delay elements, and control the output of the delay section to determine the edge position of the given recording pulse based on the measured delay amount for each delay section group.

The correcting step, in the recording pulse generator including a delay section having a plurality of taps of delay elements, may measure a delay amount for each delay element group comprising delay sections in a predetermined number of taps, calculate a delay profile of the whole delay section based on the measured delay amount for each delay element group, and control the output of the delay section for determining the edge position of the given recording pulse based on the calculated delay profile. The delay profile to be calculated may be a function represented by the same number of polygonal lines as the number of the delay element groups. The correcting step may detect a region where the delay time of the delay section is almost coincident with one cycle of a clock signal, by using the clock signal having a cycle which is equal to or less than a half of the total delay time of the delay section of the recording pulse generator, control the output of the delay section based on the result of the detection, and determine the edge position of the given recording pulse.

In order to attain the above-mentioned (Object 2), a method according to the invention is a method for forming each mark by irradiating power-controlled laser beams on an optical disc according to a recording pulse made of a plurality of pulse chain and for recording data with high precision by suitably controlling a predetermined edge position of the recording pulse. The method comprises the steps of generating a delay clock which is obtained by delaying a recording clock having a Tw/n cycle (Tw is one channel bit of the record data and n is a natural number) used for modulation of record data by a suitably controlled delay amount, and determining the predetermined edge position of the recording pulse by a timing of the delay clock.

An another method according to the invention comprises the steps of generating a delay clock which is obtained by delaying a recording clock having a Tw/n cycle (Tw is one channel bit of the record data and n is a natural number) used for modulation of record data by a suitably controlled delay amount and a reference axis window signal which is pulse-shaped signal, the reference axis window signal having a time width of at least Tw/n synchronized with a rising edge of the recording clock or the falling edge, and having a variable start position by a time unit of Tw/2n, and determining a predetermined edge position of a recording pulse by timings of the delay clock and the reference axis window signal.

When it is necessary to suitably control the predetermined edge position of the recording pulse within a time range of at least d×Tw/2n (d and n are a natural number), the reference axis window signal may be controlled in (d+1) kinds of timings with a time unit of Tw/2n.

A further method according to the invention is a method for recording data on an optical disc, comprising the steps of forming one mark by irradiating a laser beam, the laser beam being power-controlled according to a recording pulse obtained by synthesizing at least one of a first pulse, a multi-pulse chain which is a repetitive waveform having a Tw cycle and a last pulse, and suitably controlling at least one of a leading edge position of the first pulse and a trailing edge position of the last pulse, thereby recording data with high precision, the leading edge position of the first pulse being defined based on a relative relationship between the leading edge position and a rising phase of the multi-pulse chain, the trailing edge position of the last pulse being defined based on a relative relationship between the trailing edge position and a rising phase of the multi-pulse chain. The method comprises the steps of a) generating a first pulse reference clock having a Tw/n cycle, a last pulse reference clock having a Tw/n cycle, a first pulse reference axis window signal and a last pulse reference axis window signal, and b) determining a leading edge position of the first pulse by timings of the first pulse reference clock and the first pulse reference axis window signal, and determining a trailing edge position of the last pulse by timings of the last pulse reference clock and the last pulse reference axis window signal. The first pulse reference clock is obtained by delay-control in a relative time having at least a range of ±Tw/4n (n is natural number) for the rising phase of the multi-pulse chain or a phase with delay by about 180 degrees from the rising phase. The last pulse reference clock is delay-controlled within a time range of ±Tw/4n for the rising phase of the multi-pulse chain or the phase with delay by about 180 degrees from the rising phase. The first pulse reference axis window signal synchronizing with the rising phase of the multi-pulse chain or the phase with delay by about 180 degrees from the rising phase, is a pulse-shaped signal having at least one cycle width of the first pulse reference clock, and has a start position variable by a time unit of Tw/2n. The last pulse reference axis window signal synchronizing with the rising phase of the multi-pulse chain or the phase with delay by about 180 degrees from the rising phase, is a pulse-shaped signal having at least one cycle width of the last pulse reference clock, and has a start position variable by a time unit of Tw/2n.

An another device according to the invention is a device for recording data on an optical disc by irradiating laser beams obtained by switching a power value in response to a recording pulse derived by modulated data to be recorded. The device comprises a recording clock generator for generating a recording clock having a Tw/n cycle, a clock delay section for generating m (m is a natural number) kinds of delay clocks having different delay amounts by delaying the recording clock, a pulse reference signal generator for generating m kinds of pulse reference signals each having at least one cycle width or more of the recording clock, by using the record data and the recording clock, a pulse timing signal generator for generating m kinds of pulse timing signals by associating any one of the m kinds of delay clocks with any one of the m kinds of pulse reference signals, a delay amount controller for controlling the delay amount of the m kinds of delay clocks, and a recording pulse synthesizing section for synthesizing the m kinds of pulse timing signals to obtain recording pulses, whereby m of predetermined edge positions in the recording pulse are made variable.

An another device according to the invention is a device for recording data on an optical disc by irradiating laser beams obtained by switching a power value in response to a recording pulse derived by modulated data to be recorded. The device comprises a recording clock generator for generating a recording clock having a Tw/n cycle (Tw is one channel bit of the data to be recorded, n is a natural number), a clock delay section for generating m (m is a natural number) kinds of delay clocks having different delay amounts by delaying the recording clock, a pulse reference signal generator for generating m kinds of pulse reference signals each having at least one cycle width or more of the recording clock, by using the record data and the recording clock, the pulse reference signal being a pulse shaped signal and capable of changing the start position by a time unit of Tw/2n, a pulse timing signal generator for generating m kinds of pulse timing signals by associating any one of the m kinds of delay clocks with any one of the m kinds of pulse reference signals, a delay amount controller for controlling the delay amount of the m kinds of delay clocks and a timing of the m kinds of pulse reference signals, and a recording pulse synthesizing section for synthesizing the m kinds of pulse timing signals to obtain recording pulses, whereby m of predetermined edge positions in the recording pulse are made variable.

The pulse timing signal generator may comprise m D flip-flops. The m kinds of delay clocks may be connected to clock input terminals of the m D flip-flops respectively, the m kinds of pulse reference signals may be connected to D input terminals of the D flip-flops respectively. Thereby m kinds of pulse timing signals could be retrieved from Q output terminals of the m D flip-flops.

The device may further comprises a delay amount measuring section for measuring the delay amount of the clock delay section, whereby the delay amount controller could control the delay amounts of the m kinds of delay clocks based on the result of the measurement of the delay amount which is obtained by the delay amount measuring section.

An another method according to the invention is a method for recording data on an optical disc while controlling a laser power by using a recording pulse modulated according to record data. The method comprises the steps of detecting a temperature of a device for recording data on the optical disc, deciding a change in the detected temperature, correcting an edge position of a recording pulse only when it is decided that the change in the temperature is equal to or more than predetermined value based on the decision of the change in the temperature and recording data by using the recording pulse having a corrected edge position. The edge position can be corrected based on the supply voltage of the device instead of the temperature of the device.

BRIEF DESCRIPTION OF THE DRAWINGS

FIG. 2 is a block diagram showing an example of the internal structure of a laser driver according to the present invention.

FIG. 4 is a block diagram showing an example of the structure of a recording pulse generator according to the present invention, including a pulse delay section.

FIG. 7 is a diagram illustrating the relationship between a selection signal value and an obtained delay clock output of the clock delay section.

FIGS. 8A, 8B and 8C are graphs representing the relationship between the selection signal value of the clock delay section in various voltage and temperature taps of the device and the delay time of an input-output.

FIGS. 13, 13A and 13B are a signal timing chart illustrating an example of a specific operation to be performed until a recording pulse is generated from modulated data by using a recording pulse generator having the internal structure shown in FIG. 5.

FIGS. 18A and 18B are typical diagrams illustrating a method for generating a timing signal to determine a first pulse rising position SFP according to the present invention.

FIG. 19 is a block diagram showing yet another example of the recording pulse generator according to the present invention.

FIG. 20 is a block diagram showing an example of the structure of the first pulse delay section according to the present invention, using an inverter element.

FIG. 21 is a block diagram showing another example of the structure of the first pulse delay section according to the present invention, using a buffer element.

FIG. 26 shows an example of the conversion of a recording compensation amount from a time table to a set value table in consideration of a variation correction.

DETAILED DESCRIPTION OF THE PREFERRED EMBODIMENTS OF THE INVENTION

A preferred embodiment of an optical disc device for recording information on an optical disc according to the present invention will be described in detail with reference to the accompanying drawings.

<Structure of Optical Disc Device>

Figure 1:
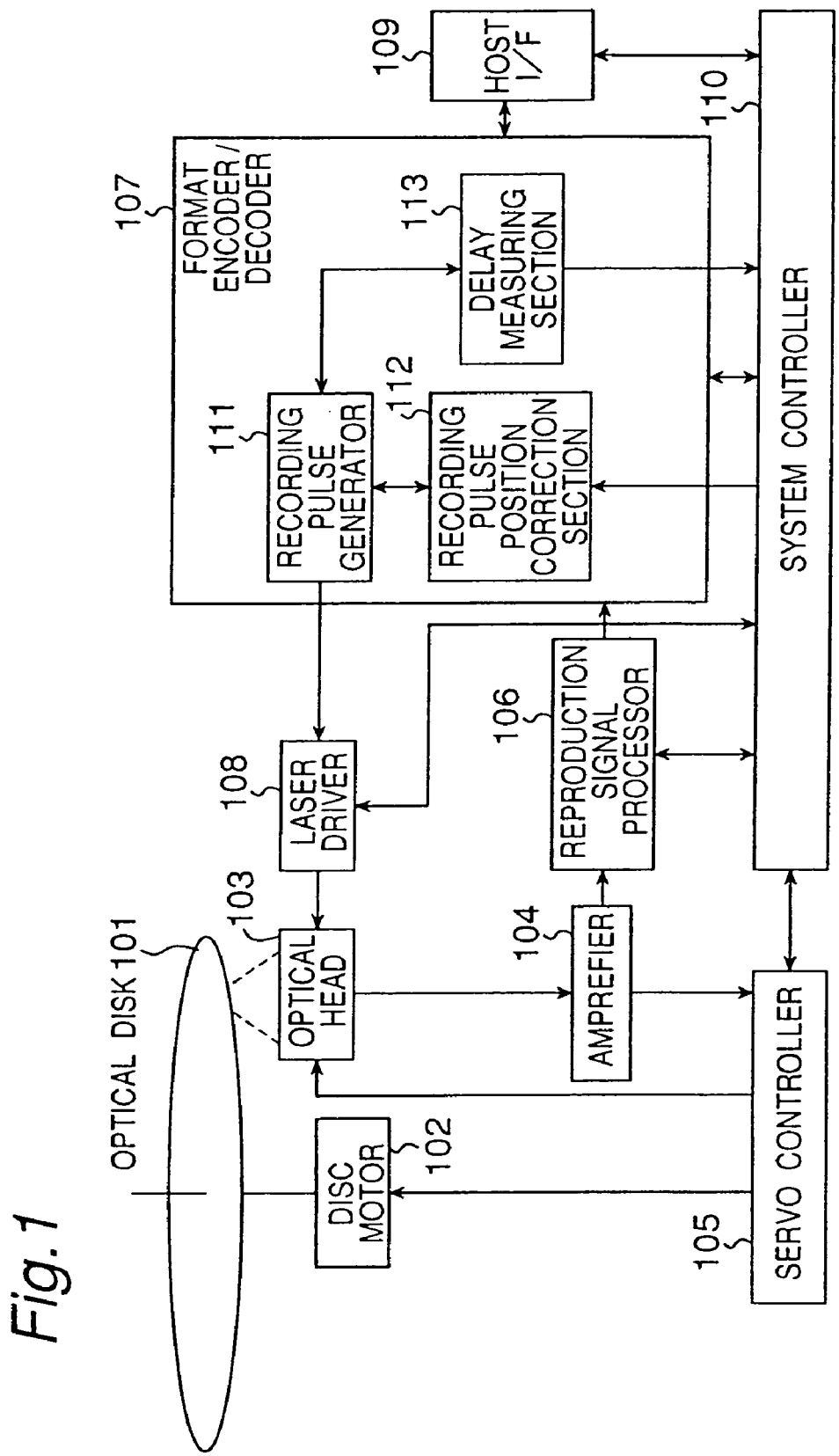
FIG. 1 is a block diagram showing the structure of an optical disc device according to the present invention.

FIG. 1 is a block diagram showing the structure of an optical disc device according to the present invention. In FIG. 1, a disc motor 102 serves to rotate an optical disc 101 at a predetermined number of rotations. An optical head 103 comprises a semiconductor laser, an optical system and a photo detector which are not shown. A laser beam emitted from the semiconductor laser is collected by the optical system and an optical spot is irradiated on the recording face of the optical disc 101, thereby recording and reproducing data. Moreover, light reflected from the recording face is collected by the optical system in the optical head 103 and is then converted into a current by the photo detector, and furthermore, is voltage-converted and amplified by an amplifier 104 and is output as a reproduction signal.

A servo controller 105 performs the control of the rotation of the disc motor 102, the control for moving the optical head 103 in the radial direction of the optical disc 101, focus control for focusing the optical spot on the recording face and tracking control for tracking the optical spot on the center of a track. A focus error signal (an electric signal indicating the shift of the optical spot from the recording face of the optical disc 101 in an almost vertical direction to the recording face) and a tracking error signal (an electric signal indicating the shift of the optical spot from a predetermined track on the recording face of the optical disc 101) in the reproduction signals which are outputs of the amplifier 104 are used for the focus control and the tracking control.

A reproducing signal processor 106 fetches a signal component corresponding to data recorded on the optical disc 101 from the regenerative signal which is the output of the amplifier 104, digitizes the fetched signal, and generates a read clock and read data synchronous with the read clock from the digitized data and a reference clock by means of a built-in PLL (Phase Locked Loop).

A laser driver 108 serves to generate a laser driving signal such that the semiconductor laser provided in the optical disc 103 emits light with a reproducing power during the reproduction of an address and data and a recording power during recording.

A format encoder/decoder 107 serves to reproduce address information recorded on the optical disc 101 based on the read clock and the read data which are output from the reproducing signal processor 106, and to generate and supply each timing signal required for recording and reproduction in a timing synchronous with the sector of the optical disc 101 on the basis of a reproduced address position. For example, data can be recorded and reproduced in a correct timing by outputting a timing signal such as a read gate required for the digitizing addresses or data and PLL processes to the reproducing signal processor 106 and outputting, to the laser driver 108, a timing signal such as write gate for permitting the light emission having a laser power for data recording.

Moreover, during the recording, the format encoder/decoder 107 adds redundant data such as an error correction code to user data supplied from the outside of the device through a host interface 109, further processes a bit sequence modulated according to a predetermined format by a built-in recording pulse generator 111 to make a recording pulse signal and outputs the recording pulse signal to the laser driver 108. During the reproduction, the format encoder/decoder 107 performs the demodulation and error correcting processes of the address information and data recorded on the optical disc 101 based on the read clock and the read data which are output from the reproducing signal processor 106, and transmits the corrected data to the outside of the device through the host interface 109.

Furthermore, a recording pulse position correction section 112 and a delay amount measuring section 113 are provided in the format encoder/decoder 107. The recording pulse position correction section 112 serves to set the position of the recording pulse signal generated by the recording pulse generator 111 and to make the specific edge position of the recording pulse signal variable. The delay amount measuring section 113 serves to measure the delay amount of a pulse generated by the recording pulse generator 111. The specific operations of the delay amount measurement and the recording pulse position correction will be described later.

A system controller 110 interprets a command (an instruction) supplied from the outside of the device through the hose interface 109, and controls the operation of the whole device, that is, each component of the device such as the servo controller 105, the reproducing signal processor 106, the format encoder/decoder 107, the laser driver 108, the host interface 109 and the like such that data are recorded and reproduced on the predetermined section of the optical disc 101.

FIG. 2 is a block diagram illustrating an example of the internal structure of the laser driver 108. An input to the laser driver 108 includes a power setting 205 for determining a laser power value and three kinds of recording pulses 206a, 206b and 206c modulated according to data to be recorded in the recording pulse generating portion 111. A method for generating the recording pulses 206a, 206b and 206c by the recording pulse generator 111 will be described in detail below. An output sent from the laser driver 108 includes an output current 207 for emitting light from the semiconductor laser 201 provided in the optical head 103.

The laser driver 108 comprises a current value controller 204, four current sources 203a, 203b, 203c and 203d and three switches 202a, 202b and 202c. The current value controller 204 controls respective output current values of the four current sources 203a, 203b, 203c and 203d on receipt of the power setting 205 from the system controller 110. The switch 202a turns on/off the supply of the output current of the current source 203a to the semiconductor laser 201 in response to the recording pulse 206a supplied from the recording pulse generator 111.

Similarly, the switch 202b turns on/off the supply of the output current of the current source 203b to the semiconductor laser 201 in response to the recording pulse 206b. In the same way, the switch 202c turns on/off the supply of the output current of the current source 203c to the semiconductor laser 201 in response to the recording pulse 206c. The current source 203d is directly connected to the anode side of the semiconductor laser 201 provided in the optical head 103, and the output current of the current source 203d is always supplied as a base current to the semiconductor laser 201.

Each of the switches 202a, 202b and 202c is connected in parallel on the anode side of the semiconductor laser 201. Consequently, an output current 207 flowing to the semiconductor laser 201 is the total of the output currents of the current sources 203a, 203b and 203c which are supplied through the switches 202a, 202b and 202c and the output current of the current source 203d. Thus, it is apparent that the power of the laser beam, and furthermore, the power of an optical spot collected on the optical disc are controlled according to a current value to be sent to the semiconductor laser 201.

Figure 3A:
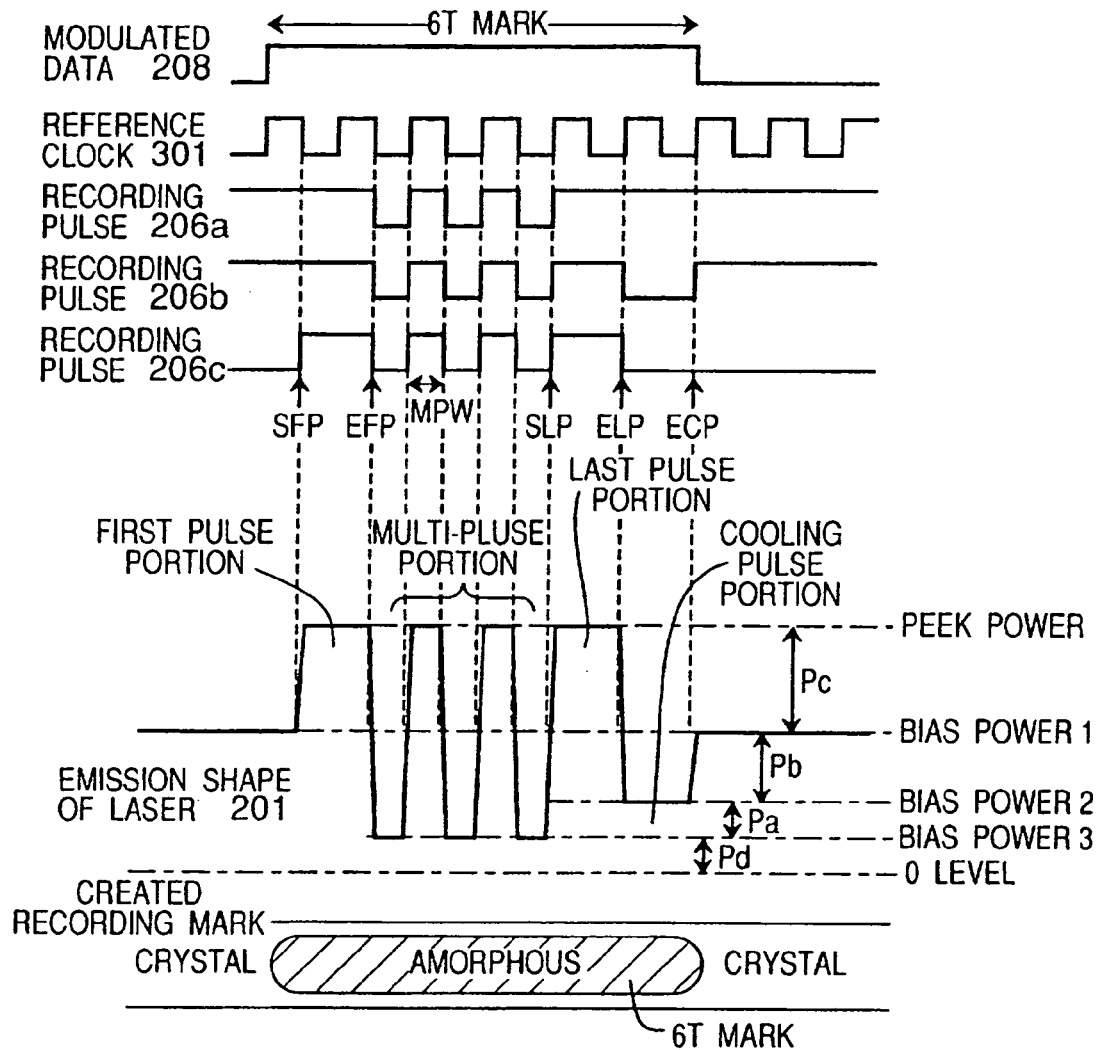
FIG. 3A is a typical diagram illustrating an example of each of the shape of a recording pulse, the light emitting waveform of a semiconductor layer and a recording mark to be formed according to the present invention.

FIG. 3A is a diagram typically illustrating an example of the generation timings of the recording pulse 206a, 206b and 206c which are obtained by the recording pulse generator 111, an example of the light emitting waveform of the semiconductor laser 201 and a recording mark correspondingly formed on the optical disc. In the present examples, a 1 and 0 bit sequence modulated by modulation rule where the run-length (the number of bits 0 which continue from a bit 1 to a bit 1) is restricted within a range of 2 to 10 is modulated in NRZI (Non Return to Zero Inverted) format for inverting the logic of a signal with only the bit 1. Then data recording is done in the PWM method of the prior art. More specifically, it is assumed that the widths of the H level/the L level of the NRZI, that is, a recording mark length/a space length are limited within a range of 3 T to 11 T, respectively.

In FIG. 3A, a time passes in the direction from left to right, and a modulated data 208 is an input to the recording pulse generator 111. In the drawing, a waveform corresponding to a 6 T mark is shown. A pulse reference clock 301 has a cycle which is a time length of one channel bit, and is used as the reference of a recording pulse generating process in the recording pulse generator 111. Each of the recording pulses 206a, 206b and 206c is generated in a timing shown in FIG. 3A according to the timings of the modulated data 208 and the pulse reference clock 301. The light emitting waveform of the semiconductor laser 201 has a shape shown in FIG. 3A according to the timing of each of the recording pulses 206a, 206b and 206c.

A light emitting waveform for recording one mark (6 T mark in the present example) is divided into a plurality of pulse portions which will be sequentially referred to as a first pulse portion, a multi-pulse portion, a last pulse portion and a cooling pulse portion on a time basis. For a recording method for changing a recording film by heat that is applied to a phase change optical disc, it has been known that a method for forming one recording mark by a plurality of pulse portions in time series as in the present embodiment is effective. For example, the multi-pulse portion intermittently gives a high power and a low power, thereby preventing the shape of the mark from having a teardrop shape in the case where a comparatively long mark is to be recorded as described in the prior art. Moreover, the cooling pulse portion serves to interrupt the influence of the heat to a next mark to be recorded.

On the other hand, the longitudinal direction of the light emitting waveform, that is, an amplitude indicates the light emitting power of a laser in FIG. 3A and a power value thereof is divided into four kinds of a bias power 3, a bias power 2, a bias power 1 and a peak power in ascending order. In the case of the phase change recording, a power corresponding to the bias power 1 is irradiated to crystallize the phase of the recording film, and a power corresponding to the peak power is irradiated to make the phase of the recording film amorphous. Basically, a portion made amorphous by the irradiation of the peak power is referred to as a recording mark. Moreover, the power of each of the bias power 2 and the bias power 3 temporarily reduces heat to be given to the recording film.

<Operation of Laser Driver>

Next, description will given to the relationship between the four kinds of powers and the operation of the laser driver 108 described with reference to FIG. 2.

First of all, the bias power 3 can be implemented by turning off all the switches 202a, 202b and 202c, that is, by setting all the recording pulses 206a, 206b and 206c to the L (LOW) level in the example of FIG. 2. At this time, only the output current of the current source 203d is supplied to the semiconductor laser 201 so that the semiconductor laser 201 emits light with a power equivalent to an amplitude Pd.

The bias power 2 can be implemented by turning on only the switch 202a, turning off the switches 202b and 202c, that is, by setting the recording pulse 206a to the H (HIGH) level and setting the recording pulses 206b and 206c to the L level. At this time, the sum of the output current of the current source 203a and the output current of the current source 203d is supplied to the semiconductor laser 201 so that the semiconductor laser 201 emits light with a power equivalent to an amplitude (Pa+Pd).

The bias power 1 can be implemented by turning on the switches 202a and 202b, turning off the switch 202c, that is, by setting the recording pulses 206a and 206b to the H level and setting the recording pulse 206c to the L level. At this time, the sum of the output currents of the current sources 203a, 203b and 203d is supplied to the semiconductor laser 201 so that the semiconductor laser 201 emits light with a power equivalent to an amplitude (Pa+Pb+Pd). The peak power can be implemented by turning on all the switches 202a, 202b and 202c, that is, by setting all the recording pulses 206a, 206b and 206c to the H level. At this time, the sum of the output currents of all the four current sources 203a, 203b, 203c and 203d is supplied to the semiconductor laser 201 so that the semiconductor laser 201 emits light with a power equivalent to an amplitude (Pa+Pb+Pc+Pd).

The power amplitudes Pa, Pb, Pc and Pd are controlled by the power setting 205 to be performed for the current value controller 204, respectively. For example, the current value controller 204 separately holds set values related to the power amplitudes Pa, Pb, Pc and Pd, and independently controls the current of each of the current sources 203a, 203b, 203c and 203d to obtain a power amplitude corresponding to a value set by the power setting 205. By this structure, the power amplitudes Pa, Pb, Pc and Pd can be independently controlled, respectively.

Moreover, a first pulse rising position (which will be hereinafter referred to as "SFP"), a first pulse falling position (which will be hereinafter referred to as "EFP"), a multi-pulse width (which will be hereinafter referred to as "MPW"), a last pulse rising position (which will be hereinafter referred to as "SLP"), a last pulse falling position (which will be hereinafter referred to as "ELP") and a cooling pulse rising position (which will be hereinafter referred to as "ECP") can be independently changed in the timings of the recording pulses 206a, 206b and 206c, respectively.

Figure 3B:
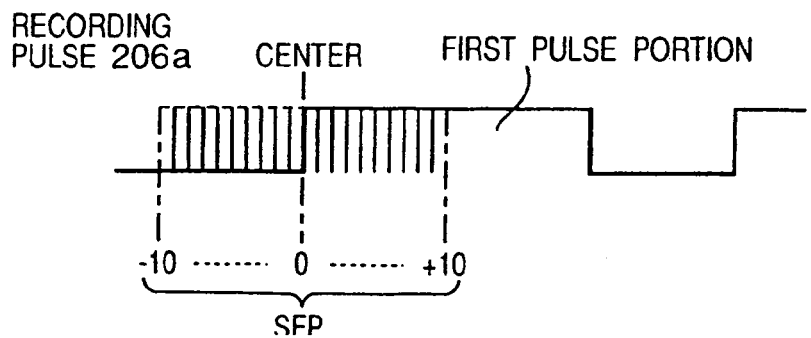
FIG. 3B is a diagram illustrating the shift of a start (rising) position of a first pulse section.

FIG. 3B is a timing chart showing the enlarged recording pulse 206a in the first pulse rising portion, illustrating an example of the first pulse rising position SFP. In the drawing, a central position has a timing synchronous with the falling of the pulse reference clock 301 (see FIG. 3A) and is coded to a set value of SFP=0 for the SFP. Moreover, the setting of the SFP is prepared for every predetermined number of steps before and after the central position, for example, for every ten steps at every 500 picosecond, and the respective set values are coded to values indicative of −10 to +10. Accordingly, the set value of the SFP with an integer ranging from −10 to +10 is given to the recording pulse generator 111. Consequently, the rising position can be changed every 500 picosecond within the range of −5 nanoseconds to +5 nanoseconds as shown in FIG. 3B, for example.

While the first pulse rising position (SFP) has been described in the example of FIG. 3B, the other setting operations (EFP, MPW, SLP, ELP, ECP) which can be changed are also carried out in the same manner. For example, the last pulse falling position (ELP) is set in synchronization with the falling of the pulse reference clock 301. At this time, the falling position before and after the central position can be changed on the basis of the central position by causing a shift to correspond to a set value of 0 of the ELP and setting the set value of the ELP within the range of a predetermined integer around 0.

Moreover, for a duty ratio of each pulse (which will be hereinafter referred to as "a multi-pulse") of the multi-pulse portion, the falling position of the multi-pulse can be changed with the multi-pulse width set value MPW by synchronizing the rising timing of the multi-pulse with the rising timing of the pulse reference clock 301. For example, if a set value is determined such that the duty ratio is 50% with the multi-pulse width set value MPW=0, where the ratio of the light emitting time of the peak power to the light emitting time of the bias power 3 is 1 to 1, the width can be changed before and after for the duty ratio of 50% by setting the MPW within a predetermined integer range about 0.

Thus, the change of the position of the recording pulse or the duty ratio is generally referred to as "recording compensation" and a variation in the position of the recording pulse or the duty ratio is generally referred to as "a recording compensation amount". It is progressing to attempt to reduce the influence of thermal interference between the recording marks and the like and to increase a recording density by the recording compensation.

<Operation of Recording Pulse Generating Section>

Figure 12:
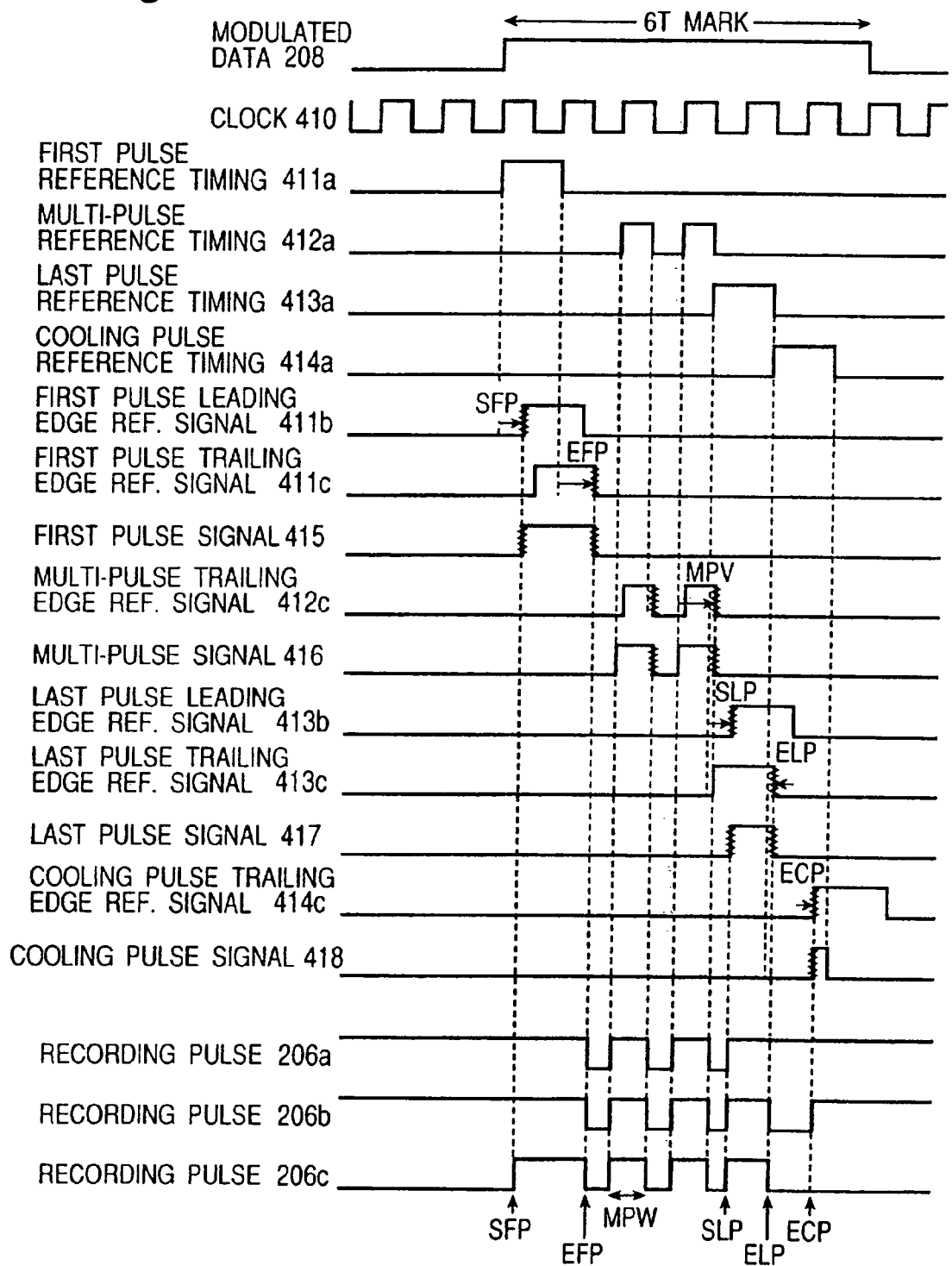
FIG. 12 is a signal timing chart illustrating an example of a specific operation to be performed until a recording pulse is generated from modulated data by using a recording pulse generator having the internal structure shown in FIG. 4.

FIG. 4 is a block diagram showing an example of the internal structure of the recording pulse generator 111 according to the present embodiment. Moreover, FIG. 12 is a signal timing chart illustrating an example of the specific operation to be performed until recording pulses 206a, 206b and 206c are generated from modulated data 208 by means of a recording pulse generator 111 having the internal structure shown in FIG. 4. FIG. 12 shows an example of a waveform obtained when recording a 6 T mark in the case where PWM recording is to be performed by using a modulation rule having a run length limited within a range of 2 to 10 in the same manner as in FIG. 3.

In FIG. 4, a pulse timing generator 401 generates and outputs four kinds of reference timing, that is, a first pulse reference timing 411a, a multi-pulse reference timing 412a, a last pulse reference timing 413a and a cooling pulse reference timing 414a on receipt of the modulated data 208 supplied from another block and a clock 410 synchronized therewith (one cycle is one channel bit). The four kinds of reference timings act as references for forming timing of portions corresponding to a first pulse portion, a multi-pulse portion, a last pulse portion and a cooling pulse portion, respectively.

The first pulse reference timing 411a is a pulse signal having the H level for one cycle with a clock 410 from the rising edge of the modulated data 208 as shown in FIG. 12.

The multi-pulse reference timing 412a is obtained by exactly outputting third and fourth clock waveforms with the clock 410 counted from the rising edge of the modulated data 208, and is kept at the L level in other portions. The foregoing corresponds to the 6 T mark. More generally, the multi-pulse reference timing 412a for an mT mark (m represents an integer of 3 to 11) is obtained by exactly outputting clock waveforms for (m-4) cycles from the third waveform with the clock 410 counted from the rising edge of the modulated data 208 and is kept at the L level in other portions. In the case of m=3, 4, that is, a 3 T mark or a 4 T mark, the multi-pulse reference timing 412a is kept at the L level.

The last pulse reference timing 413a is a pulse signal having the H level for one cycle from the falling position of the clock 410 which is obtained by going back from the falling edge of the modulated data 208 by 2.5 cycles as shown in FIG. 12.

The cooling pulse reference timing 414a is a pulse signal having the H level for one cycle from the falling position of the clock 410 which is obtained by going back from the falling edge of the modulated data 208 by 1.5 cycles as shown in FIG. 12.

The pulses 411a, 412a, 413a and 414a generated by the pulse timing generating portion 401 are input to corresponding pulse delay sections 402, 403, 404 and 405, respectively. Moreover, SFP and EFP which are set by a recording pulse position correction section 112 are given to the first pulse delay section 402. Similarly, MPW is given to the multi-pulse delay section 403, SLP and ELP are given to the last pulse delay section 404 and ECP is given to the cooling pulse delay section 405.

The first pulse delay section 402 outputs a first pulse leading edge reference signal 411b and a first pulse trailing edge reference signal 411c which are obtained by delaying a first pulse reference timing 411a by a predetermined time based on the SFP and the EFP set by the recording pulse position correction section 112. The first pulse leading edge reference signal 411b and the first pulse trailing edge reference signal 411c are signals for determining the leading and trailing edges of the first pulse portion and are input to a first logic device 406a. The first logic device 416a performs AND operation between the above-mentioned two inputs when a set value SFP is greater then a set value EFP, and performs OR operation between the above-mentioned two inputs when the set value SFP is smaller than the set value EFP. Thus, the result of AND or OR operation is output as a first pulse signal 415. FIG. 12 shows the latter as an example, in which the OR of the first pulse leading edge reference signal 411b and the first pulse trailing edge reference signal 411c acts as the first pulse signal 415.

The multi-pulse delay section 403 outputs the multi-pulse trailing edge reference signal 412c obtained by delaying the multi-pulse reference timing 412a by a predetermined time based on the value of MPW which is set by the recording pulse position correction section 112. When the set value of MPW is 0 or a positive value, that is, the duty ratio in the multi-pulse portion is 50% or more, the falling edge of the multi-pulse trailing edge reference signal 412c determines the trailing edge of the multi-pulse portion. Moreover, when the set value of MPW is a negative value, that is, the duty ratio of the multi-pulse portion is less than 50%, the rising edge of the multi-pulse trailing edge reference signal 412c determines the trailing edge of the multi-pulse portion. The multi-pulse reference timing 412a and the multi-pulse trailing edge reference signal 412c are input to a second logic device 407a. In the second logic device 407a, the above-mentioned two inputs are ORed when the set value of MPW is 0 or a positive number, while the multi-pulse reference timing 412a and the inversion of the multi-pulse trailing edge reference signal 412 are ANDed when the set value of MPW is a negative number. FIG. 12 shows the former as an example in which the OR operation of the multi-pulse reference timing 412a and the multi-pulse trailing edge reference signal 412c give a multi-pulse signal 416.

The last pulse delay section 404 outputs a last pulse leading edge reference signal 413b and a last pulse trailing edge reference signal 413c which are obtained by delaying the multi-pulse reference timing 413a by a predetermined time based on the values of SLP and ELP which are set by the recording pulse position correction section 112. The last pulse leading edge reference signal 413b and the last pulse trailing edge reference signal 413c are signals for determining the leading and trailing edges of the last pulse portion, respectively, and are input to a first logic device 416b. In the first logic device 416b, the above-mentioned two inputs are ANDed when the set value of SLP is greater than the set value of ELP, and are ORed when the set value of SLP is smaller than the set value of ELP. The result of the AND and OR operations are output as a last pulse signal 417. FIG. 12 shows the former as an example in which the AND operation of the last pulse leading edge reference signal 413b and the last pulse trailing edge reference signal 413c give the last pulse signal 417.

The cooling pulse delay section 405 outputs the cooling pulse trailing edge reference signal 414c obtained by delaying the cooling pulse reference timing 414a by a predetermined time based on the value of ECP which is set by the recording pulse position correction section 112. When the value of ECP is a positive number, the falling edge of the cooling pulse trailing edge reference signal 414c determines the trailing edge of the cooling pulse portion. Moreover, when the value of ECP is a negative number, the rising edge of the cooling pulse trailing edge reference signal 414c determines the trailing edge of the cooling pulse portion. The cooling pulse reference timing 414a and the cooling pulse trailing edge reference signal 414c are input to a second logic device 407b. In the second logic device 407b, the above-mentioned two inputs are ORed when the set value of ECP is a positive number, while the cooling pulse reference timing 414a and the inversion of the cooling pulse trailing edge reference signal 414c are ANDed when the value of ECP is a negative number. FIG. 12 shows the latter as an example in which the result of the AND operation of the cooling pulse reference timing 414a and the cooling pulse trailing edge reference signal 414c provide a cooling pulse signal 418.

The first pulse signal 415, the multi-pulse signal 416, the last pulse signal 417 and the cooling pulse signal 418 which are generated as described above are input to a pulse synthesizing section 408. The pulse synthesizing section 408 synthesizes and outputs three recording pulses 206a, 206b and 206c from the above-mentioned four kinds of signals.

FIG. 12 shows an example of the waveform of the synthesized recording pulses 206a, 206b and 206c.

As described above with reference to FIG. 4, the recording pulse generator 111 can easily generate a recording and compensated pulse by incorporating a pulse delay section for delaying a pulse therein.

<Specific Structure of Pulse Delay Section>

Next, an example of the structures of pulse delay sections 402 to 405 will be described by taking the first pulse delaying section 402 as an example. FIG. 20 is a block diagram showing an example of the internal structure of the first pulse delay section 402 which is one of components of the recording pulse generator 111 shown in FIG. 4.

In FIG. 20, the first pulse delay section 402 is a delay circuit constituted by inverter elements 2001 connected in series in a plurality of taps. A first pulse reference timing 411a acting as an external input is connected to the inverter element 2001 in a first tap. The number of the taps of the inverter elements 2001 is set such that at least a delay amount to satisfy the variable ranges of the positions of rising and falling edges of a first pulse portion can be obtained. For example, if the variable range of the position of the rising edge of the first pulse portion is set within 20 nanoseconds after the rising edge of the modulated data 208 and the variable range of the position of the falling edge is set within 20 nanoseconds after one channel clock cycle from the rising edge of the modulated data 208, 20 nanoseconds is required for a total delay amount. On the other hand, if a delay amount for two taps of the inverter element 2001 is 0.5 nanosecond, 20÷0.5=40 is obtained and at least 80 taps of inverter elements 2001 are required.

A selecting section 2002 is connected to outputs in even-numbered taps of each inverter element 2001, selects any one of the outputs of the inverter elements 2001 in the even-numbered taps in response to a selection signal 419a corresponding to a first pulse leading position set SFP, and outputs the selected output as the first pulse leading edge reference signal 411b. Similarly, a selecting section 2003 is connected to outputs in even-numbered taps of each inverter element 2001, selects any one of the outputs of the inverter elements 2001 in the even-numbered taps in response to a selection signal 419b corresponding to a first pulse trailing position set EFP, and outputs the selected output as the first pulse railing edge reference signal 411c.

As described above, the first pulse delay section 402 can easily be constituted by combining the inverter element 2001 for sequentially delaying the first pulse reference timing 411a acting as an input pulse and the selecting sections 2002 and 2003 for selecting the output of each inverter element. This structure can similarly be applied to other delay sections used for the recording pulse generator 111 shown in FIG. 4, that is, the multi-pulse delay section 403, the last pulse delay section 404 and the cooling pulse delay section 405. However, each of the multi-pulse delay section 403 or the cooling pulse delay section 405 has only one delay output. Therefore, one selecting section for selecting the output of each inverter element may be required.

Moreover, the minimum adjusting step of each edge position of the recording pulse which is the resolution of a recording compensation amount is equivalent to a delay time passing about two inverter elements.

While the inverter element 2001 is used as the delay element in the example of FIG. 20, another device can also be used.

FIG. 21 is a block diagram showing an example in which the first pulse delay section 402 is constituted by using a buffer element 2101 in place of the inverter element 2001.

Also in the structure shown in FIG. 21, a pulse delay output having a variable delay amount can be obtained by selecting and outputting a part or all of the outputs of the buffer element 2101 by using the selecting sections 2002 and 2003 in the same manner as in the structure shown in FIG. 20.

Figure 22A:
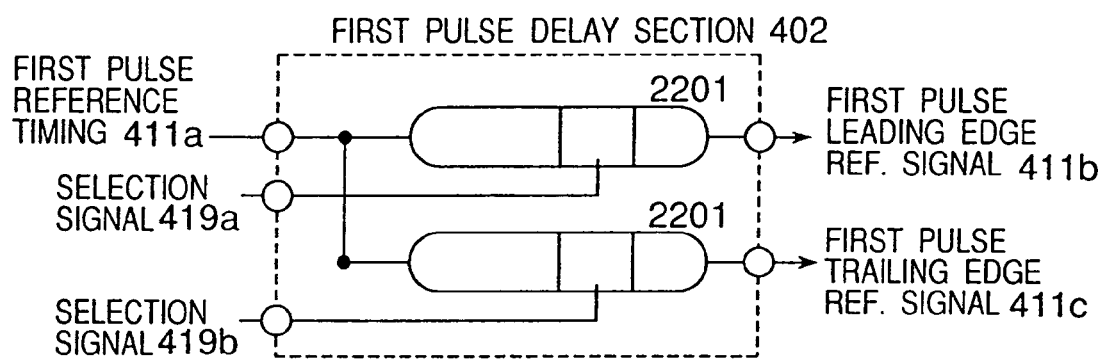
FIG. 22A is a block diagram showing a further example of the structure of the first pulse delay section according to the present invention, using a voltage-controlled delay element.
Figure 22B:
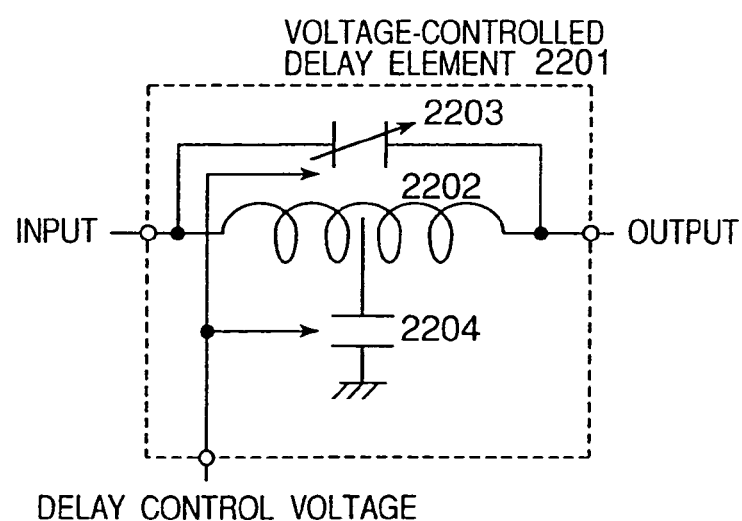
FIG. 22B is a diagram showing an example of the specific structure of the voltage-controlled delay element.

FIG. 22A is a block diagram showing an example in which the first pulse delay section 402 is constituted by using a voltage-controlled delay element 2201 in place of the inverter element or the buffer element. The voltage-controlled delay element 2201, as illustrated in FIG. 22B, is a kind of phase filter comprising an inductor 2202 inserted between an input and an output, a variable capacitance capacitor 2203 inserted in parallel with the inductor 2202 and a variable capacitance capacitor 2204 inserted between the middle position of the inductor 2202 and a ground voltage, and serves to control the capacitance of the two kinds of variable capacitance capacitors 2203 and 2204 with a delay control voltage, thereby changing a phase shift amount between the input and the output, that is, a delay amount between the input and the output. If two kinds of pulse delay outputs are to be obtained, they can be implemented with two built-in voltage-controlled delay elements 2201 by controlling the delay amount by separate external control voltages, respectively.

Since such a structure as to utilize the inverter element and the buffer element shown in FIGS. 20 and 21 as the delay elements can generally be obtained by combining devices prepared as standard cells in a CMOS process, a bipolar process and the like, it is possible to obtain an advantage that an integrated circuit (IC) can be obtained comparatively easily and inexpensively. However, the resolution of the recording compensation amount, that is, the minimum adjusting step of the recording pulse is defined by the delay amount of two inverter elements or one buffer element. In some cases, therefore, the intended delay resolution cannot be obtained depending on the degree of fineness of a process. On the other hand, with such a structure as to utilize the voltage-controlled delay element as shown in FIG. 22, it is possible to change the delay amount in analog by an external control voltage. Therefore, a theoretically infinitesimal resolution can be obtained. However, it is very hard to constitute an ideal phase filter, and a device having very high precision is required to constitute a device having an excellent delay resolution. Therefore, a cost is comparatively increased. In consideration of a performance such as the intended resolution and delay precision and the like, it is desirable that the most proper device should be selected and used.

While the example of the internal structure of the recording pulse generator 111 has been described with reference to FIG. 4, a structure capable of reducing a circuit scale required for the delay section will be described below as compared with the structure for delaying a pulse as shown in the example of FIG. 4.

<Another Specific Structure of Recording Pulse Generator>

Figure 5:
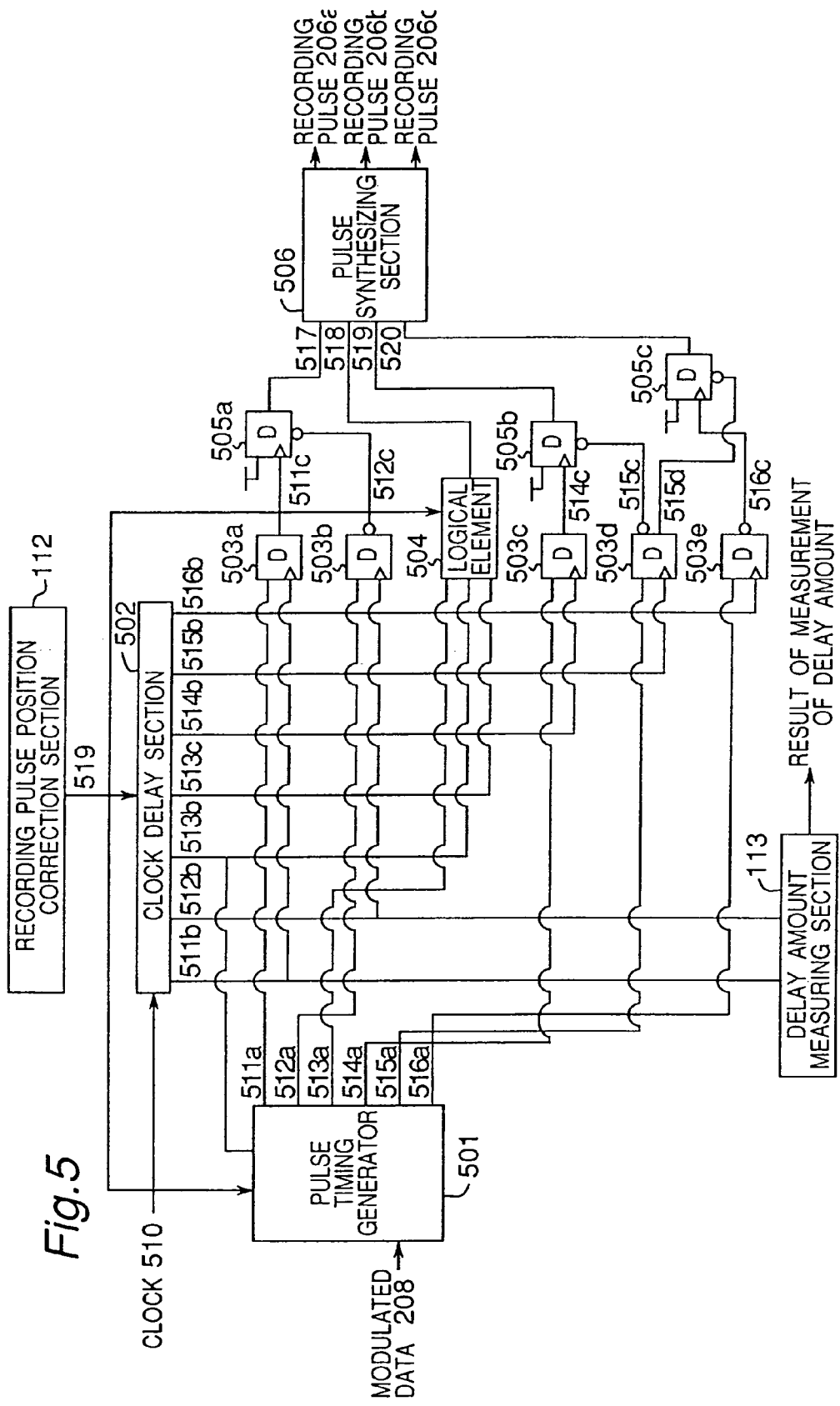
FIG. 5 is a block diagram showing another example of the structure of the recording pulse generator according to the present invention, including a clock delay section.
Figure 13B:
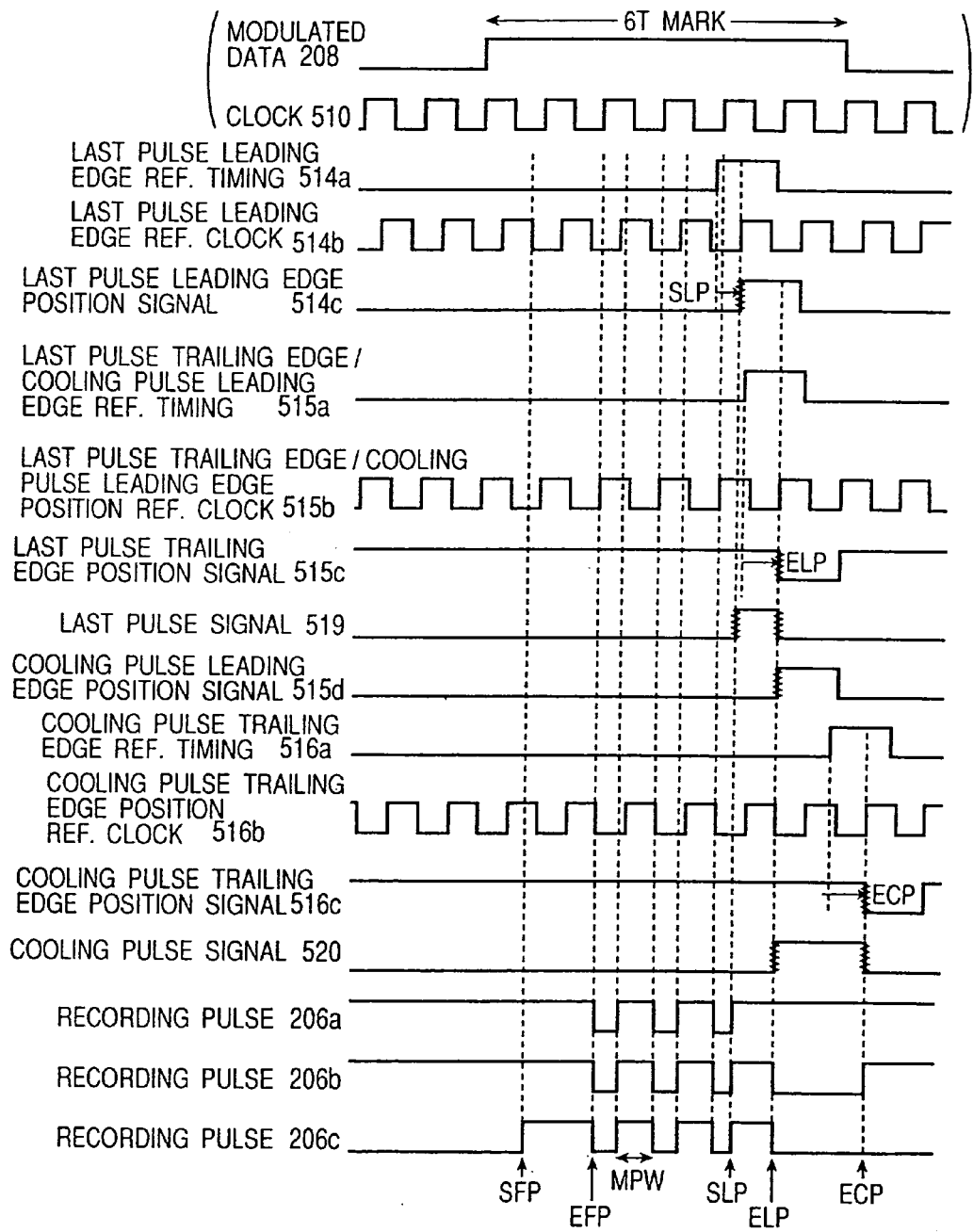

FIG. 5 is a block diagram showing an example of the internal structure of a recording pulse generator 111 which is different from the recording pulse generator shown in FIG. 4. Moreover, FIG. 13 is a signal timing chart illustrating an example of the specific operation to be performed until recording pulses 206b, 206b and 206c are generated from modulated data 208 by means of a recording pulse generator 111 having the internal structure shown in FIG. 5. FIG. 13 shows an example of a waveform obtained when recording a 6 T mark in the case where PWM recording is to be performed by using a modulation rule having a run length limited within a range of 2 to 10 in the same manner as in FIG. 12.

In FIG. 5, a pulse timing generator 501 generates a first pulse reference leading edge reference timing 511a, a first pulse trailing edge reference timing 512a, a multi-pulse reference timing 513a, a last pulse leading edge reference timing 514a, a last pulse trailing edge/cooling pulse leading edge reference timing 515a and a cooling pulse trailing edge reference timing 516a on receipt of the modulated data 208 supplied from another block.

A clock delay section 502 inputs a clock 510 synchronous with the modulated data 208 (one cycle is one channel bit), and outputs seven kinds of delay clocks, that is, a first pulse leading edge position reference clock 511b, a first pulse trailing edge position reference clock 512b, a multi-pulse leading edge reference clock 513b, a multi-pulse trailing edge reference clock 513c, a last pulse leading edge position reference clock 514b, a last pulse trailing edge position/cooling pulse leading edge position reference clock 515b and a cooling pulse trailing edge position reference clock 516b based on SFP, EFP, MPW, SLP, ELP and ECP set by the recording pulse position correction section 112.

The multi-pulse leading edge reference clock 513b is a clock signal which acts as the reference of all pulse edges and defines the leading edge position of the multi-pulse portion. Each of the set values of SFP, EFP, MPW, SLP, ELP and ECP is defined based on a time relationship with the multi-pulse leading edge reference clock 513b. For example, in the case of the example of the waveform in FIG. 13, each of the set values of SFP and EFP is defined with a time relationship for the falling edge of the multi-pulse leading edge position reference clock 511b. Each of the set values of MPW, SLP, ELP and ECP is defined with a time relationship for the rising edge of the multi-pulse leading edge position reference clock 511b.

As shown in FIG. 13, moreover, the first pulse leading edge reference timing 511a is a pulse signal having the H level for one cycle from the rising edge of the multi-pulse leading edge reference clock 513b of the first wave starting from the rising edge of the modulated data 208.

The first pulse trailing edge reference timing 512a is a pulse signal having the H level for one cycle from the falling edge of the multi-pulse leading edge reference clock 513b of the first wave starting from the rising edge of the modulated data 208 as shown in FIG. 13.

The multi-pulse reference timing 513a is a gate signal having the H level for a period from the rising edge of the multi-pulse leading edge reference clock 513b of the third wave of the rising edge of the modulated data 208 to the rising edge of the multi-pulse leading edge reference clock 513b of the fifth wave. The foregoing corresponds to a 6 T mark. More generally, the multi-pulse reference timing 513a for an MT mark (M is an integer from 3 to 11) is set to the H level for a (M−4) channel bit cycle at the rising edge of the multi-pulse leading edge reference clock 513b of the third wave from the rising edge of the modulated data 208. In the case of M=3, 4, that is, a 3 T mark or a 4 T mark, the multi-pulse reference timing 412a is kept at the L level.

Moreover, the last pulse leading edge reference timing 514a, the last pulse trailing edge/cooling pulse leading edge reference timing 515a and the cooling pulse trailing edge reference timing 516a are pulse signals having the H level for one cycle at the fourth wave rising edge, the fifth wave rising edge and the sixth wave falling edge in the multi-pulse leading edge reference clock 513b from the rising edge of the modulated data 208 as shown in FIG. 13. The foregoing corresponds to a 6 T mark. More generally, the last pulse leading edge reference timing 514a, the last pulse trailing edge/cooling pulse leading edge reference timing 515a and the cooling pulse trailing edge reference timing 516a are pulse signals having the H level for one cycle at the (M−2)th wave falling edge, the (M−1)th wave rising edge and the Mth falling edge of the multi-pulse leading edge reference clock 513b from the rising edge of the modulated data 208, respectively.

The first pulse leading edge reference timing 511a and the first pulse leading edge position reference clock 511b are connected to the D input and the clock input of a D flip-flop 503a, and the Q output of the D flip-flop 503a acts as a first pulse leading edge position signal 511c.

The first pulse leading edge reference timing 512a and the first pulse falling edge position reference clock 512b are connected to the D input and the clock input of a D flip-flop 503b, and the Q inverted output of the D flip-flop 503b acts as a first pulse trailing edge position signal 512c.

The last pulse leading edge reference timing 514a and the last pulse leading edge position reference clock 514b are connected to the D input and the clock input of a D flip-flop 503c, and the Q output of the D flip-flop 503c acts as a last pulse leading edge position signal 514c.

The last pulse trailing/cooling pulse leading edge reference timing 515a and the last pulse trailing edge position/ cooling pulse leading edge reference clock 515b are connected to the D input and the clock input of a D flip-flop 503d, the Q inverted output of the D flip-flop 503d acts as a last pulse trailing edge position signal 515c and the Q output acts as a cooling pulse leading edge position signal 515d.

The cooling pulse trailing edge reference timing 516a and the cooling pulse trailing edge position reference clock 516b are connected to the D input and the clock input of a D flip-flop 503e, and the Q inverted output of the D flip-flop 503e acts as a cooling pulse trailing edge position signal 516c.

The first pulse leading edge position signal 511c and the first pulse trailing edge position signal 512c are connected to the clock input and the reset input of the D flip-flop 505a, respectively. Moreover, the D input of the D flip-flop 505a is fixed to the H level. Consequently, a first pulse signal 517 which is the Q output of the D flip-flop 505a rises to the H level at the rising edge of the first pulse leading edge position signal 511c when the first pulse trailing edge position signal 512c has the H level, and falls to the L level at the rising edge of the first pulse trailing edge position signal 512c.

The multi-pulse reference timing 513a, the multi-pulse leading edge reference clock 513b and the multi-pulse trailing edge reference clock 513c are input to a logic device 504. The logic clement 504 ANDs the OR signal of the multi-pulse leading edge reference clock 513b and the multi-pulse trailing edge reference clock 513c and the multi-pulse reference timing 513a when the MPW is a positive number, and outputs the AND as a multi-pulse signal 518. Moreover, the logic device 504 ANDs the AND signal of the multi-pulse leading edge reference clock 513b and the multi-pulse trailing edge reference clock 513c and the multi-pulse reference timing 513a when the MPW is a negative number, and outputs the result of the AND operation as a multi-pulse signal 518.

The last pulse leading edge position signal 514c and the last pulse trailing edge position signal 515c are connected to the clock input and the reset input of a D flip-flop 505b, respectively. Moreover, the D input of the D flip-flop 505b is fixed to the H level. Consequently, a last pulse signal 519 which is the Q output of the D flip-flop 505b rises to the H level at the rising edge of the last pulse leading edge position signal 514c when the last pulse trailing edge position signal 515c has the H level, or falls to the L level at the falling edge of the last pulse trailing edge position signal 515c.

The cooling pulse leading edge position signal 515d and the cooling pulse trailing edge position signal 516c are connected to the clock input and the reset input of the D flip-flop 505c, respectively. Moreover, the D input of the D flip-flop 505c is fixed to the H level. Consequently, the cooling pulse signal 520 which is the Q output of the D flip-flop 505c rises to the H level at the rising edge of the cooling pulse leading edge position signal 515d when the cooling pulse trailing edge position signal 516c has the H level, and falls to the L level at the falling edge of the cooling pulse trailing edge position signal 516c as shown in FIG. 13.

The first pulse signal 517, the multi-pulse signal 518, the last pulse signal 519 and the cooling pulse signal 520 which are generated as described above are input to a pulse synthesizing section 506. The pulse synthesizing section 506 synthesizes and outputs three recording pulses 206a, 206b and 206c from the above-mentioned four kinds of signals. FIG. 13 shows an example of the waveform of the synthesized recording pulses 206a, 206b and 206c.

The clock delay section 502 can be constituted by using the multi-tap connection of inverter element or buffer elements and a voltage-controlled delay element in the same manner as each pulse delay section used for the recording pulse generator 111 shown in FIG. 4.

<Specific Structure of Clock Delay Section>

Figure 6:
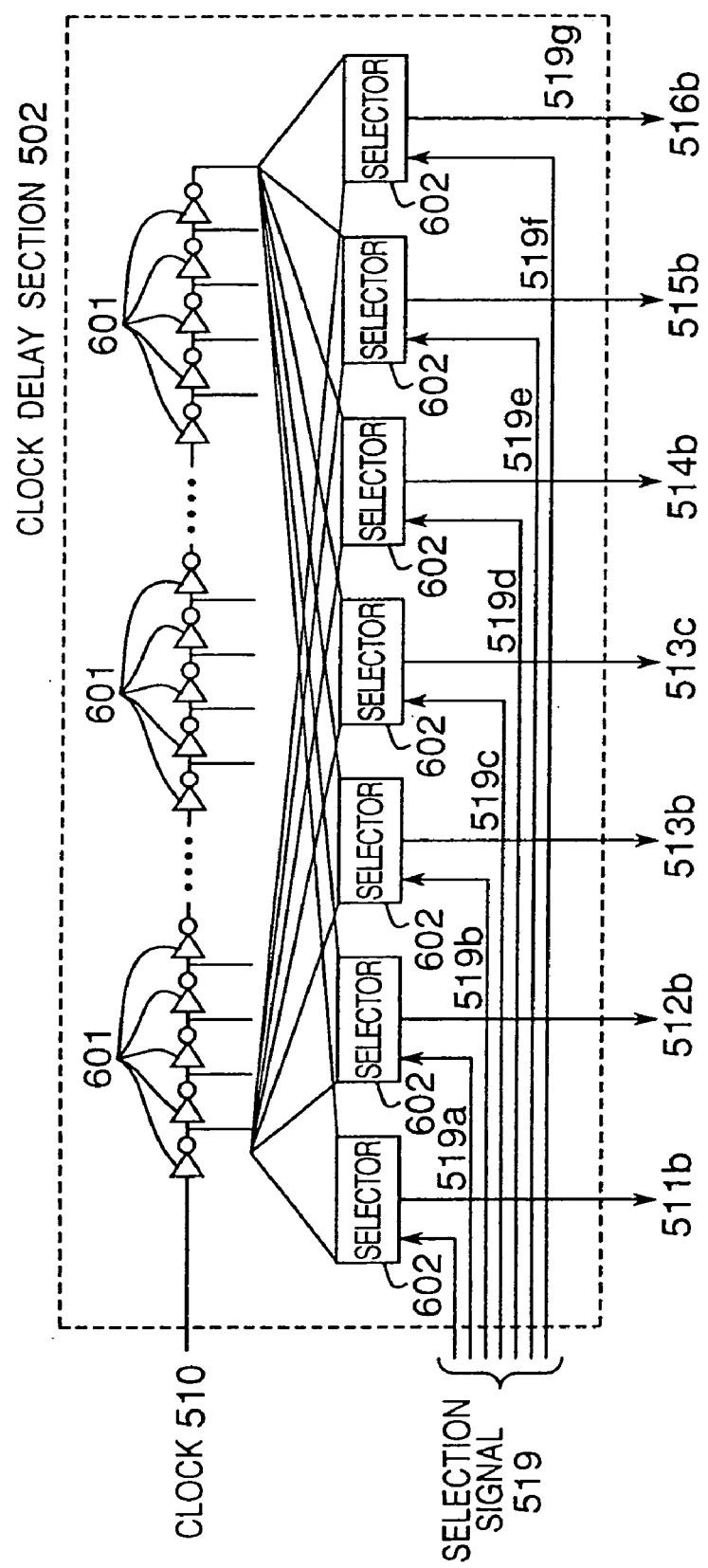
FIG. 6 is a block diagram showing an example of the structure of the clock delay section according to the present invention, using an inverter element.

FIG. 6 is a block diagram showing an example of the internal structure of the clock delay section 502 constituted by using the inverter element. In FIG. 6, an inverter element 601 is connected in series in a plurality of taps. A clock 510 acting as an external input is connected to the inverter element 601 in a first tap. The number of the taps of the inverter element 601 is set such that at least a delay amount to satisfy the variable range of each edge position of the recording pulses 206a, 206b and 206c can be obtained. For example, if the variable range of the each edge position of the recording pulses 206a, 206b and 206c is set to ±10 nanoseconds and a delay amount for two taps of the inverter element 601 is 0.5 nanosecond, 20÷0.5=40 is obtained and at least 80 taps of inverter elements 601 are required.

A selecting section 602 is connected to a part of or all the outputs of each inverter element 601 and selects and outputs any one of the outputs of the inverter elements 601 in response to a selection signal 519. The selecting section 602 is required for each of the kinds of clocks having different delay amounts. In the case where the selecting section 602 is provided in the recording pulse generator 111 shown in FIG. 5, seven kinds of clocks having different delay amounts (a first pulse leading edge position reference clock 511b, a first pulse trailing edge position reference clock 512b, a multi-pulse leading edge reference clock 513b, a multi-pulse trailing edge reference clock 513c, a last pulse leading edge position reference clock 514b, a last pulse trailing edge/ cooling pulse leading edge position reference clock 515b, a cooling pulse trailing edge position reference clock 516b) are required. Therefore, seven selecting sections 602 are provided.

The selection signal 519 comprises plural kinds of setting signals, that is, a selection signal 519a corresponding to the first pulse leading edge position set SFP, a selection signal 519b corresponding to the first pulse trailing edge position set EFP, a selection signal 519c for determining a multi-pulse leading edge position, and furthermore, a reference position having each edge variable range of the recording pulse, a selection signal 519d corresponding to the multi-pulse width set MPW, a selection signal 519e corresponding to the last pulse leading position set SLP, a selection signal 519f corresponding to the last pulse trailing edge position set ELP, and a selection signal 519g corresponding to the cooling pulse trailing edge position set ECP.

As described above, the clock delay section 502 can easily be constituted by combining the inverter element 601 for sequentially delaying an input clock and the selecting section 602 for selecting the output of each inverter element. Moreover, the minimum adjusting step of the recording pulse which is the resolution of a recording compensation amount is equivalent to a delay time passing about two inverter elements.

Figure 16:
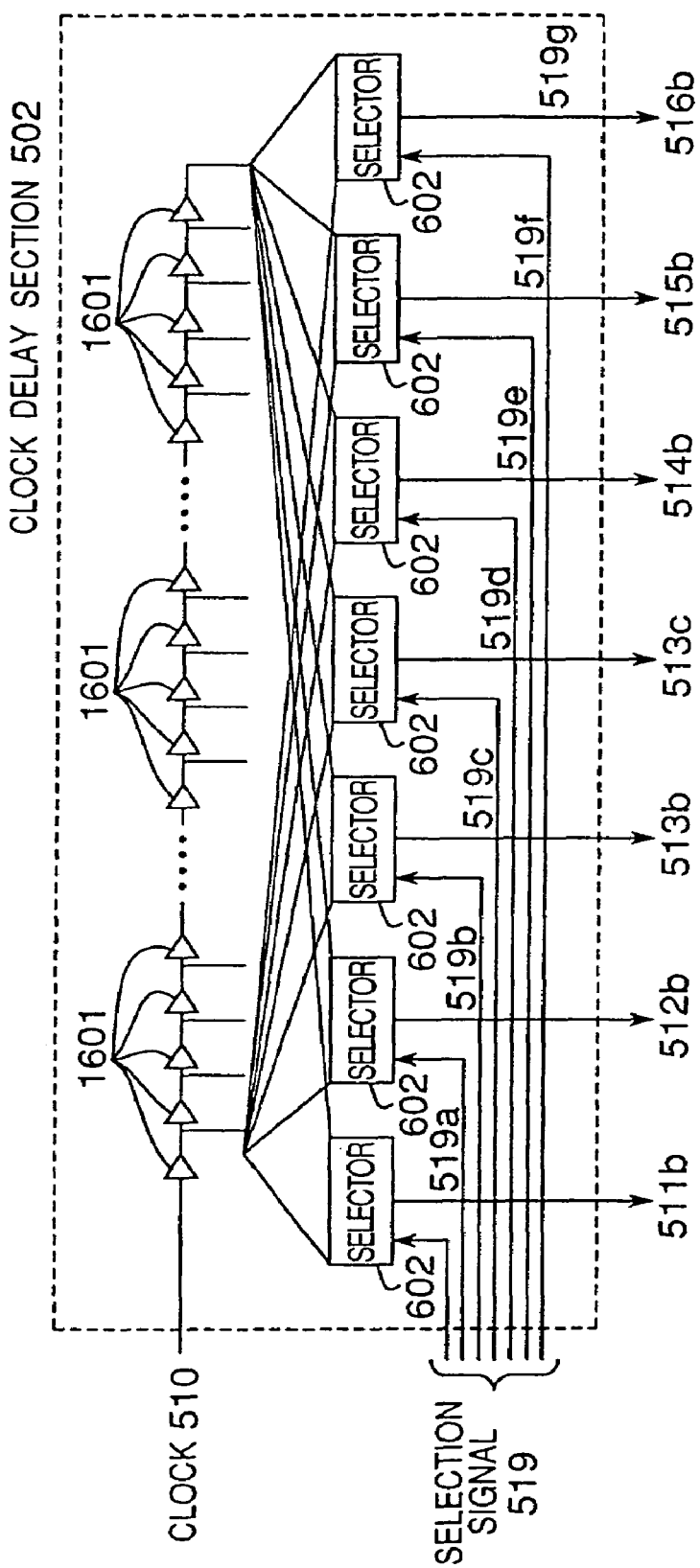
FIG. 16 is a block diagram showing another example of the structure of a clock delay section according to the present invention, using a buffer element.

FIG. 16 is a block diagram showing an example in which the clock delay section 502 is constituted by using a buffer element 1601 in place of the inverter element 601. Also in the structure shown in FIG. 16, it is possible to obtain a plurality of delay clocks having variable delay amounts by selecting and outputting a part of or all the outputs of the buffer element 1601 by using the selecting section 1602 in the same manner as in the structure shown in FIG. 6.

Figure 17:
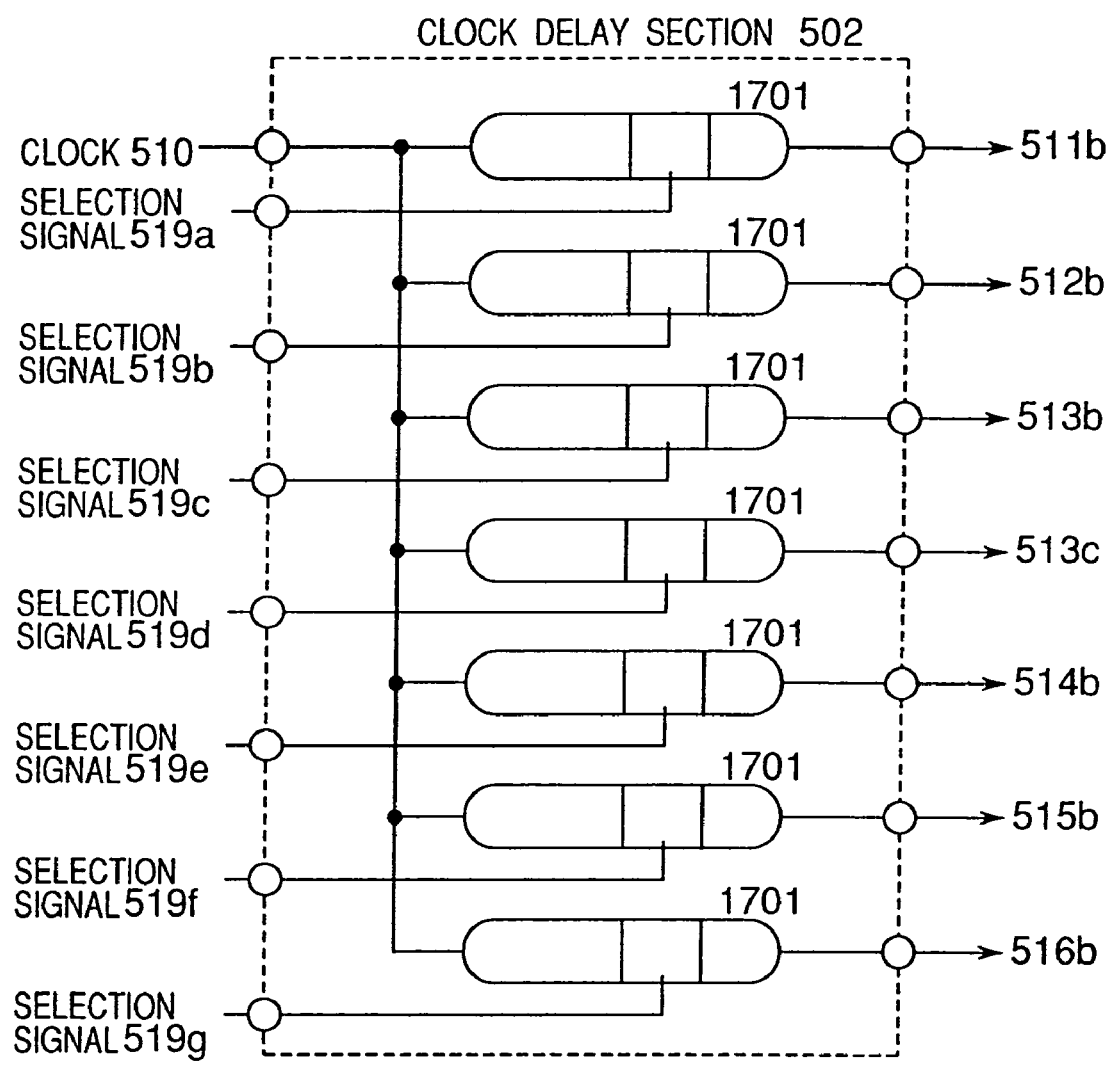
FIG. 17 is a block diagram showing yet another example of the structure of the clock delay section according to the present invention, using a voltage-controlled delay element.

FIG. 17 is a block diagram showing an example in which the clock delay section 502 is constituted by using a voltage-controlled delay element 1701 in place of the inverter element or the buffer element. The voltage-controlled delay element 1701 has the same structure as in FIG. 22, and therefore, its detailed description will be omitted. In the case where plural kinds of delay clocks are to be obtained, they can be implemented by providing a plurality of built-in voltage-controlled delay elements 1701 as in the example of the structure shown in FIG. 17 and controlling the delay amounts with separate external control voltages, respectively.

In contrast with the buffer element shown in FIG. 16, the structure utilizing the inverter element shown in FIG. 6 is characterized in that an inverted output, that is, an output having a phase shift of 180 degrees can easily be obtained. On the contrary, the scale of the selecting section can be more reduced by using the buffer element. It is desirable that an optimum device should be selected and used in consideration of the intended performance such as resolution and delay precision, the cost of a device and the like.

As described above, the recording pulse generator 111 having the internal structure shown in FIG. 5 can easily generate a recording compensated pulse by providing the clock delay section 602 for delaying the clock 510 therein. Moreover, the structure for delaying a clock can more reduce the scale of the circuit as compared with the structure for delaying a pulse as in the example of FIG. 4. The reason is follows. In the case the pulse is to be delayed, a plurality of delay sections are required corresponding to the number of the edge positions of the recording pulse which are to be independently controlled. On the other hand, in the case where the clock is to be delayed, timing for independently controlling a plurality of edge positions can be generated with only one system of the clock delay section.

For example, in the case where six edge positions are to be independently controlled as in the recording pulse shown in FIG. 3, the circuit scale required for the pulse delay section using the example of the structure shown in FIG. 4 requires at least six times as much as the number of delay elements as compared with the circuit scale required for the clock delay section used in the example of the structure shown in FIG. 5. This corresponds to the case where the variable range of each edge position is less than one cycle of the pulse reference clock 301. If the position control is to be carried out within a range which exceeds the one cycle of the pulse reference clock 301, a difference in the circuit scale is further increased.

It is assumed that the variable range of each edge position of the recording pulses 206a, 206b and 206c shown in FIG. 3A is defined as indicated in the following table.

TABLE 1

| Name of pulse edge position | Variable range | Number of reference axes |
| --- | --- | --- |
| First pulse rising position | −0.5 Tw−+1.0 Tw (3/2 Tw) | 4 |
| First pulse falling position | +1.0 Tw−2.0 Tw (2/2 Tw) | 4 |
| Last pulse rising position | −2.5 Tw−−1.5 Tw (2/2 Tw) | 3 |
| Last pulse falling position | −2.0 Tw−−0.5 Tw (3/2 Tw) | 4 |
| Cooling pulse rising position | −2.0 Tw−−0.5 Tw (3/2 Tw) | 7 |

In the Table 1, Tw represents the time length of one channel bit, and particularly, a time length of one cycle of the pulse reference clock 301 in the present embodiment. The variable ranges of the first pulse rising position SFP and the first pulse falling position EFP are defined as relative position for the rising edge of the modulated data (NRZI format) 208. The last pulse rising position SLP, the last pulse falling position ELP and the cooling pulse rising position ECP are defined as relative positions for the falling edge of the modulated data 208. In this decision, it is assumed that there is no skew between the modulated data 208 and the pulse reference clock 301, that is, both edges of the rising edge of the pulse reference clock 301 and the modulated data 208 are in phase.

As in the decision of the Table 1, when the variable range of each pulse edge greatly exceeds 1 Tw, the delay length of each delay portion greatly exceeds 1 Tw with such a structure as to individually delay and then synthesize the pulses shown in FIG. 4. Consequently, the scale of the circuit becomes enormous. On the other hand, description will be given, with reference to FIGS. 18A–18B, to a method for generating a recording pulse which can perform pulse edge control within a wide range to exceed one cycle of the pulse reference clock 301 while delaying the pulse reference clock 301 to generate a plurality of delay clocks.

<Pulse Edge Control by Delay Clock>

FIGS. 18A–18B are typical views illustrating a method for generating a timing signal to determine the first pulse rising position SFP as an example of the pulse edge control. In order to obtain delay timing by using a clock signal in which a pulse having a constant cycle continues, the rising edge or falling edge of the clock signal should be utilized. Therefore, the variable range obtained by controlling the edge position of the clock signal is equal to or less than one cycle of the clock signal. In order to perform a positional representation within broader range, it may be preferable that a window signal to retrieve at the rising edge or falling edge of the clock is provided. The clock signal may be moved with the clock signal within the variable range of one cycle of the clock an the timing of the window signal should be moved in a unit of a half cycle of the clock signal. Such window signal will be hereinafter referred to as "a reference axis window signal" and the number of the kinds of timings required for the unit of the half cycle of the clock signal will be hereinafter referred to as "the number of reference axes".

In FIG. 18A, a first pulse leading edge clock 1801 obtained by delaying the pulse reference clock 301 within the range of one cycle and a first pulse leading edge reference axis window signal 1802 are generated, and the first pulse leading edge reference axis window signal 1802 is latched by the first pulse leading edge clock 1801, thereby obtaining a first pulse leading edge timing signal 1803. The first pulse leading edge reference axis window signal 1802 is an H pulse for one cycle of the first pulse leading edge clock 1801 and a rising edge thereof is controlled in four kinds of timings of −1 Tw, −0.5 Tw, 0 Tw and +0.5 Tw for the rising edge of the modulated data 208. In this case, four reference axes are used.

The reason why the timing control of the first pulse leading edge reference axis window signal 1802 is carried out in a unit of 0.5 Tw is to keep a latch timing margin by a flip-flop or the like when performing the latch in response to the first pulse leading edge clock 1801 in an actual electric circuit. In the case where it is supposed that the first pulse leading edge reference axis window signal 1802 is latched at the rising edge of the first pulse leading edge clock 1801, it is necessary to cause a set-up time and a hold time to have a timing margin.

As shown in FIG. 18B, for example, it is preferable to control variable range of the first pulse leading edge clock 1801 so that the rising edge of the first pulse leading edge clock 1801 is provided after the rising edge of the first pulse leading edge reference axis window signal 1802 by 0.25 Tw and before the rising edge of the first pulse leading edge reference axis window signal 1802 by 0.25 Tw.

In other words, the variable range of the first pulse leading edge clock 1801 is set to ±0.25 Tw for each reference axis, that is, the rising edge or falling edge of the pulse reference clock 301. Consequently, both the set-up time and the hold time of the flip-flop can be kept to have a value of 0.25 Tw or more. The value of 0.25 Tw or more is one of many examples. It is sufficient that the variable range of the clock rising edge may be determined within the range in which the margin of the latch timing can fully be kept and there is no clearance on the boundary with a variable range for an adjacent reference axis (a region where the rising edge of the first pulse leading edge clock 1801 is not provided). For example, the above-mentioned conditions can also be satisfied within a range of 0.1 Tw in a negative direction and 0.4 Tw in a positive direction for each reference axis.

By the determination of the variable range described above, the variable range of the first pulse leading edge clock 1801 is set for the four kinds of timings (A) to (D) of the first pulse leading edge reference axis window signal 1802 is shown in FIG. 18, respectively. As a result, the range of the first pulse rising position SFP defined in the Table 1 can be satisfied. While the first pulse rising position SFP can be variably controlled as described in the examples shown in FIGS. 18A and 18B, other edge positions to be variable, that is, the first pulse rising position EFP, the last pulse rising position SLP, the last pulse falling position ELP, and the cooling pulse rising position ECP can be variably controlled by the same method. The Table 1 indicates the number of reference axes which are required for the support of the variable range of each pulse edge position.

Moreover, while the cycle of the pulse reference clock 301 is Tw, that is, a one-channel bit length, it may be a Tw/n cycle (n is a natural number). In the examples shown in FIGS. 18A and 18B, n=1 is set. If n is an integer of 2 or more, the variable range of a clock edge required for each edge control can be more shortened. Accordingly, in the case where the delay control of the clock is to be carried out by using a delay section constituted by connecting, in multi-taps, unit delay elements shown in FIG. 6 or FIG. 16, it is possible to reduce a circuit scale. A method for generating the pulse reference clock 301 with n=2 or more can easily be implemented by multiplying the clock by using a PLL or the like. Moreover, it is apparent that the compatibility with other function blocks to be operated in channel clock synchronization of a modulating circuit or the like can be enhanced and the circuit structure can be simplified by multiplying the frequency of the clock by Tw.

However, an increase in the value of n means a rise in the frequency of the pulse reference clock 301. Since the high-speed operation is correspondingly requires, the consumed power of the circuit is increased. Moreover, the setting of n to a very great value is not practical in respect of the stability of the operation of the circuit. It is necessary to select the most efficient value of n in consideration of the scale of the circuit and the clock frequency.

As described above, by using the delay control of the clock and the timing control of the reference axis window signal for performing the latch with the delayed clock at the same time, it is possible to perform positional control within a wide range of the frequency of the clock or more and to carry out formalization as described below.

With the one-channel bit cycle of the recording data represented by Tw, the delay control of pulse can be carried out within a time range of d×Tw/2n by using a delay-controlled clock signal and a timing-controlled window signal. The delay-controlled clock signal is obtained by delaying a clock signal with Tw/n cycle (n is a natural number) within at least Tw/4n. The reference axis window signal is generated to have a pulse-shaped signal with at least Tw/n time width, and a start position controlled to have (d+1) kinds of timings (d is a natural number) continuing in a time unit of Tw/2n.

<Recording Pulse Generating Section for Pulse Edge Control by Delay Clock>

FIG. 19 shows the internal structure of the recording pulse generator 111 capable of performing the pulse position control within a range which exceeds one cycle of the pulse reference clock 301. Components shown in FIG. 19 which have the same reference numerals as in FIG. 5 have the same functions as those in FIG. 5, and therefore, their description will be omitted.

A pulse timing generator 1901 generates and outputs a first pulse leading edge reference axis window signal 1911a, a first pulse trailing edge reference axis window signal 1912a, a multi-pulse reference axis window signal 1913a, a last pulse leading edge reference axis window signal 1914a, a last pulse trailing edge/cooling pulse leading edge reference axis window signal 1915a and a cooling pulse trailing edge reference axis window signal 1916a on receipt of modulated data 208 supplied from another block.

Figure 23:
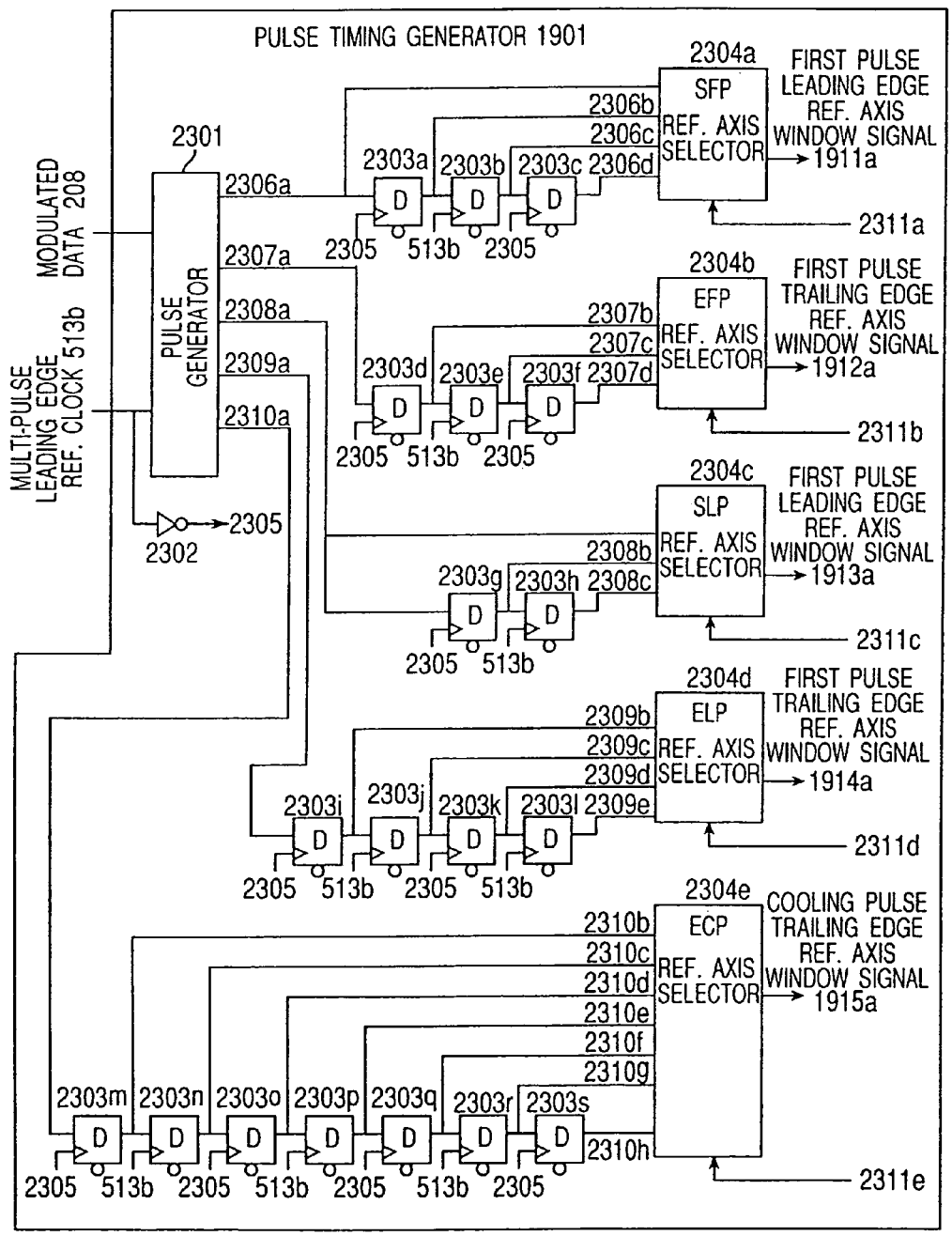
FIG. 23 is a block diagram showing an example of the structure of a pulse timing generator according to the present invention.

An example of the internal structure of the pulse timing generator 1901 and a process of generating each reference timing signal as an output will be described with reference to FIG. 23. In FIG. 23, first of all, a pulse generator 2301 receives the modulated data 208 and a multi-pulse leading edge reference clock 513b as inputs, and output five kinds of timing signals. The five kinds of timing signals include a first first pulse leading edge timing signal 2306a, a first first pulse trailing edge timing signal 2307a, a first last pulse leading edge timing signal 2308a, a first last pulse trailing edge timing signal 2309a and a first cooling pulse trailing edge timing signal 2310a. If the variable range of each edge position of a recording pulse to be generated is defined as shown in the Table 1, each timing signal can be described in the following manner.

More specifically, the first first pulse leading edge timing signal 2306a is an H ("H" represents the high level of a digital signal) pulse having a 1 Tw width which rises at a position before the rising edge of the modulated data 208 by 1 Tw. Moreover, the first first pulse trailing edge timing signal 2307a is an H pulse having a 1 Tw width which rises in the same position as the rising edge of the modulated data 208. Furthermore, the first last pulse leading edge timing signal 2308a is an H pulse having a 1 Tw width which rises at a position before the falling edge of the modulated data 208 by 3 Tw. Besides, the first last pulse trailing edge timing signal 2309a is an H pulse having a 1 Tw width which rises at the position before the falling edge of the modulated data 208 by 3 Tw. In addition, the first cooling pulse trailing edge timing signal 2310a is an H pulse having a 1 Tw width which rises in a position on this side of the falling edge of the modulated data 208 by 2 Tw.

The first first pulse leading edge timing signal 2306a is further delayed by 0.5 Tw by each of three D flip-flops 2303a, 2303b and 2303c, and is changed into second, third and fourth first pulse leading edge timing signals 2306b, 2306c and 2306d, respectively. Furthermore, an SFP reference axis selecting section 2304a selects four kinds of inputs, that is, first to fourth first pulse leading edge timing signals 2306a to 2306d according to an SFP reference axis selection signal 2311a, and outputs them as a first pulse leading edge reference axis window signal 1911a.

The first first pulse trailing edge timing signal 2307a is further delayed by 0.5 Tw for each of three D flip-flops 2303d, 2303e and 2303f, and is changed into second, third and fourth first pulse trailing edge timing signals 2307b, 2307c and 2307d, respectively. Furthermore, an EFP reference axis selecting section 2304b selects three kinds of inputs, that is, second to fourth first pulse trailing edge timing signals 2307b to 2307d according to an EFP reference axis selection signal 2311b, and outputs them as a first pulse trailing edge reference axis window signal 1912a.

The first last pulse leading edge timing signal 2308a is further delayed by 0.5 Tw for each of two D flip-flops 2303g and 2303h, and is changed into second and third last pulse leading edge timing signals 2308b and 2308c, respectively. Furthermore, an SLP reference axis selecting section 2304c selects three kinds of inputs, that is, first to third last pulse leading edge timing signals 2308a to 2308c according to an SLP reference axis selection signal 2311c, and outputs them as a last pulse leading edge reference axis window signal 1913a.

The first last pulse trailing edge timing signal 2309a is further delayed by 0.5 Tw for each of four D flip-flops 2303i, 2303j, 2303k and 2303l, and is changed into second, third, fourth and fifth last pulse trailing edge timing signals 2309b, 2309c, 2309d and 2309e, respectively. Furthermore, an ELP reference axis selecting section 2304d selects four kinds of inputs, that is, second to fifth last pulse trailing edge timing signals 2309b to 2309e according to an ELP reference axis selection signal 2311d, and outputs them as a last pulse trailing edge reference axis window signal 1914a.

The first cooling pulse trailing edge timing signal 2310a is further delayed by 0.5 Tw for each of seven D flip-flops 2303m, 2303n, 2303o, 2303p, 2303q, 2303r and 2303s, and is changed into second, third, fourth, fifth, sixth, seventh and eighth cooling pulse trailing edge timing signals 2310b, 2310c, 2310d, 2310e, 2310f, 2310g and 2310h, respectively.

Furthermore, an ECP reference axis selecting section 2304e selects seven kinds of inputs, that is, second to eighth cooling pulse trailing edge timing signals 2310b to 2310h according to an ECP reference axis selection signal 2311e, and outputs them as a cooling pulse trailing edge reference axis window signal 1915a.

In the present embodiment, the timings of the third first pulse leading edge timing signal 2306c and the first first pulse trailing edge timing signal 2307a are exactly identical. Accordingly, the output 2307a of the pulse generator 2301 and the D flip-flop are omitted and a Q output 2306d of the D flip-flop 2303c is connected to the D input of the flip-flop 2303e, thereby substituting the third and fourth first pulse leading edge timing signals 2306c and 2306d for the first and second first pulse trailing edge timing signals 2307a and 2307b, respectively. Consequently, the same functions can be satisfied and the number of the circuits can be reduced.

In the present embodiment, moreover, the timings of the first last pulse leading edge timing signal 2308a and the first last pulse trailing edge timing signal 2309e are exactly identical, and the timings of the fifth last pulse trailing edge timing signal 2309e and the third cooling pulse trailing edge timing signal 2310c are exactly identical. Accordingly, the outputs 2309a and 2310a of the pulse generator 2301 and the D flip-flops 23031, 2303j, 2303m and 2303n are omitted. Furthermore, a Q output 2308c of the D flip-flop 2303h may be connected to the D input of the flip-flop 2303k and a Q output 2309e of the D flip-flop 2303l may be connected to the D input of the D flip-flop 2303o.

Consequently, by substituting the first, second and third last pulse leading edge timing signals 2308a, 2308b and 2308c and the fifth last pulse trailing edge timing signal 2309e for the first, second and third last pulse trailing edge timing signals 2309a, 2309b and 2309c and the third cooling pulse trailing edge timing signal 2310a respectively, the same functions can be satisfied and the number of the circuits can be reduced.

Moreover, any circuit structure capable of satisfying the same functions other than the above-mentioned circuit structures may be used. It is sufficient that a reference axis window signal may be generated in a timing corresponding to the number of the reference axes related to each pulse edge position control.

With reference to the example of the specific structure shown in FIGS. 19 and 23, there has been described the recording pulse generator 111 capable of performing the pulse position control within the range which exceeds one cycle of the pulse reference clock 301. By taking such a structure, an available scale required for the delay section can be reduced more rapidly than the structure in which the pulse delay section is individually provided for each pulse portion as shown in FIG. 4.

For example, in the case where six edge positions are to be suitably controlled as in the present embodiment, four kinds of pulse delay sections are required even if the delay elements on the leading and trailing edges are shared with the structure shown in FIG. 4. On the other hand, only a delay section having one system is required with the structure shown in FIG. 19.

In order to support the variable range of the Table 1, moreover, the delay length of each pulse delay section shown in FIG. 4 requires a net delay amount for the variable range of each edge position of the Table 1. On the other hand, it is sufficient that the clock delay section 502 shown in FIG. 19 has a delay amount of 1 Tw.

<Fluctuation Compensation for Delay Amount in Delay Section>

The detailed description has been given to the example of the internal structure of the recording pulse generator 111 for generating the recording pulses 206a, 206b and 206c from the modulated data 208 which is the feature of the present invention and the internal operation thereof. Next, description will be given to a method for holding each of the edge positions of the recording pulses 206a, 206b and 206c in proper positions even if a delay amount in a delay section which is one of the devices of the internal structure of the recording pulse generator 111 fluctuates due to an external factor such as a change in a temperature, a change in a supply voltage or the like, thereby keeping the high quality of a recording signal in any situation, and an example of a specific structure thereof, which is another feature of the present invention. The object can be achieved by the following structure and method.

First of all, detailed description will be given to the influence caused by a change in a temperature and a change in a supply voltage when a clock delay section or a pulse delay section is constituted by using delay elements. Then, description will be given to a specific structure and method for compensating for the influence.

<Fluctuation in Delay Amount by Change in Temperature and Change in Supply Voltage>

FIG. 7 is a typical diagram illustrating the relationship between the selection signal value of the clock delay section 502 of which internal structure has been described as an example of the delay section with reference to FIG. 6 and an obtained delay clock output. The selection signal value in the description is a value to be given by a selection signal 519. Based on the value, the number of taps of the inverter element 601 is determined. As a result, the delay amount of the delay clock is controlled. It is assumed that the number of taps of the inverter elements 601 is decided to be 128 taps in the clock delay section 502 and the delay clock to be selected is in phase with the input clock 510, that is, only the outputs of the inverter elements 601 in even-numbered taps are selected. Moreover, when a selection signal value is assigned such that a delay amount in the vicinity of a middle portion is obtained with a selection signal value coded to 0 in a decimal number, and the delay amount is reduced when an absolute value is increased in a negative direction and is increased when the absolute value is increased in a positive direction, the relationship shown in FIG. 7 can be obtained.

A selection signal value ±N is defined as a selection signal value having a relative delay amount of about ±0.5 Tw for a delay clock corresponding to a selection signal value of 0. Tw represents one cycle of the clock 510, that is, the cycle of one channel bit. N always has a constant value as long as the delay amount of the inverter element 601 for each tap is not changed. In an actual device, however, the delay amount of the inverter element 601 for each tap fluctuates by a change in a temperature and a change in a supply voltage. Therefore, the value of N is not constant.

FIGS. 8a–8c are graphs showing a relationship between the selection signal value of the clock delay section 502 which is indicated as an axis of abscissa and the delay time between an input and an output of the clock delay section 502 which is indicated as an axis of ordinate. FIG. 8B is a graph obtained at an ordinary room temperature and a normal supply voltage, in which a selection signal value having a relative delay amount of ±0.5 Tw for a delay clock corresponding to a selection signal value of 0 is set to ±No.

On the other hand, FIG. 8A is a graph obtained at a low temperature and a high supply voltage, in which the selection signal value having the relative delay amount of ±0.5 Tw for the delay clock corresponding to the selection signal value of 0 is set to ±Ns. Moreover, FIG. 8C is a graph obtained at a high temperature and a low supply voltage, in which the selection signal value having the relative delay amount of ±0.5 Tw for the delay clock corresponding to the selection signal value of 0 is set to ±Nf.

In general, a delay time between the input and the output of the inverter element is relatively shortened when an environmental temperature at which the device is put is dropped, while the delay time is relatively prolonged when the environmental temperature is raised. Generally, the delay time between the input and the output of the inverter element is relatively prolonged if a lower supply voltage is applied to the device. As shown in FIGS. 8A, 8B and 8C, accordingly, the gradient of the graph is increased toward the right. To the contrary, a relationship of Ns>No>Nf is formed for the relationship of the selection signal value under each condition.

As described above, the relative delay amount fluctuates for each selection signal value due to the change in the temperature and the change in the supply voltage. As a result, there is a problem in that the predetermined edge position of a recording pulse is shift from an optimum value for a recording operation of high quality. In order to solve this problem, it is proposed that a delay amount measuring section for measuring a delay difference between two signals having two kinds of delay amounts is provided and a set value related to recording compensation is updated based on the result of the measurement of the delay amount obtained from the delay amount measuring section.

<Delay Amount Measuring Section>

Figure 10:
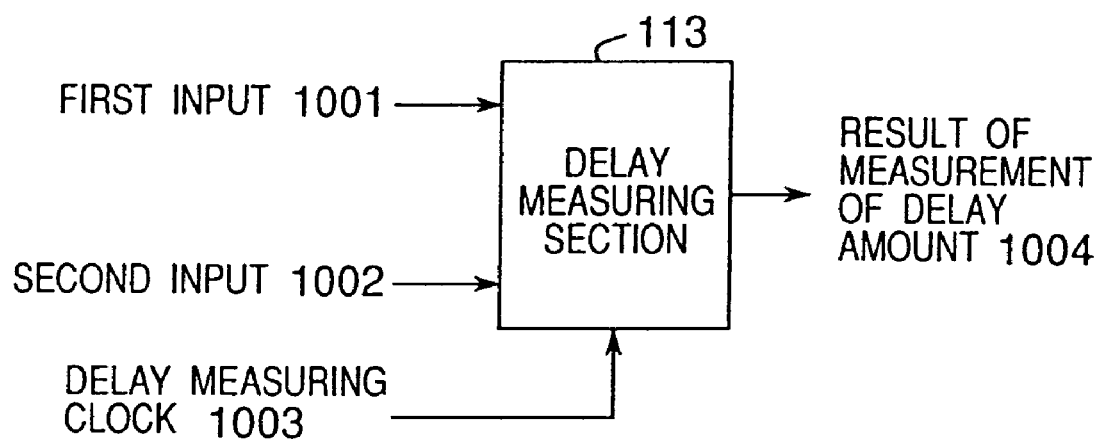
FIG. 10 is a block diagram showing the structure of a delay amount measuring section according to the present invention.

FIG. 10 is a block diagram showing the structure of a delay amount measuring section 113. A first input 1001, a second input 1002 and a delay measuring clock 1003 are input from the outside. A delay difference between the predetermined edge of the first input 1001 and the predetermined edge of the second input 1002 is measured by using the delay measuring clock 1003. The result of the measurement is output as a delay amount measurement result 1004.

Signals to be input as the first input 1001 and the second input 1002 depend on the internal structure of the recording pulse generator 111. In the structure of FIG. 4, the first pulse leading edge reference signal 411b and the first pulse trailing edge reference signal 411c which are the outputs of the first pulse delay section 402 are set to the first input 1001 and the second input 1002, respectively. Consequently, a relationship of a delay difference between the two outputs in the first pulse delay section 402 and both set values of the first pulse rising position set SFP and the first pulse falling position set EFP is made clear by the result of the measurement of the delay amount.

In FIG. 4, the delay amount measuring section 113 may input the output from a delay section other than the first pulse delay section 402. In order to strictly measure all the delay amounts of four kinds of delay sections, all the outputs of the delay sections preferably may be the input of the delay amount measuring section 113. However, in the case where the structures of the internal delay elements of the delay sections are similar, it is not necessary to always measure all the delay amount. The output of a typical delay section can be basically measured in consideration of a time taken for the measurement and the scale of the measuring section.

On the other hand, in the structure of FIG. 5, the first pulse leading edge reference signal 511b and the first pulse trailing edge reference signal 512b which are the outputs of the clock delay section 502 are set to the first input 1001 and the second input 1002, respectively. Consequently, a relationship of a delay difference between the two outputs 511b and 512b in the clock delay section 502 and both set values of the first pulse rising position set SFP and the first pulse falling position set EFP is made clear by the result of the measurement of the delay amount.

Although another output of the clock delay section 502 may be the input of the delay amount measuring section 113 also in FIG. 5, it is not necessary to measure all the delay differences among seven kinds of outputs. The reason is that any output has almost the same delay amount for each set value because the clock delay section 502 is constituted by a delay element group of one system.

The fist input 1001 may be set to any of the inputs of each delay section and the output of the delay section which is selected as the input may be set to the second input 1002. In FIG. 4, for example, the input 411a of the first pulse delay section 402 is set to the first input 1001 and the output 411b of the first pulse delay section 402 is set to the second input 1002. Consequently, a relationship of the delay difference between the input and the output of the first pulse delay section 402 with the set value of the first pulse rising position setting SFP is made clear by the result of the measurement of the delay amount. In FIG. 5, a relationship of the delay difference between the input and the output of the clock delay section 502 with the set value of the first pulse rising position set SFP is made clear by the result of the measurement of the delay amount.

Moreover, while the delay measuring clock 1003 can perform measurement with less resolution at a higher frequency, the magnitude of the frequency has a limit. In consideration of the stability of the operation of a circuit and the consumed power, it is not preferable that the frequency is very high. It is desirable that the delay amount measuring section 113 is constituted such that the delay difference between the first input 1001 and the second input 1002 can detect a set value of 1 Tw by using a clock signal having one-channel bit cycle (Tw) input as the delay measuring clock 1003 to the recording pulse generator 111.

Figure 11:
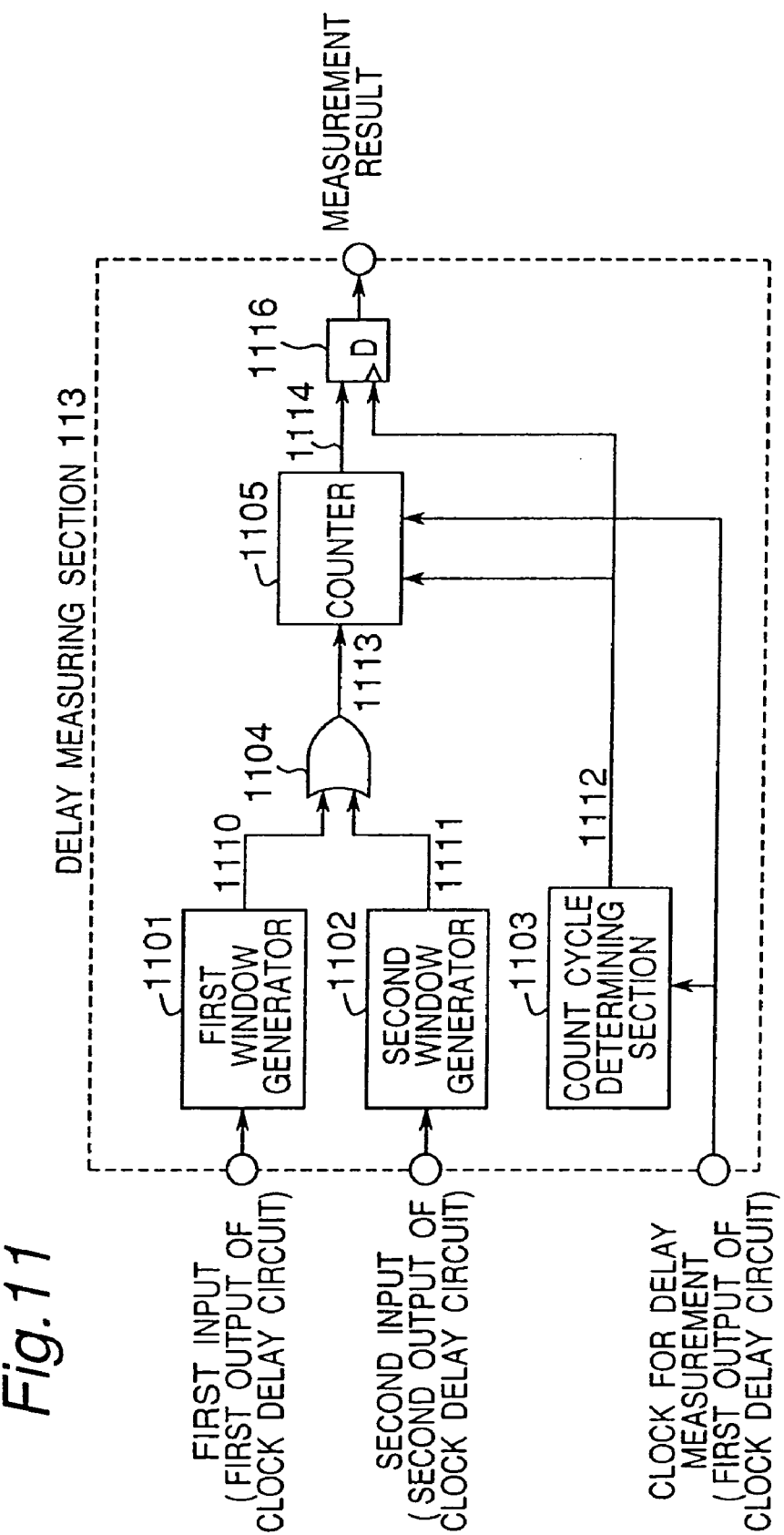
FIG. 11 is a block diagram showing a specific example of the structure of the delay amount measuring section.

FIG. 11 is a block diagram showing the more detailed structure of the delay amount measuring section 113. The delay amount measuring section 113 shown in FIG. 11 serves to measure the delay amount of a clock which is obtained by the clock delay section 502 for the recording pulse generator 111 having in the clock delay section 502 shown in FIG. 5.

More specifically, any output of the clock delay section 502 is input as the first input and another output of the clock delay section 502 is input as the second input. A first window generator 1101 generates a first window signal 1110 on receipt of the first input, and a second window generator 1102 generates a second window signal 1111 on receipt of the second input. The two window signals are ORed by an OR device 1104 and are changed into a measuring window signal 1113. A count section 1105 counts a section having the H level of the measuring window signal 1113 for the period of a measuring cycle signal 1112 determined by a count cycle determining section 1103. The first output of the clock delay section which is the same as the first input is used for the delay measuring clock. A result obtained by the counting of the counter 1105 for one cycle of the measuring cycle signal 1112 is supplied as a count output 1114 to the D input of a D flip-flop 1106. The measuring cycle signal 1112 is connected to the clock input of the D flip-flop 1106. By this structure, the result of the counting for each measuring cycle is output as the result of the measurement of the delay amount.

Although FIG. 11 shows the example in which the delay difference between the two outputs of the delay amount measuring section 113, particularly, the clock delay section 502 to be applied of the recording pulse generator 111 having the internal structure shown in FIG. 5, it is not restricted. As mentioned in the description of FIG. 10, the same structure as in FIG. 11 can be implemented for a section for measuring the delay difference between the input and the output of the clock delay section 502 and the delay difference between the input and the output or two outputs of each of the pulse delay sections 402, 403, 404 and 405 in FIG. 4.

Figure 14A:
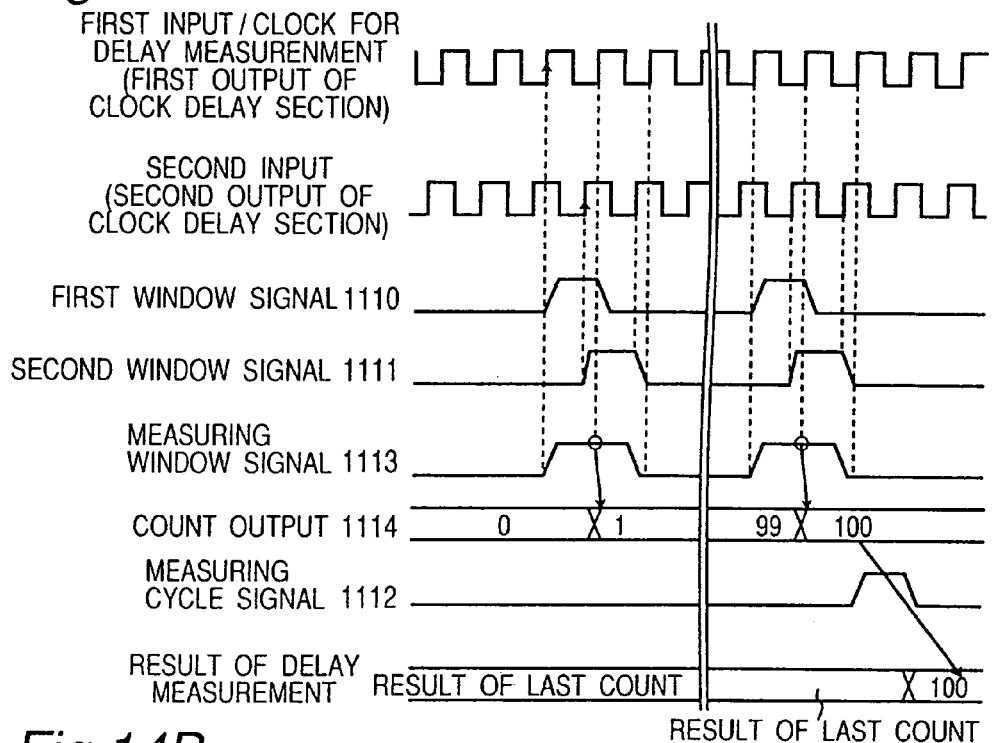
FIGS. 14A and 14B are timing charts illustrating the delay amount measuring operation of the delay amount measuring section having the internal structure shown in FIG. 11.
Figure 14B:
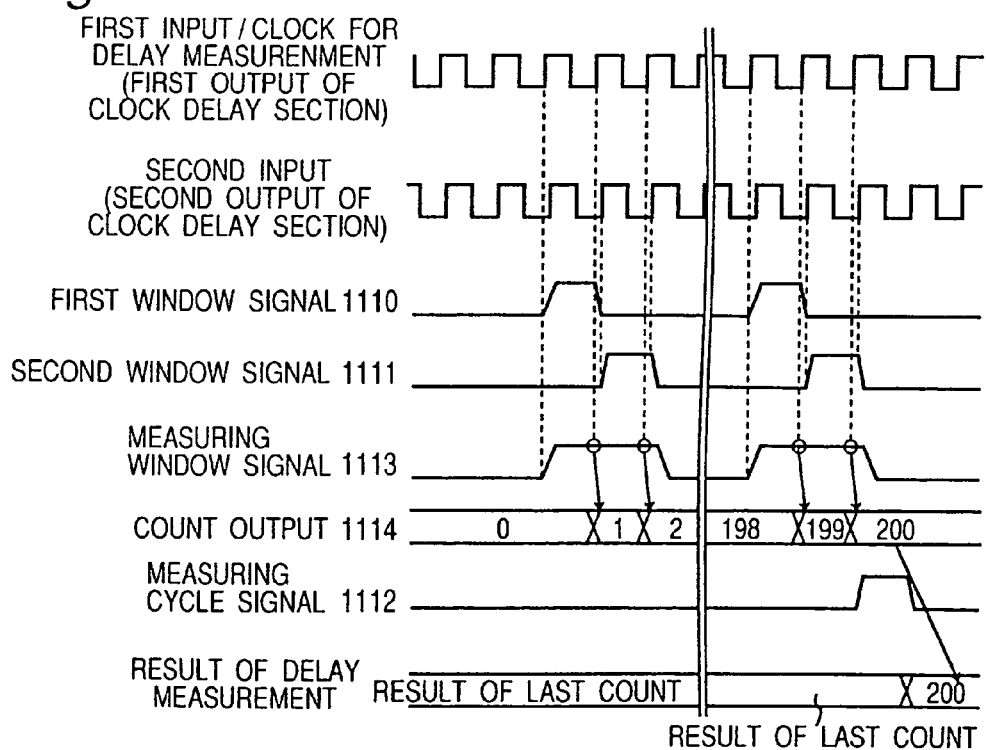

FIGS. 14A and 14B are timing charts illustrating a process of detecting a set value with which a delay difference between the first input 1001 and the second input 1002 is 1 TW by the delay amount measuring section 113 shown in FIG. 11.

FIG. 14A shows an example of a timing obtained when the delay difference between the first input 1001 and the second input 1002 is less than 1 Tw. As shown, at this time, a period of the H level of the measuring window signal 1113 is less than 2 Tw. Therefore when the cycle of the measuring cycle signal 1112 is equivalent to 100 cycles of the window signals 1110 and 1111, the result of the counting is always 100.

FIG. 14B shows an example of a timing obtained when the delay difference between the first input 1001 and the second input 1002 is almost 1 Tw. At this time, a period of the H level of the measuring window signal 1113 is 2 Tw. Therefore when the cycle of the measuring cycle signal 1112 is equivalent to 100 cycles of the window signals 1110 and 1111, the result of the measurement is always 200. More specifically, the result of the measurement of the delay amount which is the result of the counting is changed from 100 to 200 by gradually changing the setting of the delay difference between the first input 1001 and the second input 1002 from a set value which is less than 1 Tw to a set value which is equal to or more than 1 Tw. The changeover point could be a set value in which a delay difference is about 1 Tw.

Furthermore, description will be given to the specific operation of the device. It is possible to search a set value with which a delay amount of 1 Tw between two delay signals is obtained by the delay amount measuring section 113 while changing the delay setting of the delay section provided in the recording pulse generator 111 by the recording pulse position correction section 112.

<Calibration of Setting of Recording Compensation Amount>

Next, description will be given to how to specifically set a recording compensation amount by using the set value thus searched.

As described in the prior art, there has been proposed, as a recording compensating method in an optical disc recorder, a method for determining a predetermined edge position of a recording pulse by at least one of a self mark length, a last space length and a next space length or their combination and defining a recording compensation amount by a time for the reference position of the determined edge position. Based on this method, the recording compensation amount related to the predetermined pulse edge position is defined by a time table comprising the number of the combination of each mark/space. The operation of replacing defined time table with the above-mentioned set value table and updating the set value table such that the defined time table is executed even if a temperature or a supply voltage fluctuates is defined "the calibration of a recording compensation table". The time table has been disclosed in detail in U.S. patent application Ser. No. 09/352,211 and the contents thereof will be incorporated as a part of this specification by reference.

<Calibration of Recording Compensation Table>

Figure 15:
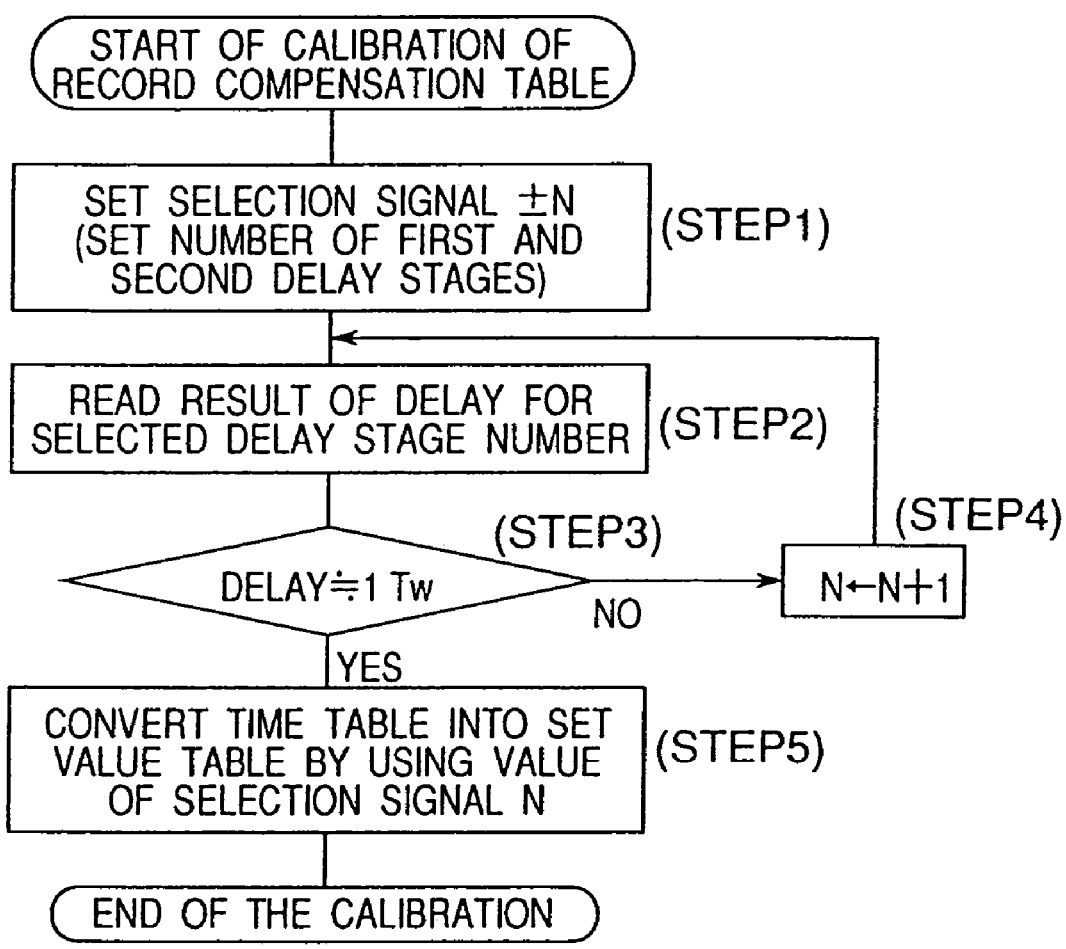
FIG. 15 is a flowchart showing the flow of a specific process of a method for calibrating a recording compensation table in an optical disc recording device according to the present invention.

FIG. 15 is a flowchart showing a specific process for a method for calibrating the recording compensation table in the optical disc recorder according to the present invention. As shown, when an instruction to start the calibration of the recording compensation table is given, a selection signal ±N is first set (Step 1). More specifically, the system controller 110 sets the selection signal ±N through the recording pulse position correction section 112. As a result, the number of delay taps for the first and second inputs of the delay amount measuring section 113 is set. Then, the result of measurement of the delay for the selected delay tap number is read (Step 2).

More specifically, the first input and the second input which correspond to the number of delay taps selected are input to the delay amount measuring section 113 and the result of the measurement of the delay amount is read by the system controller 110. Then, the system controller 110 decides whether a current delay amount is about 1 Tw based on the read result of the measurement of the delay amount (Step 3). When it is decided that the delay amount is less than 1 Tw, the set value N is incremented to (N+1) (Step 4) and the routine returns to the Step 2. When it is decided that the delay amount is about 1 Tw, the time table is converted into the set value table by using the value of the selection signal N (Step 5).

Figure 9:
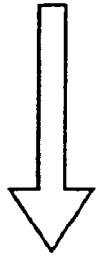
FIG. 9 is a typical diagram showing an example of conversion of a recording compensation amount from a time table to a set value table according to the present invention.

FIG. 9 is a typical table showing an example of the conversion from the time table of the recording compensation amount to the set value table. In the example of FIG. 9, the predetermined edge position of a recording pulse is determined by the combination of the length of a mark (a self mark) to be recorded and the last space length of the self mark (the length of space just before the self mark).

More specifically, FIG. 9 shows a time table in which three kinds of self mark lengths of 3 Tw, 4 Tw and 5 Tw or more and three kinds of last space lengths of 3 Tw, 4 Tw, 5 Tw or more are combined to define 3×3=9 edge positions by a time. When 1 Tw=17 nanoseconds and a set value is represented by N (for example, the vales of Ns, No and Nf shown in FIG. 8) when the delay difference between the two inputs obtained by using the delay amount measuring section 113 as described with reference to FIG. 11 is ±0.5 Tw, the set value table corresponding to the time table can be created as shown in FIG. 9. The value of each entry of the set value table can be obtained by multiplying the corresponding value (−1, −2, +2, +3 and the like) of the entry of the time table by a value of N/(0.5 Tw). The value of each entry thus obtained is not always an integer but the actual setting of the delay section is given as an integer value. Accordingly, it is necessary to perform rounding such as round off to obtain an integer value.

The value of the set value table is given by a proportional equation in which N is a constant. Therefore, when the value of N is increased by a fluctuation in a temperature, a supply voltage or the like, the absolute value of the set value is also increased. An increase in the value of N means that a delay amount for one step of the set value is smaller than a standard amount. In this case, when the absolute value of the set value is increased, a difference in a delay tap number between a set value of 0 (reference position) and a set value for determining a predetermined edge position is also increased. In other words, when the delay amount for one step of the set value is smaller than the standard amount, the number of taps is increased. Therefore, the delay amount of the predetermined edge position from the reference position is kept constant.

To the contrary, when the value of N is reduced, the absolute value of the set value is also reduced and the difference of the tap number between the predetermined edge position and the reference position (a set value of 0) is also reduced. In other words, when the delay amount for one step of the set value is larger than the standard amount, the number of taps is reduced. Consequently, the delay amount of the predetermined edge position from the reference position is kept constant.

Accordingly, by converting the set value based on the value of N and using the converted value to correct the predetermined edge position of a recording pulse in the method shown in FIG. 9, a recording compensation amount can be kept constant even if the delay amount of the delay section fluctuates by a fluctuation in a temperature, a supply voltage or the like. Consequently, it is possible to obtain a great effect that recording characteristics can be prevented from being deteriorated due to external factors such as the fluctuation in the temperature, the supply voltage or the like.

While each time information indicative of the predetermined edge position of the recording pulse is individually determined by the combination of a self mark length and a last space length in the time table shown in FIG. 9, it is not restricted. The self mark length and the next space length may be combined or only the self mark length may be used according to the circumstances. For example, in the case where a recording pulse shown in the example of FIG. 2 is used, the following method is effective in respect of the recording compensation of thermal interference between marks. The method individually determines the first pulse leading edge position SFP for each combination of the self mark length and the last space length, and determines the last pulse trailing edge position ELP for each combination of the self mark length and the last space length.

While the method for calibrating the recording compensation table shown in FIG. 15 has been described for the recording pulse generator 111 comprising the clock delay section shown in FIG. 6, it can also be applied in the same way when the clock delay section shown in FIG. 16 is used.

Moreover, a delay selection signal is not a discrete value but is a voltage which changes in analog for the clock delay section using the voltage-controlled delay element shown in FIG. 17. Therefore, the method shown in FIG. 15 cannot exactly be applied. However, the method shown in FIG. 15 can similarly be applied by replacing an operation for setting selection signal values of +N/−N at the Step 1 in FIG. 15 with delay control voltages $V_n/V_{-n}$, and at the Step 4 replacing the increment operation of the value of N by +1 with an operation for setting the delay control voltage $V_n$ to $(V_n-V_s)$ and the delay control voltage $V_{-n}$ to $(V_n+V_s)$. $V_s$ represents a delay control voltage corresponding to the minimum change unit of the required delay amount. By increasing or reducing a current delay control voltage by $V_s$, the delay amount is increased or reduced by one delay tap in the example of FIG. 15.

<Variation Correction of Components of Delay Section>

Even if the delay amount of the delay section is changed by the fluctuation in a temperature, a supply voltage or the like, the recording compensation amount could be kept constant by the above-mentioned method. By using this method, great effects can be obtained when the delay amount of the whole delay section is changed. However, there is a problem in that it is hard to obtain great effects for a variation in individual devices constituting the delay section.

The variation in the delay between the devices means a variation for a delay amount present between devices such as the inverter element 601 in the structure of the clock delay section 502 shown in FIG. 6, the buffer element 1601 in the structure shown in FIG. 16, the voltage-controlled delay element 1701 in the structure shown in FIG. 17 and the like.

In the case where the delay section shown in FIG. 6 or FIG. 16 is provided in a digital IC (a standard cell, a gate array or the like), the delay section can comprise a general purpose logic cell. However, a variation in the delay amount is caused by the situation of the arrangement of the logic cell, a wiring load between the logic cells, the driving capability of a transistor constituting the logic cell or the like in the digital IC. Also in the case of the voltage-controlled delay element shown in FIG. 17, actually, it is very hard to make a delay between an input and an output for the delay control voltage completely linear. In some cases, there is a portion having non-linear characteristics. Accordingly, the characteristics of a delay section in an actual device are not linear differently from the relationship between the selection signal value and the delay time shown in FIG. 8 but have a variation within a certain range.

Figure 24:
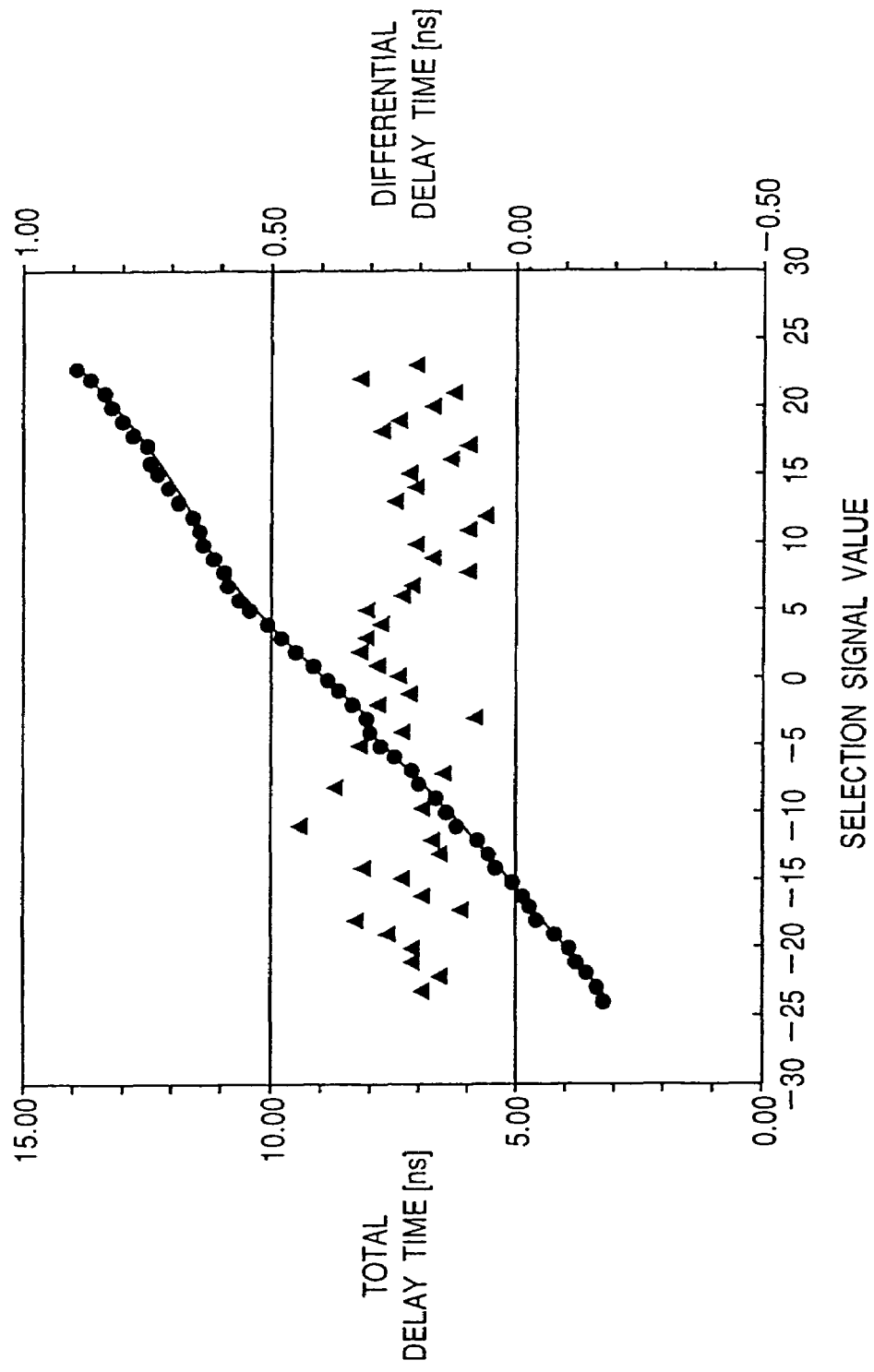
FIG. 24 is a chart showing the delay characteristic of a delay section (a delay circuit).

FIG. 24 is a graph showing an example of the delay characteristics of the delay section in the actual device (which is constituted by using the inverter element shown in FIG. 6), in which an axis of abscissa indicates a selection signal value and an axis of ordinate indicates a difference in a total delay time between an input and an output and a delay time between adjacent selection signal values. As shown, the differential delay time is distributed within a range having a certain width. It is apparent from the distribution that a great variation in the delay time is caused by the selection signal value.

In the case where the delay time has a variation, thus, a variation is finally caused in the edge position of the recording pulse by the method described by using FIG. 15 or the like, that is, a method for converting the time table into the set value table using a selection signal value of N with which the total delay amount is 1 Tw. The reason is as follows. Since a time is replaced with a set value on the assumption that the characteristics of the delay section are ideally linear in the above-mentioned method, the component of a variation caused by a shift from the ideally linear characteristics is exactly related to the error of the edge position of the recording pulse when there is a variation as shown in FIG. 24.

Description will be given to a method for minimizing the error of the edge position of the recording pulse even if there is a variation in individual devices constituting the delay section.

Figure 25A:
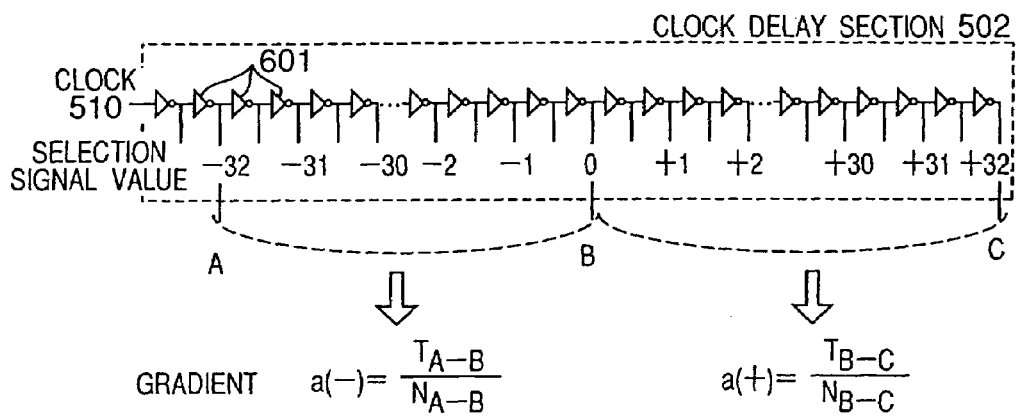
FIG. 25A is a diagram illustrating an example in which a delay element group is divided into two regions in a delay section comprising delay elements in a plurality of taps.

First of all, the delay section is divided into a plurality of regions. As shown in FIG. 25A, for example, a selection signal value is divided into two portions, comprising a negative region and a positive region about 0. More specifically, inverters in a plurality of taps which constitute the delay section is divided into a group constituted by the inverters for outputting a negative selection signal value (the group of the inverters provided between points A and B) and a group constituted by the inverters for outputting a positive selection signal value (the group of the inverters provided between points B and C).

For each divided region (group), a delay time is separately measured. The measurement of the delay time is carried out by using the delay amount measuring section shown in FIG. 11, for example. Since the delay section is divided into a plurality of regions, the delay time is shortened. Therefore, it is necessary to use a delay measuring clock having a short cycle. In an example of FIG. 25A, a point having a selection signal value of −32 is set to a point A, a point having a selection signal value of 0 is set to a point B and a point having a selection signal value of +32 is set to a point C. A delay time in the negative region is measured from the two points A and B. Moreover, a delay time in the positive region is measured from the two points B and C.

When the delay time for each divided region is completely measured, a selection signal value corresponding to the edge position of a predetermined recording pulse can be obtained based on the result of the measurement.

As shown in FIG. 25A, for example, if the clock delay section is divided into two portions comprising a negative region and a positive region, a delay amount for one step of a set value is separately calculated in the positive/negative regions. Therefore, a selection signal value can be obtained by the following separate conversion equations depending on a predetermined positive or negative edge position.

$$S(+)=t \div a(+) \qquad \ldots t \geqq 0$$

$$S(-)=t \div a(-) \qquad \ldots t<0$$

S (+) and S (−) represent selection signal values in positive and negative regions, respectively. T represents a predetermined edge position as a relative time for a reference axis. a (+) and a (−) represent the gradient of the graph in the positive and negative regions, that is, a delay amount for one step. The gradient of a (−) is calculated by dividing the result of the measurement of the delay time between the points A and B by a step number of 32. In more general, the gradient of a (−) is obtained by dividing a delay time $T_{A-B}$ between the points A and B by a step number $N_{A-B}$ between the points A and B. Moreover, the gradient of a (+) is obtained by dividing a delay time $T_{B-C}$ between the points B and C by a step number $N_{B-C}$ between the points B and C. FIG. 26 shows an example of the set value table obtained in consideration of a variation correction of the components of the delay section for the time table shown in FIG. 9. Thus, the variation correction of the device can be carried out by including coefficients a (+) and a (−) in each entry of the set value table. The value of each entry thus obtained is not always an integer value but the actual setting of the delay section is given as the integer value. Accordingly, it is necessary to obtain an integer value by performing the rounding such as round off or the like.

Figure 25B:
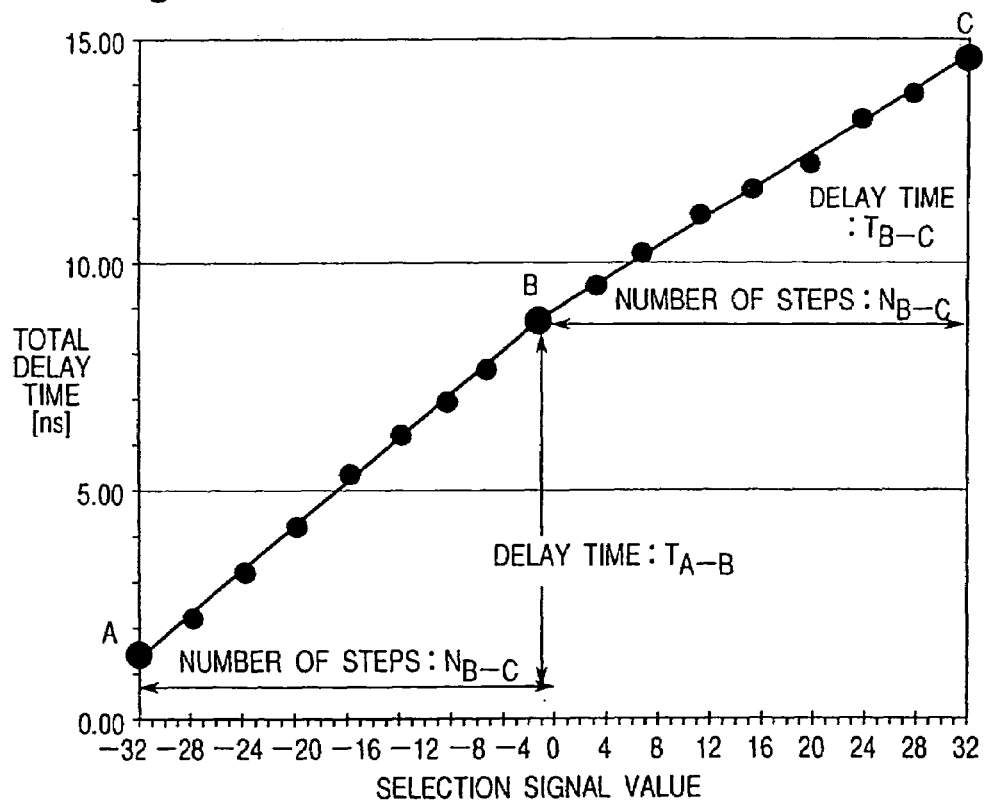
FIG. 25B is a chart illustrating a two-point polygonal line derived when a selection signal value is to be obtained by approximation.

Thus, the clock delay section is divided into two portions, a delay time is measured for each divided region, and the gradient of the graph is obtained based on the result of the measurement. As shown in FIG. 25B, therefore, an edge position time can be converted into a selection signal value by two-point polygonal line approximation. Therefore, a setting error can be more reduced as compared with the case where interpolation is performed by linear approximation based on the result of the measurement of the delay time of the whole delay section.

By more increasing the number of divisions of the delay section, the setting error can be more reduced. For example, the case where the delay section is divided into eight portions will be described with reference to FIG. 27.

Figure 27A:
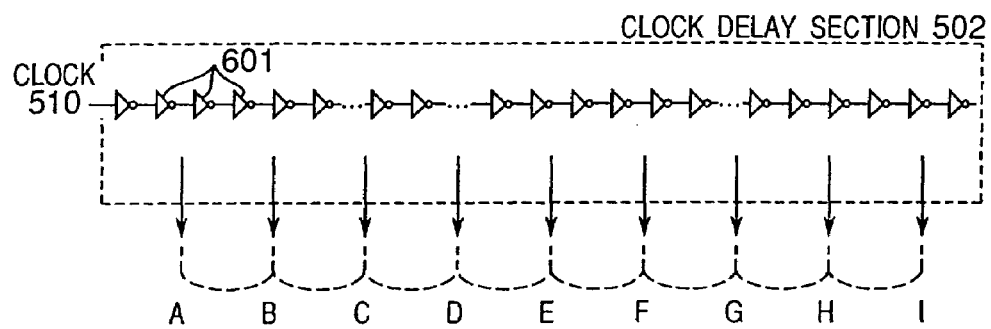
FIG. 27A is a diagram illustrating an example in which the delay element group is divided into eight regions in the delay section comprising the delay elements in a plurality of taps.
Figure 27B:
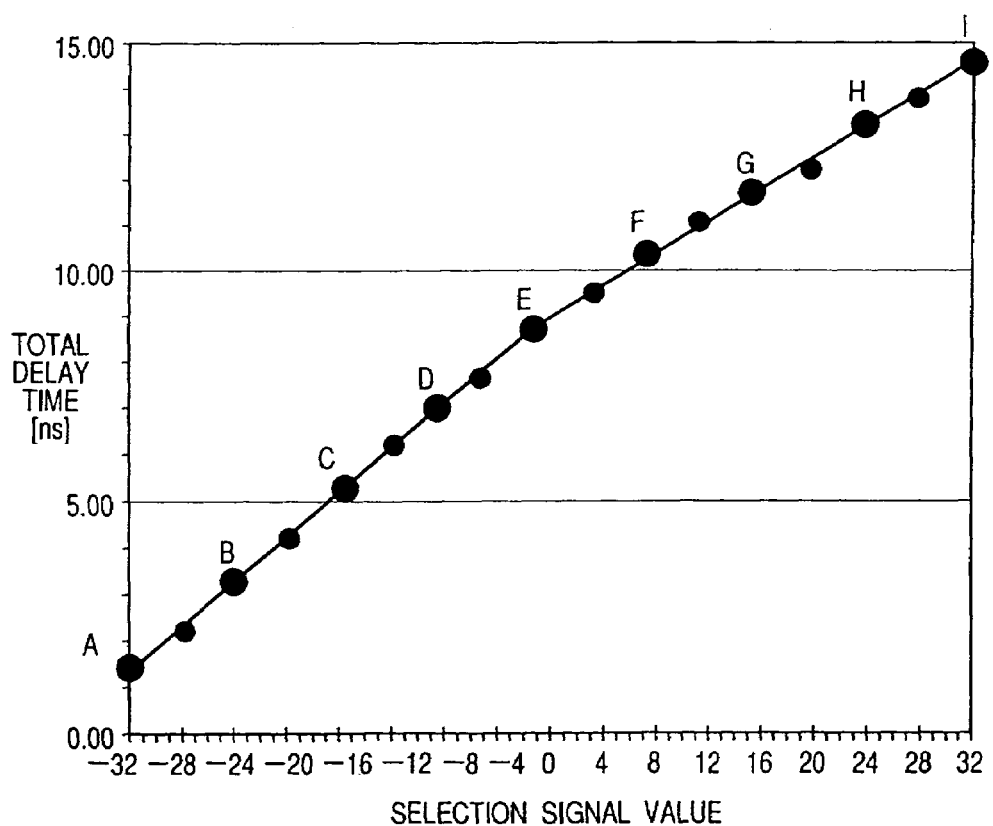
FIG. 27B is a chart illustrating an eight-point polygonal line derived when the selection signal value is to be obtained by approximation.

In an example shown in FIG. 27, selection values of −32 to +32 are divided into eight portions for every four step and points A, B, C, D, E, F, G, H and I are set from a point of −32 in order. Next, the delay time of each divided region is measured between two points of AB, BC, CD, DE, EF, FG, GH and HI.

When a delay time for each region obtained by 8-division is completely measured, a selection signal value corresponding to the edge position of a predetermined recording pulse can be obtained based on the result of the measurement. In this case, approximation can be obtained by an 8-point polygonal line, and therefore an interpolating process having higher precision can be carried out as compared with the case of the 2-division.

As described above, the delay section is divided, a delay time for each divided region is measured and the edge position of a recording pulse is controlled by the result of the measurement. Consequently, the timing of the recording pulse can be generated with higher precision when the delay section has a variation as compared with the case where the delay section is not divided.

When the number of the division of the delay section is increased, a finer interpolating process can be carried out. Therefore, the precision of the recording pulse can be further enhanced. When the number of the division is too large, a time required for the measurement of the delay time is prolonged or the interpolating process becomes complicated. Consequently, the load of the controller is increased. Moreover, when the number of the divisions is increased, a delay time to be measured becomes shortened, and therefore a high-speed delay amount measuring section is required. In the above-mentioned respects, the number of the divisions may preferably be set to a proper value.

While the method for determining portions to be divided for each predetermined step number has been employed in the present embodiment, it is not always required. The gradient of the graph may be obtained by detecting the number of steps with which a delay amount is a predetermined time.

In order to perform polygonal line interpolating approximation, in this case, a clock signal having a smaller cycle than a half of the total delay time of the delay section may be prepared to detect a region which is almost coincident with the cycle of the clock signal. By changing the selection signal value to find a selection signal value with which the delay amount is coincident with the cycle of the clock, it is possible to detect a region where at least two delay amounts are predetermined times. The gradient of the graph is obtained as a delay time of one step by dividing the cycle of the clock by a difference between the selection signal values on both edges.

In order to increase the number of the divisions, it may be preferable to use a clock signal having a sufficiently short cycle for the total delay time of the delay section. Consequently, even if the delay section has a variation, the precision of a recording pulse can be more enhanced.

As compared with a method for performing division for each fixed step number, this method has an advantage that delay measurement can be performed in response to a clock signal having a fixed cycle which does not have a very high-speed, and therefore the structure of the delay amount measuring section can be simplified. The method can be implemented by the structure described with reference to FIG. 11.

While the above-mentioned method has been described as the example in which the gradients of the divided regions are obtained respectively to perform the polygonal line interpolating approximation, the approximating method is not restricted thereto. The present invention has a main object to individually measure a delay time for each divided region to calculate a delay profile with higher precision based on the result of the measurement. Accordingly, a delay profile calculated from the result of the measurement may be approximated by a curve or may be calculated by using the parameter of a predetermined characteristic function.

<Calibration Start Timing of Recording Compensation Table>

Next, the calibration start timing of the recording compensation table will be described. Since the calibration of the recording compensation table serves to correct the predetermined edge position of the recording pulse, it is impossible to calibrate the recording compensation table while data is being actually recorded on an optical disc. Accordingly, The calibration of the recording compensation table is to be carried out except for a period of data recording operation.

A supply voltage, a temperature or the like which is the cause of a fluctuation in the recording pulse, particularly, the temperature in the device is usually changed from moment to moment. Therefore, it is desirable that the recording compensation table is periodically calibrated in respect of the precision of the recording pulse position. Accordingly, the system controller 110 serving to control recording and reproduction in a spare time during the operation of recording data may activate the recording compensation table calibration operation for the format/encoder/decoder 107, or the format encoder/decoder 107 may independently carry out the activation.

Figure 28:
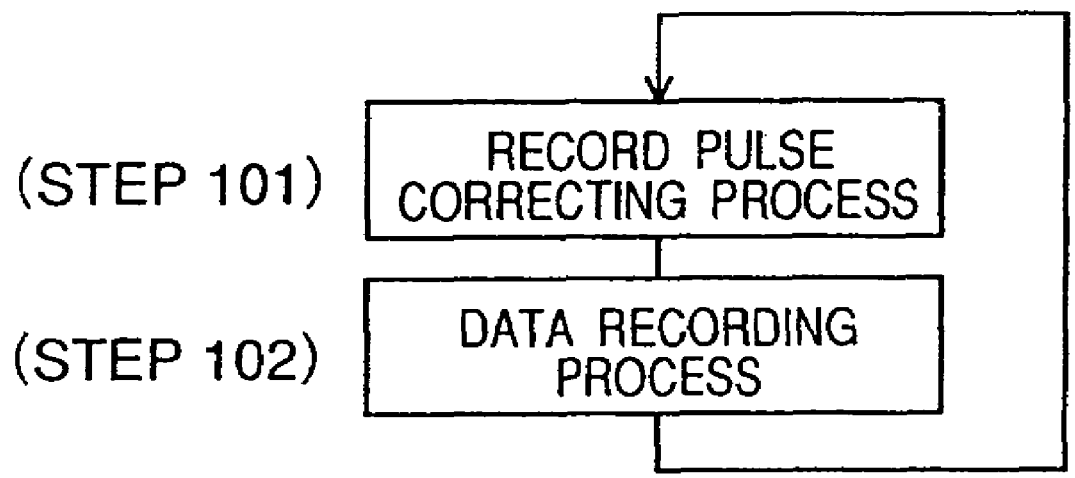
FIG. 28 is a diagram illustrating the calibration timing of the recording compensation table.

FIG. 28 shows an example of the flow of a process related to the calibrating timing of the recording compensation table described above, that is, recording pulse correction. In the drawing, a recording pulse correcting process (Step 101) indicates the whole calibrating process of the recording compensation table and includes a process shown in FIG. 15, for example. A data recording process (Step 102) indicates a usual data recording process, that is, a process of actually recording data on an optical disc. As shown, the recording pulse correcting process is carried out except for a period in which the data recording process is carried out. Accordingly, it is possible to carry out the recording pulse correcting process without affecting the usual recording operation.

In a drive supporting a verify function, however, it is not always necessary to perform the periodical calibration of the recording compensation table. The "verify function" means the function of reproducing the recorded data once when the data is recorded and verifying that the error rate of the data is equal to or smaller than a predetermined value. In other words, even if the edge position of the recording pulse is shifted, it is not always necessary to calibrate the recording compensation table when it is verified by the verify operation that the recorded data has no error which cannot be corrected. To the contrary, in the case where it is verified that the error rate of the recorded data is equal to or greater than a predetermined value by the verify operation or that a frequency of error is increased, it is decided that there is a possibility that the edge position of a recording pulse might be shifted. At this time, accordingly, the recording compensation table calibration may be activated.

<Process related to Recording Pulse Correction>

Figure 29:
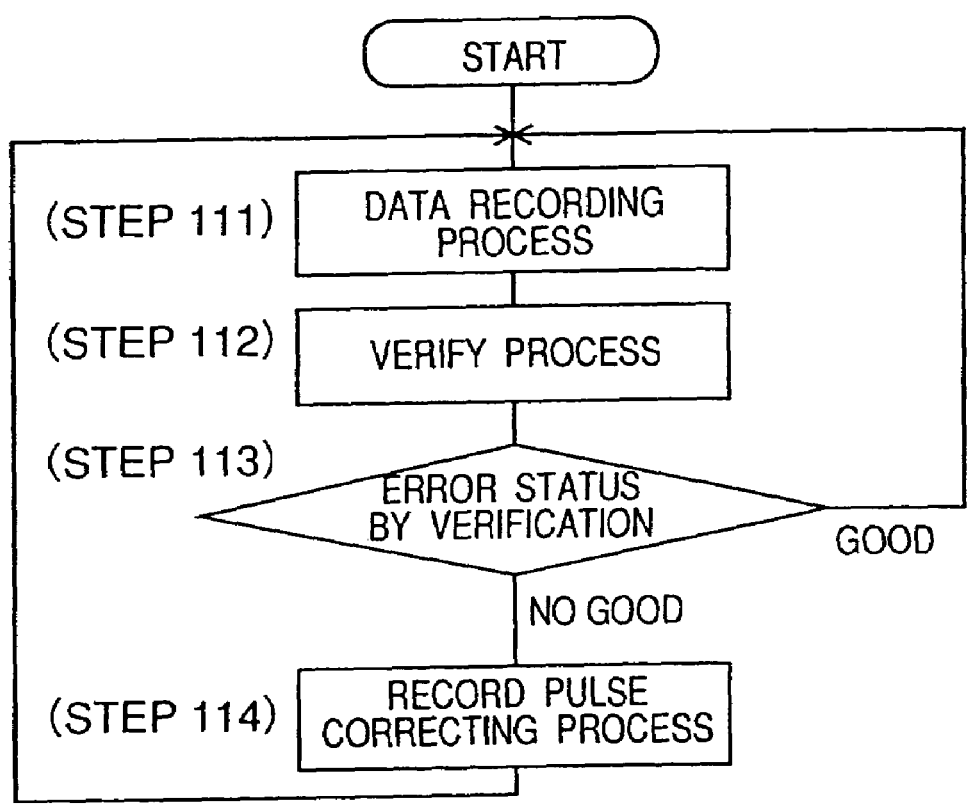
FIG. 29 is a flowchart showing the flow of a process related to recording pulse correction.

FIG. 29 shows an example of the flow of a process related to the recording pulse correction described above. As shown, the routines proceeds to a verify process (Step 112) after the data recording process (Step 111). In the verify process, the data recorded in the data recording process is reproduced to detect an error status (for example, the measurement of a bit error rate and the like). After the verify process, the error state of the verify is decided (Step 113). When the error status does not satisfy predetermined criteria ("No Good"), a recording pulse correcting process (Step 114) is executed. When the error status satisfies the predetermined criteria ("Good"), the recording pulse correcting process is not executed. The decision of the error status may be carried out only by an error status in a last verify process or by error states in a plurality of verify processes which have been executed.

Moreover, the data recording device may include a temperature sensor and/or a voltage measuring section are/is provided to detect a fluctuation in a temperature or a fluctuation in a supply voltage, and calibrates the recording compensation table only when a predetermined change or more is detected. In this case, if the data recording device previously comprises the temperature sensor or the voltage measuring section, the recording compensation table can be calibrated more efficiently without increasing a cost by utilizing the temperature sensor or the voltage measuring section.

<Process of Deciding Whether Recording Pulse Correcting Process Is Executed>

Figure 30:
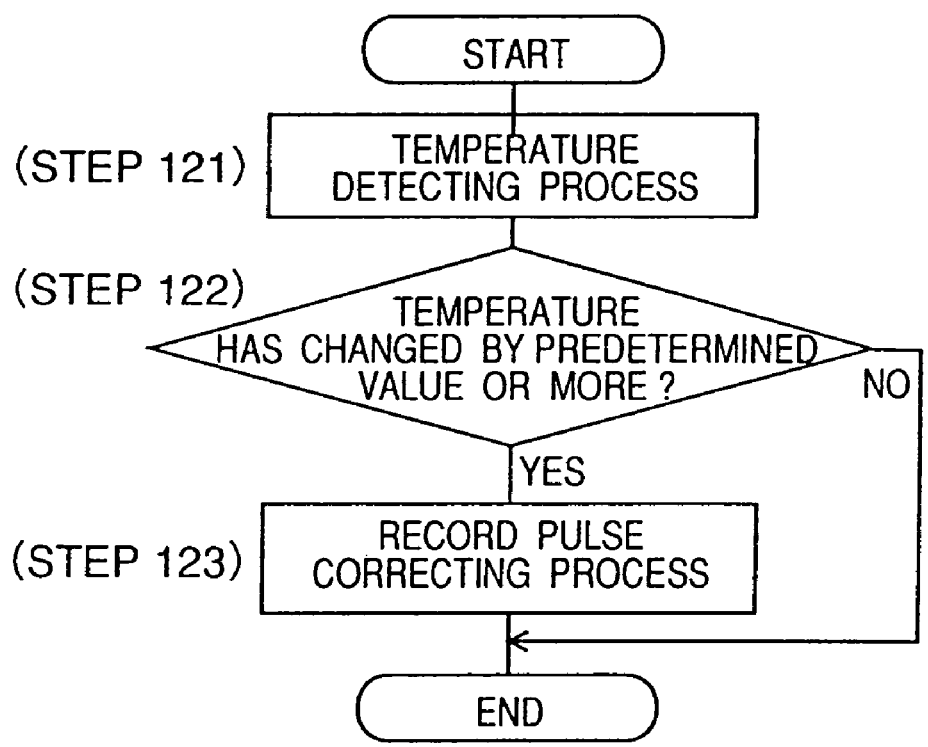
FIG. 30 is a flowchart showing a process for deciding whether the recording pulse correction is executed depending on the state of a temperature.
Figure 31:
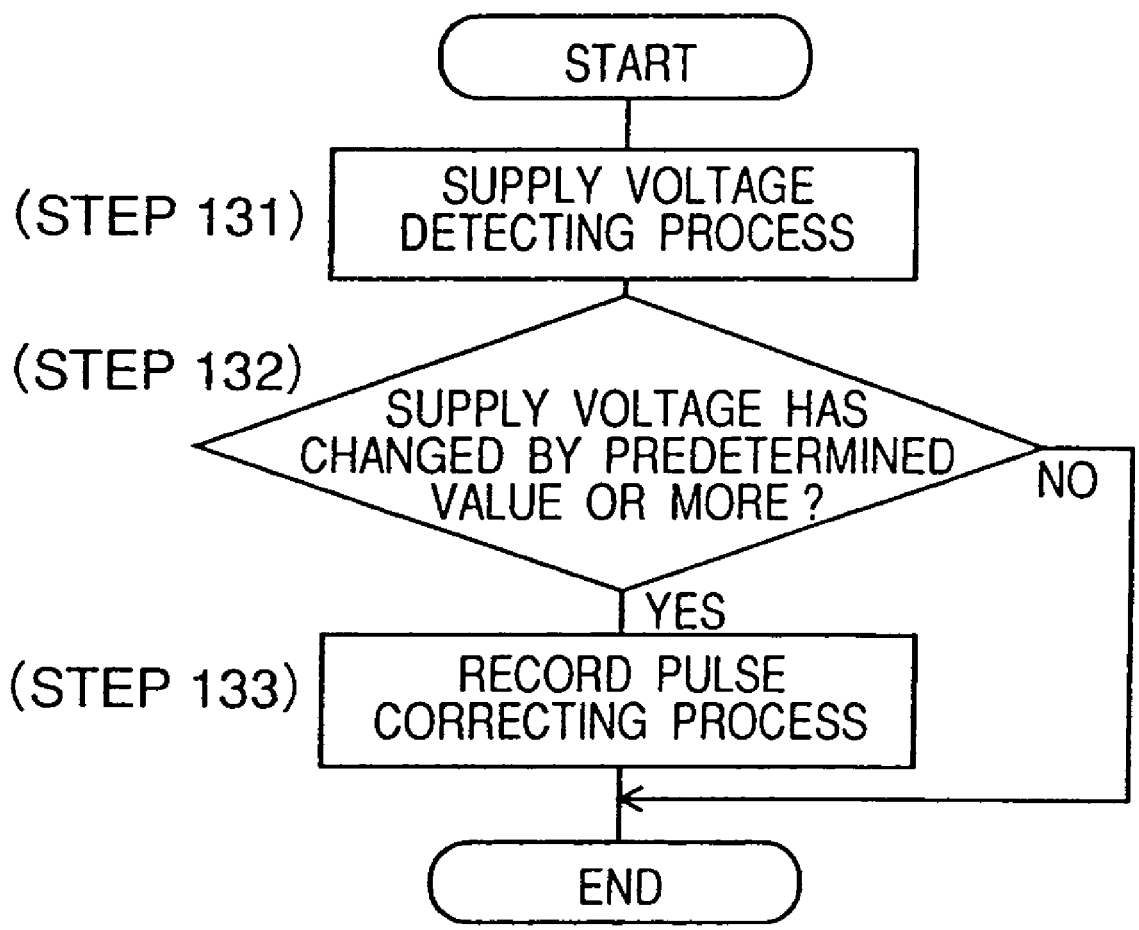
FIG. 31 is a flowchart showing a process for deciding whether the recording pulse correction is executed depending on the state of a supply voltage.

With reference to FIGS. 30 and 31, description will be given to a process of deciding whether the above-mentioned recording pulse correcting process is executed.

FIG. 30 shows an example of a process of deciding whether the recording pulse correction is executed depending on the detected state of a temperature. As shown, after a temperature detecting process of reading the current temperature of the device by a temperature sensor or the like (Step 121), it is decided whether the temperature is changed by a predetermined value or more (Step 122). When it is decided that the temperature is changed by the predetermined value or more ("YES"), a recording pulse correcting process (Step 123) is executed. When it is decided that the temperature is not changed by the predetermined value or more ("NO"), the recording pulse correcting process is not executed. Referring to the change in the temperature, a temperature obtained when the recording pulse correcting process is finally executed and a current temperature may be compared with each other, thereby performing the decision. Alternatively, a plurality of temperature zones ranging within a predetermined temperature may be provided to compare a temperature zone obtained when the recording pulse correcting process is finally executed with a current temperature zone, thereby performing the decision.

FIG. 31 shows an example of a process of deciding whether the recording pulse correction is executed depending on the state of a supply voltage. As shown, a supply voltage measuring process for reading the current supply voltage of the device is executed by means for measuring a supply voltage (Step 131). When there are a plurality of supply voltages, the supply voltage applied to the delay section used for generating a recording pulse is measured. Then, it is decided whether the supply voltage is changed by a predetermined value or more (Step 132). When it is decided that the supply voltage is changed by the predetermined value or more ("YES"), a recording pulse correcting process is executed (Step 133). When it is decided that the supply voltage is not changed by the predetermined value or more ("NO"), the recording pulse correcting process is not executed. Referring to the change in the supply voltage, a voltage value obtained when the recording pulse correcting process is finally executed and a current voltage value may be compared with each other, thereby performing the decision. Also a plurality of voltage zones ranging within a predetermined voltage range may be previously provided to compare a voltage zone obtained when the recording pulse correcting process is finally executed with a current voltage zone, thereby performing the decision.

<Advantages of the Invention>

As described above, according to the structure of the optical disc recording device in accordance with the embodiment of the present invention, the laser emitting waveform during recording can be controlled by using a recording pulse generated by the recording pulse generator. Furthermore, the predetermined edge position of the recording pulse can be corrected by the recording pulse position correcting section. Moreover, it is possible to measure the delay amount of the delay elements of the recording pulse generator by the delay amount measuring section. In other words, the predetermined edge position of the recording pulse generated by the recording pulse generator can be corrected by the recording pulse position correcting section based on the result of the measurement of the delay amount which is obtained by the delay amount measuring section.

Accordingly, even if the delay amount of the delay section is changed by a fluctuation in a supply voltage, a temperature or the like, the predetermined edge position of the recording pulse can be kept proper. Consequently, the quality of the recording data can be more enhanced than in the optical disc recording device according to the prior art.

According to the optical disc recording method in accordance with the embodiment of the present invention, the edge position of the recording pulse can be corrected for a period in which the data is not recorded and the data can be recorded in a state in which the edge position of the recording pulse has been corrected. Accordingly, the ordinary recording operation is not affected but the predetermined edge position of the recording pulse can be periodically kept proper. Thus, the quality of the record data can be more enhanced than in the optical disc recording device according to the prior art.

According to another optical disc recording method in accordance with the embodiment of the present invention, it is possible to decide whether the edge position of the recording pulse is corrected based on the result of the verify operation. Accordingly, the operation for correcting the edge position of the recording pulse is carried out if necessary. Consequently, it is possible to enhance the quality of the record data without increasing the burden of the process of correcting the edge position of the recording pulse.

According to the optical disc recording method in accordance with the embodiment of the present invention, a selection signal value with which the delay amount of the delay section of the recording pulse generator has a predetermined length is obtained, and the time table related to the edge position of the recording pulse is converted into the delay set value table of the recording pulse generator by using the obtained selection signal value. Consequently, the edge position of the recording pulse can be corrected. Accordingly, the predetermined edge position of the recording pulse can be kept proper in a simple structure and procedure. Therefore, the quality of the recording data can be more enhanced and the reliability of the device can be more improved than in the optical disc recording device according to the prior art.

As described in detail in the embodiment of the present invention, moreover, according to the optical disc recording method of the present invention, the predetermined edge position of the recording pulse can be controlled in the timing of the delay clock by generating the delay clock which is adjustably delay-controlled and is used for the modulation of the recording data. By generating a plurality of delay clock outputs, a plurality of edge positions in the recording pulse can be suitably controlled with the clock delay section having only one system. Accordingly, it is possible to reduce the scale of a circuit required for the delay means. Consequently, an optical disc recording device capable of performing the edge control of the recording pulse with high precision can be inexpensively implemented.

Furthermore, by generating a reference axis window signal which is a pulse-shaped signal having at least one cycle of a recording clock synchronous with the rising edge or falling edge of the recording clock and has a start position capable of being variably controlled in a time unit of a ½ cycle of the recording clock, the predetermined edge position of the recording pulse can be controlled in the timings of the delay clock and the reference axis window signal. Such a reference axis window signal is generated by the number of the kinds of the edges of the recording pulse which should be suitably position-controlled, and is used corresponding to the same number of delay clocks. Consequently, it is possible to suitably control the edge positions in portions corresponding to the number of combinations of the delay clock and the reference axis window signal. Accordingly, the edge position of the recording pulse within a wide range can be controlled while reducing the scale of the circuit required for the delay section. Thus, it is possible to implement an optical disc recording device capable of controlling the recording pulse position with high precision within a wide range by using an inexpensive and simple structure.

According to the optical disc recording method of the present invention, moreover, in the case where one recording mark is formed by irradiating a laser beam obtained by controlling a power according to a recording pulse formed by synthesizing at least a first pulse, a multi-pulse chain and a last pulse, at least the leading edge position of the first pulse and the trailing edge position of the last pulse are suitably controlled and the leading edge position of the first pulse and the trailing edge position of the last pulse are defined based on the relative relationship with the rising phase of the multi-pulse chain, the leading edge position of the first pulse and the trailing edge position of the last pulse can be expressed properly.

According to the optical disc recording device of the present invention, moreover, it is possible to carry out the recording compensation with higher precision by performing the variation correction of the devices constituting the delay section.

As described above, the recording pulse position can easily be controlled with high precision within a wide range by using the optical disc recording method or the optical disc recording device according to the present invention. Therefore, the optical disc recording method and the optical disc recording device according to the present invention are very useful in respect of an increase in the recording density of the optical disc.

While the present invention has been described in relation to the specific example, it is apparent to the skilled in the art that various other modifications, changes and applications can be made. Therefore, the present invention is not restricted to the disclosure but is restricted to only appended claims. It is noted that this application is based on applications Nos. 10-306760 and 11-014468 filed in Japan, the contents of which is incorporated herein by reference.

What is claimed is:

1. A method for recording data on an optical disc while controlling a laser power by using a recording pulse generated by a recording pulse generator, the recording pulse to form a recording mark having a width that has information, the method comprising:
   recording the data;
   verifying the recorded data;
   deciding whether or not an edge position of the recording pulse is to be corrected based on an error status of the recorded data with reference to a result of the verification; and
   correcting the edge position of the recording pulse only when it is decided that the edge position of the recording pulse is to be corrected based on a result of the decision.

2. The method according to claim 1, wherein the deciding includes deciding whether or not the edge position of the recording pulse is to be corrected by reference to the error status of the recorded data in results of a plurality of the verifications previously executed.

3. The method according to claim 1, wherein the correcting includes measuring a delay amount of a delay section in the recording pulse generator, and correcting a predetermined edge position of the recording pulse based on a result of the measurement of the delay amount.

4. The method according to claim 1, wherein the correcting includes:
   setting a selection signal value for determining a delay amount of a delay section of the recording pulse generator;
   reading a result of a measurement of the delay amount for the set selection signal value;
   calculating by using the result of the measurement of the delay amount, a selection signal value corresponding to a delay amount Tw which is a time equal to one cycle of a clock to be used for the recording pulse generator; and
   converting a time table related to the edge position of a given recording pulse into a set value table of the selection signal value based on the calculated selection signal value.

5. The method according to claim 4, wherein the time Tw is a time corresponding to one channel bit of the recorded data.

6. The method according to claim 4, wherein the time table includes time information related to a variable position of each edge of the recording pulse.

7. The method according to claim 4, wherein the time table has individual time information for each mark length of the data to be recorded.

8. The method according to claim 4, wherein the time table has individual information for each combination of a mark length of the data to be recorded and a last space length.

9. The method according to claim 4, wherein the time table has individual time information for each combination of a mark length of the data to be recorded and a next space length.

10. The method according to claim 4, wherein the time table has time information corresponding to a mark length of the data to be recorded.

11. The method according to claim 4, wherein the time table has time information corresponding to a combination of a mark length of the data to be recorded and a last space length.

12. The method according to claim 4, wherein the time table has time information corresponding to a combination of a mark length of the data to be recorded and a next space length.

13. The method according to claim 1, wherein the correcting includes, in the recording pulse generator including a delay section having a plurality of taps of delay elements, measuring a delay amount for each delay element group including a predetermined number of taps of delay elements, and controlling an output of the delay section to determine an edge position of a given recording pulse based on the measured delay amount for each delay element group.

14. The method according to claim 1, wherein the correcting includes, in the recording pulse generator having a delay section having a plurality of taps of delay elements, measuring a delay amount for each delay element group including a predetermined number of taps of delay elements, calculating a delay profile of the delay section based on the measured delay amount for each delay element group, and controlling an output of the delay section for determining an edge position of a given recording pulse based on the calculated delay profile.

15. The method according to claim 14, wherein the delay profile to be calculated is a function represented by a same number of polygonal lines as a number of the delay element groups.

16. The method according to claim 1, wherein the correcting includes, in the recording pulse generator having a delay section, detecting a region where a delay time of the delay section is almost coincident with one cycle of a clock signal by using the clock signal having a cycle which is equal to or less than a half of a total delay time of the delay section of the recording pulse generator, controlling an output of the delay section based on a result of the detection, and determining an edge position of a given recording pulse.

17. An apparatus for recording data on an optical disc while controlling a laser power by using a recording pulse generated by a recording pulse generator, the recording pulse to form a recording mark having a width that has information, the apparatus comprising:
 a recording section operable to record the data;
 a verification section operable to verify the recorded data;
 a decision section operable to decide whether or not an edge position of the recording pulse is to be corrected based on an error status of the recorded data with reference to a result of the verification section; and
 a correction section operable to correct the edge position of the recording pulse only when it is decided that the edge position of the recording pulse is to be corrected based on a result of the decision section.

18. A control apparatus for controlling a recording of data on an optical disc while controlling a laser power by using a recording pulse, the recording pulse to form a recording mark having a width that has information, the control apparatus comprising:
 a recording instruction section operable to instruct a recording of the data;
 a verification section operable to verify the recorded data;
 a decision section operable to decide whether or not an edge position of the recording pulse is to be corrected based on an error status of the recorded data with reference to a result of the verification section; and
 a correction section operable to correct the edge position of the recording pulse only when it is decided that the edge position of the recording pulse is to be corrected based on a result of the decision section.

19. A control method for controlling a recording of data on an optical disc while controlling a laser power by using a recording pulse, the recording pulse to form a recording mark having a width that has information, the control method comprising:
 instructing a recording of the data;
 verifying the recorded data;
 deciding whether or not an edge position of the recording pulse is to be corrected based on an error status of the recorded data with reference to a result of the verification; and
 correcting the edge position of the recording pulse only when it is decided that the edge position of the recording pulse is to be corrected based on a result of the decision.

20. A control program embodied on a computer readable medium for controlling a recording of data on an optical disc while controlling a laser power by using a recording pulse, the recording pulse to form a recording mark having a width that has information, the control program comprising:
 a computer-executable program code operable to cause a computer to:
 instruct a recording of the data;
 verify the recorded data;
 decide whether or not an edge position of the recording pulse is to be corrected based on an error status of the recorded data with reference to a result of the verification; and
 correct the edge position of the recording pulse only when it is decided that the edge position of the recording pulse is to be corrected based on a result of the decision.

* * * * *